(12) United States Patent
Fadlallah

(10) Patent No.: US 12,373,037 B2
(45) Date of Patent: *Jul. 29, 2025

(54) CAPTURING TOUCHLESS INPUTS AND CONTROLLING A USER INTERFACE WITH THE SAME

(71) Applicant: Zouheir Taher Fadlallah, London (GB)

(72) Inventor: Zouheir Taher Fadlallah, London (GB)

(73) Assignee: Hussein Ghassan H. Tahir Fadlallah, Amman (JO)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,513

(22) Filed: Sep. 28, 2023

(65) Prior Publication Data

US 2024/0036653 A1    Feb. 1, 2024

Related U.S. Application Data

(63) Continuation of application No. 17/339,804, filed on Jun. 4, 2021, now Pat. No. 11,853,480.

(51) Int. Cl.
| | |
|---|---|
| *G06F 3/01* | (2006.01) |
| *G06F 3/0483* | (2013.01) |
| *G06F 3/0485* | (2022.01) |
| *H04M 1/72445* | (2021.01) |

(52) U.S. Cl.
CPC ............ *G06F 3/017* (2013.01); *G06F 3/0483* (2013.01); *G06F 3/0485* (2013.01); *H04M 1/72445* (2021.01)

(58) Field of Classification Search
None
See application file for complete search history.

(56) References Cited

U.S. PATENT DOCUMENTS

| | | | |
|---|---|---|---|
| 9,354,709 B1 | 5/2016 | Heller et al. | |
| 9,606,647 B1 | 3/2017 | Spencer-Harper et al. | |
| 11,314,353 B1* | 4/2022 | Files | H04L 9/50 |
| 2008/0235621 A1 | 9/2008 | Boillot | |
| 2009/0303204 A1 | 12/2009 | Nasiri et al. | |

(Continued)

OTHER PUBLICATIONS

International Search Report and Written Opinion received for PCT Patent Application No. PCT/IB2022/055466, mailed on Sep. 21, 2022, 9 pages.

(Continued)

*Primary Examiner* — Howard Cortes
(74) *Attorney, Agent, or Firm* — Womble Bond Dickinson (US) LLP

(57) ABSTRACT

A method and apparatus for capturing touchless inputs and controlling an electronic device with the same are described. In one embodiment, the method for controlling a user interface of software on a portable electronic device, the method comprising: obtaining one or more touchless inputs by capturing movements of the portable electronic device resulting from one or more hand gestures made by a hand holding the portable electronic device; determining one or more operations to control the user interface being displayed on a display of the portable electronic device based on the one or more touchless inputs; and controlling the software using at least one of the one or more operations.

20 Claims, 61 Drawing Sheets

(56) References Cited

U.S. PATENT DOCUMENTS

| | | | |
|---|---|---|---|
| 2010/0214243 | A1 | 8/2010 | Birnbaum et al. |
| 2012/0032877 | A1 | 2/2012 | Watkins et al. |
| 2012/0304082 | A1 | 11/2012 | Patten et al. |
| 2013/0117651 | A1 | 5/2013 | Waldman et al. |
| 2013/0321263 | A1 | 12/2013 | Ho |
| 2014/0253438 | A1 | 9/2014 | Hoffman et al. |
| 2014/0333530 | A1 | 11/2014 | Agnetta et al. |
| 2014/0351268 | A1* | 11/2014 | Weskamp ......... G06F 16/24578 715/251 |
| 2015/0277581 | A1 | 10/2015 | Coombs |
| 2016/0034143 | A1 | 2/2016 | Sharma |
| 2016/0349940 | A1 | 12/2016 | Kadur et al. |
| 2017/0108936 | A1 | 4/2017 | Feinstein |
| 2018/0348975 | A1 | 12/2018 | Taniguchi |
| 2019/0026063 | A1 | 1/2019 | Mabey et al. |
| 2019/0121956 | A1 | 4/2019 | Turgeman |
| 2019/0163432 | A1 | 5/2019 | Files et al. |
| 2019/0310753 | A1 | 10/2019 | Gong et al. |

OTHER PUBLICATIONS

International Preliminary Report on Patentability received for PCT Patent Application No. PCT/IB2022/055466, mailed on Dec. 14, 2023, 8 pages.

* cited by examiner

Default Trigger Values

601

Default Trigger Values are an Average Value based on user data collected for testing Trigger Counters Left Trigger Counters Right

ILLUSTRATION OF SECONDARY FLIK OPTIONS AFTER PRIMARY RIGHT FLIK

EXAMPLE OF FLIK AS GRAPHED USING SINGLE STREAM OF DATA

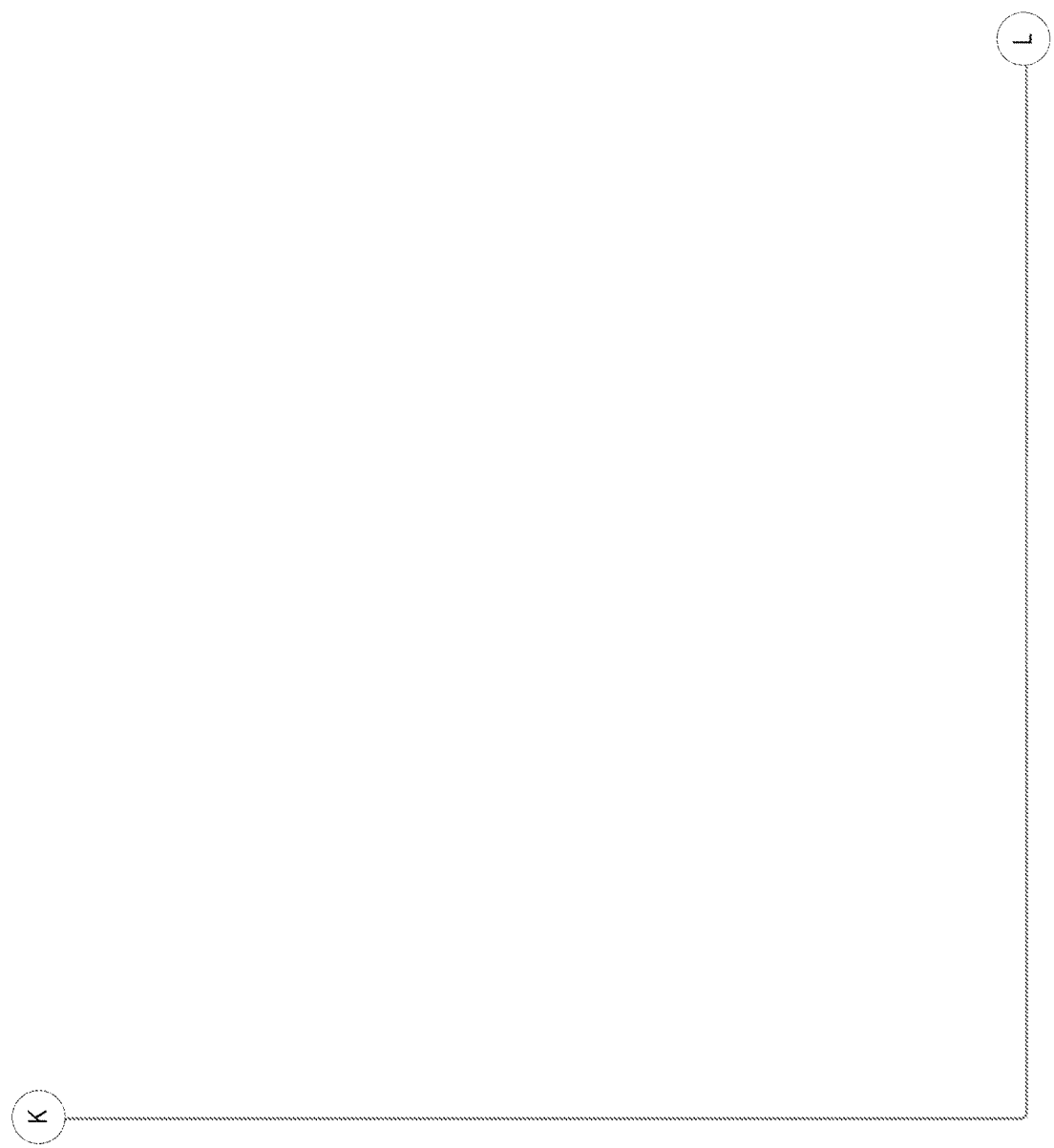

Primary/Secondary Flik
Example

Obtain one or more touchless inputs by capturing one or more movements of the portable electronic device resulting from one or more hand gestures made by a user's hand holding the portable electronic device
3401

Determine one or more operations to control operation of the portable electronic device
3402

Control the electronic device using at least one of the one or more operations
3403

FIG. 34

CAPTURING TOUCHLESS INPUTS AND CONTROLLING A USER INTERFACE WITH THE SAME

RELATED APPLICATIONS

This application is a continuation of U.S. patent application Ser. No. 17/339,804 filed Jun. 4, 2021, and is related to U.S. patent application Ser. No. 17/339,787 filed Jun. 4, 2021, entitled "CAPTURING TOUCHLESS INPUTS AND CONTROLLING AN ELECTRONIC DEVICE WITH THE SAME," each of which, is incorporated by reference in their entirety.

FIELD OF THE INVENTION

One or more exemplary embodiments relate to controlling electronic computing devices, and more particularly, to capturing and/or using touchless inputs to control an electronic device.

BACKGROUND

Smartphones are commonly used today for a number of purposes. Besides making phone calls and sending text messages, smartphones run software programs such as, for example, a browser that enables a user to browse the Internet. To this end, smartphones function like portable computers.

Smartphones usually have a touch screen or other touch surface that enables a user to interact with them. When interacting with a smartphone, a user often holds the smartphone in one hand while using the other hand to interact with and enter information on the touch screen. There are times, however, when the user only has one hand available and that hand is holding the smartphone. In such a case, the user is not able to interact with the smartphone, thereby preventing the user from fully engaging with their smartphone.

SUMMARY

A method and apparatus for capturing touchless inputs and controlling a user interface with the same are described. In one embodiment, the method for controlling a user interface of software on a portable electronic device, the method comprising: obtaining one or more touchless inputs by capturing movements of the portable electronic device resulting from one or more hand gestures made by a hand holding the portable electronic device; determining one or more operations to control the user interface being displayed on a display of the portable electronic device based on the one or more touchless inputs; and controlling the software using at least one of the one or more operations.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 34 is a flow diagram of one embodiment of a process for controlling a portable electronic device.

DETAILED DESCRIPTION

Figure 1:
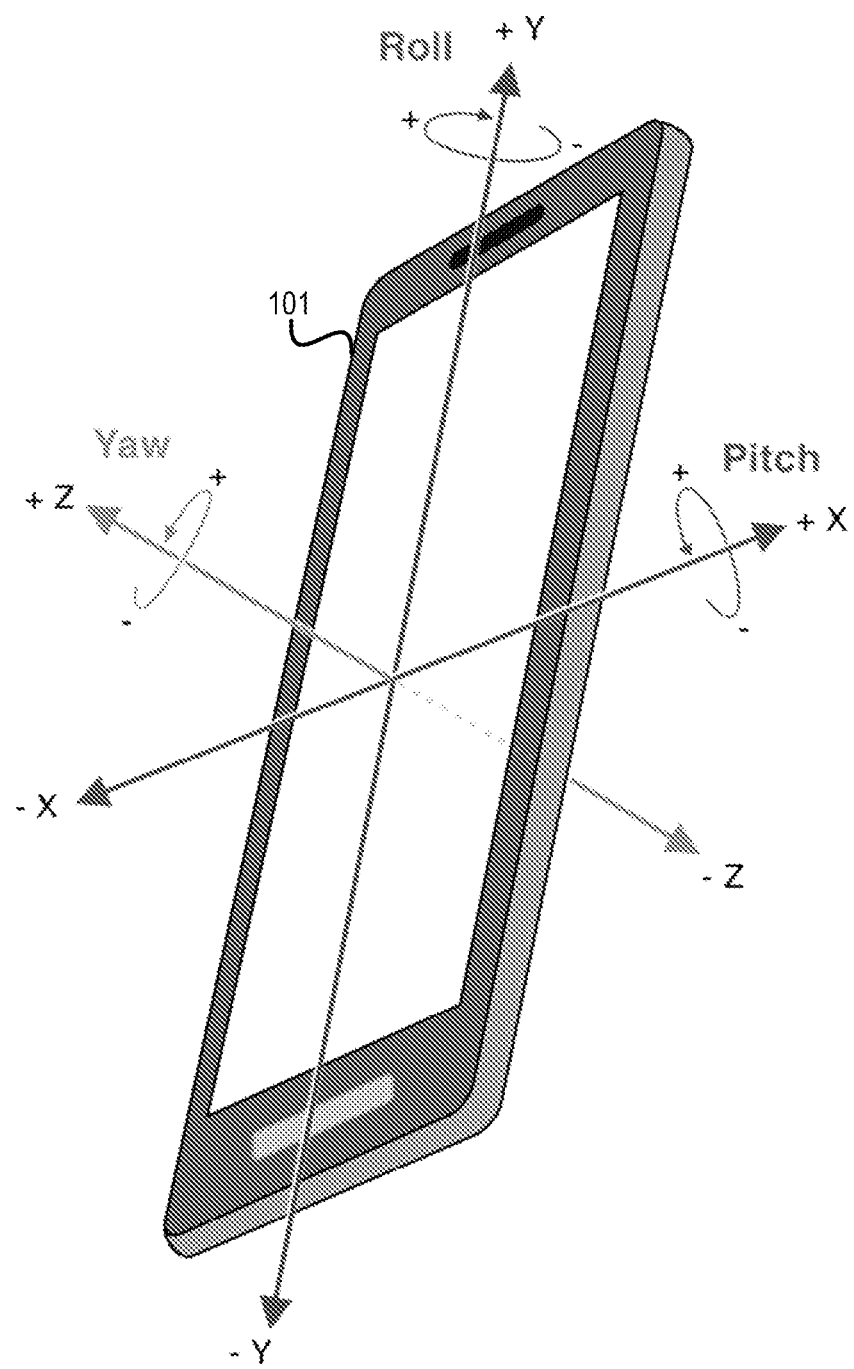
FIG. 1 illustrates a portable electronic device.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A method and apparatus for controlling a portable electronic device with touchless inputs are described. In some embodiments, the touchless inputs are created by capturing one or more movements of the portable electronic device that result from one or more hand gestures made by a user's hand holding the portable electronic device. That is, the touchless inputs are generated in response to a user moving the portable electronic device in different directions and are captured by the electronic device itself. In some embodiments, software (e.g., an application) executing on the portable electronic device is responsible for determining the touchless inputs. The electronic device may be a portable electronic device like a cellular phone (e.g., smartphone) or other portable device that may be held by a user and moved in different directions.

Operations for controlling the portable electronic device are determined based on the one or more touchless inputs. In some embodiments, the portable electronic device captures movements made by a user with the portable electronic device, determines touchless inputs based on those movements, converts those touchless inputs into operations and then controls the electronic device using those operations. These operations and controls can include operations for interacting with applications or other software executing on the portable electronic device. For example, using the touchless inputs, a user may be able to manipulate information on the electronic device, input information into a graphical user interface (e.g., a browser interface) of an application, select user interface control elements of an application, and/or control an operating system. In this way, a user can interact with and manipulate information on their portable electronic device without having to touch their screen.

In some embodiments, software or other processing logic (as described below) generates the touchless in response to Fliks™. A Flik™ is defined as the user rotating the portable electronic device on its X-axis/Pitch (backwards and forwards), Y-axis/Roll (left and right) and Z-axis/Yaw (clockwise and counterclockwise) axis in any of the six directions mentioned and returning it to its initial position. In some embodiments, the return of the device to its initial position is in a swift short motion. In some embodiments, the processing logic recognizes six types of Fliks, namely forward, backward, right, left, clockwise and counterclockwise Fliks, that a user may perform. In some embodiments, a forward Flik occurs when the user rotates the device toward themselves on the X-axis and then back away from the user finally returning to its initial state in a short swift motion; a backward Flik occurs when the user rotates the device away from themselves on the X-axis and then back towards the user finally returning to its initial state in a short swift motion; a right Flik occurs when the user rotates the device on the Y-axis away from themselves and towards their right hand side and then returning to its initial state in a short swift motion; and a left Flik occurs when the user rotates the device on the Y-axis away from themselves and towards their left hand side and then returning to its initial state in a short swift motion. In some embodiments, a clockwise Flik occurs when the user rotates the device in a clockwise direction on the Z-axis and then counterclockwise returning to its initial state in a short swift motion; and a counterclockwise Flik occurs when the user rotates the device in a counterclockwise direction and then in a clockwise direction returning to its initial state in a short swift motion. Thus, the user performs a rotation of their device in the relevant X-axis/Pitch, Y-axis/Roll, Z-axis/Yaw axis to create touchless inputs that may be captured and then used to control the device.

FIG. 1 illustrates a portable electronic device. Referring to FIG. 1, portable electronic device 101 includes sensors (not shown) that measure pitch, roll, and yaw and reports these measurement for use in determining if a user has performed one or more Fliks. Pitch is measured along the X-axis, roll is measured along the Y-axis, and yaw is measured along the Z-axis. Portable electronic device 101 is shown as smartphone. However, portable electronic device 101 can be another type of cellular phone or another type of portable computing device that may be held and rotated as described herein.

Figure 2A:
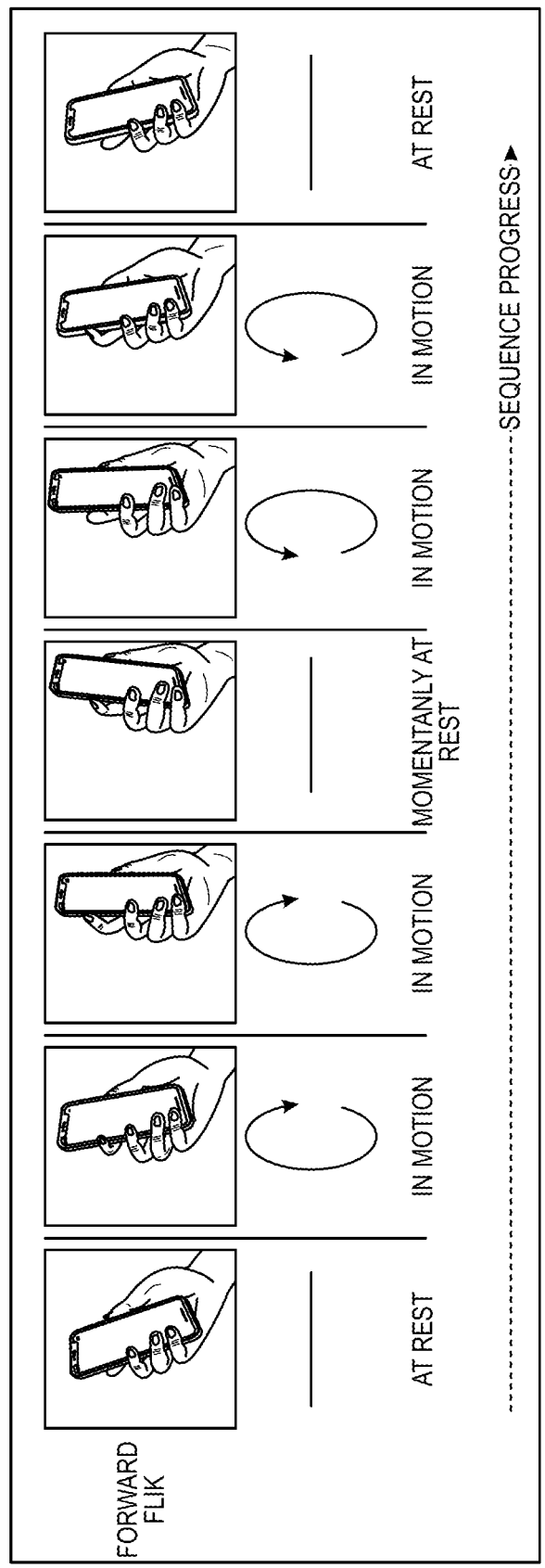
FIGS. 2A-2F illustrates performance of six Fliks™ in accordance with one embodiment.
Figure 2B:
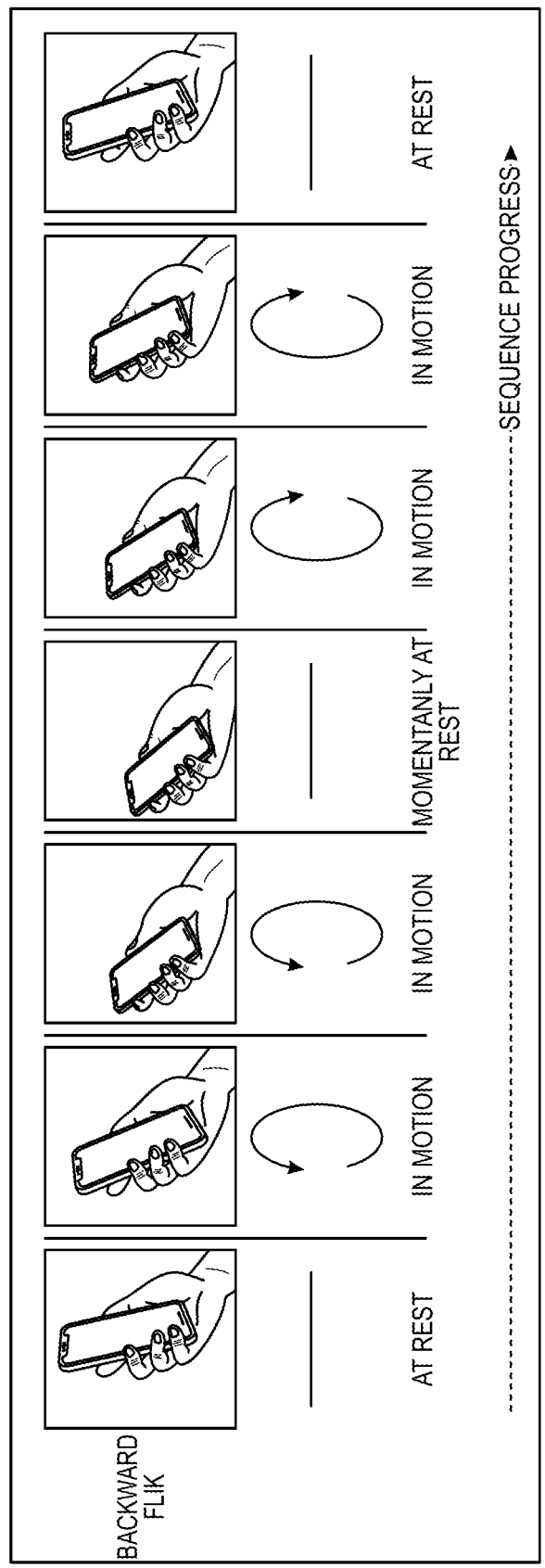
Figure 2C:
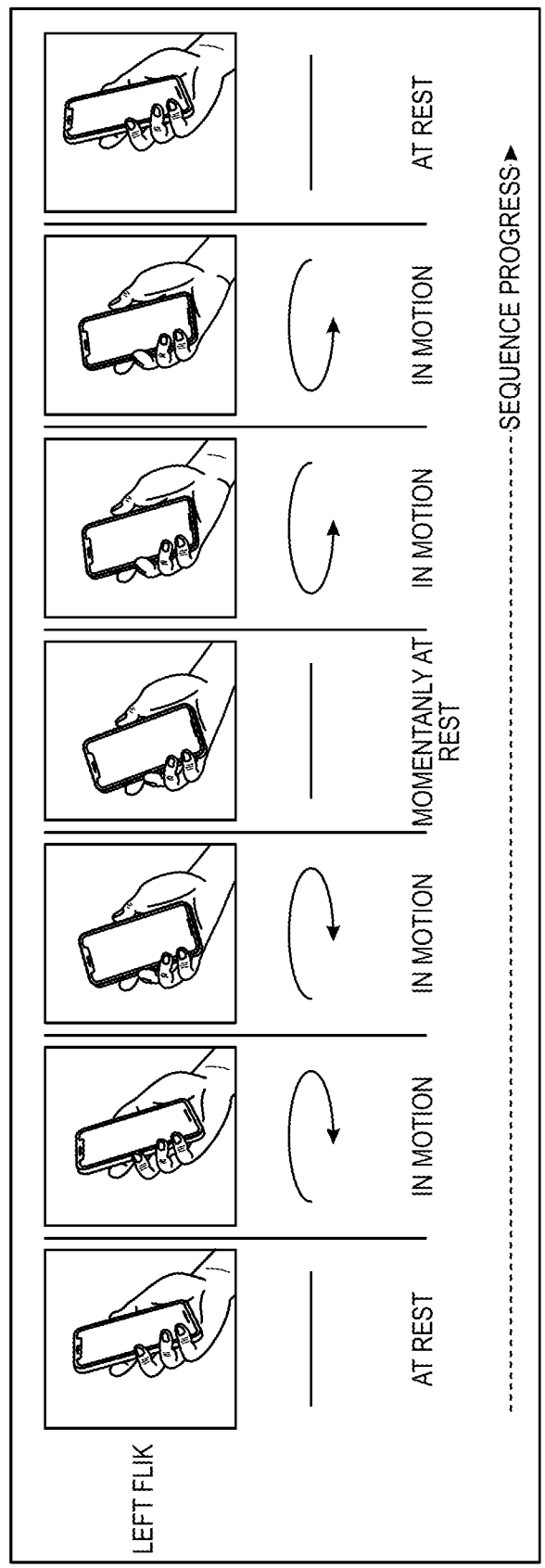
Figure 2D:
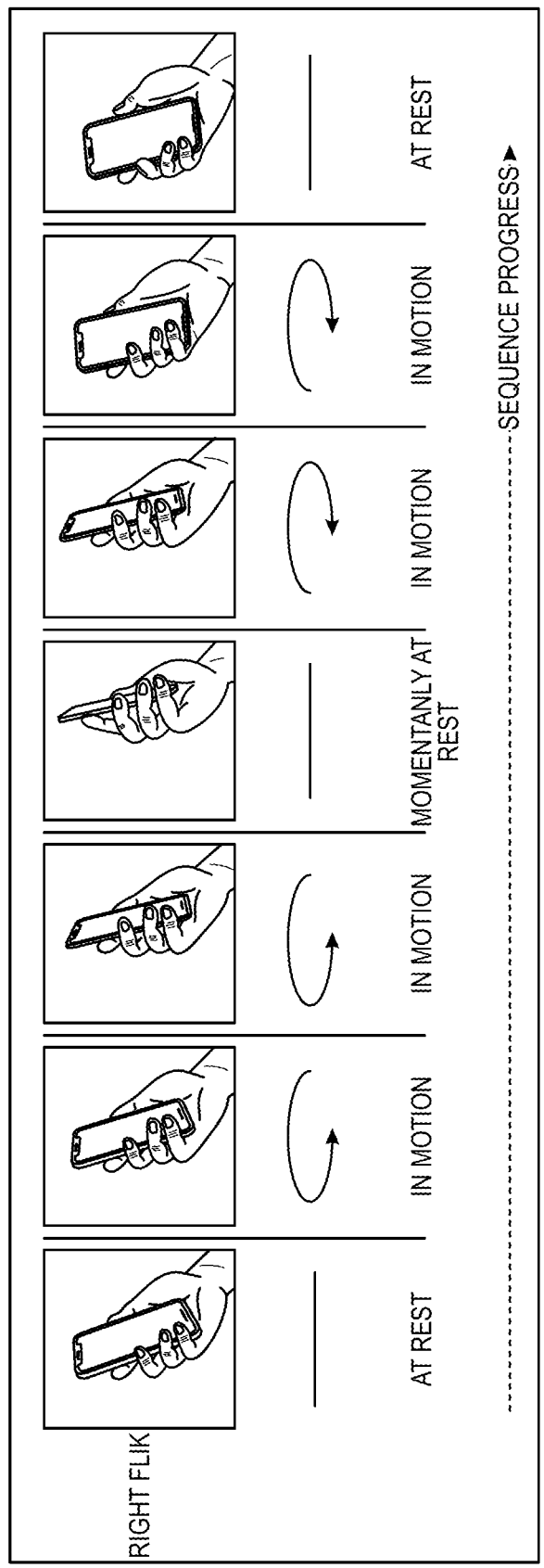
Figure 2E:
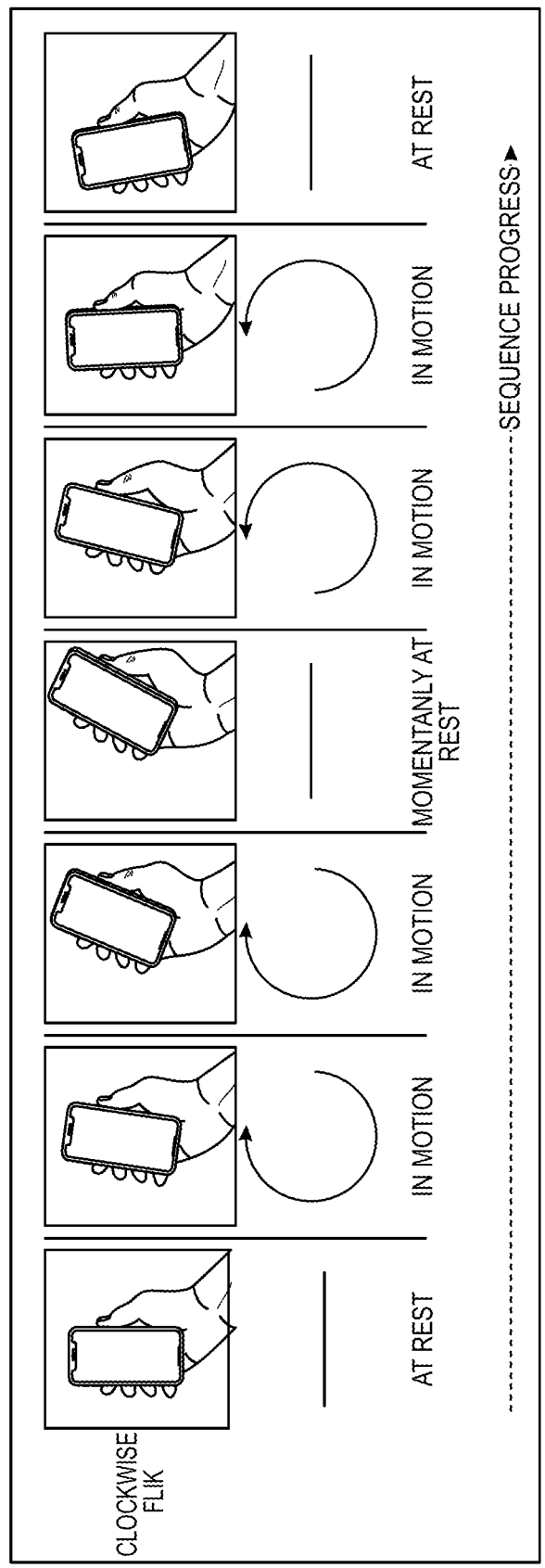
Figure 2F:
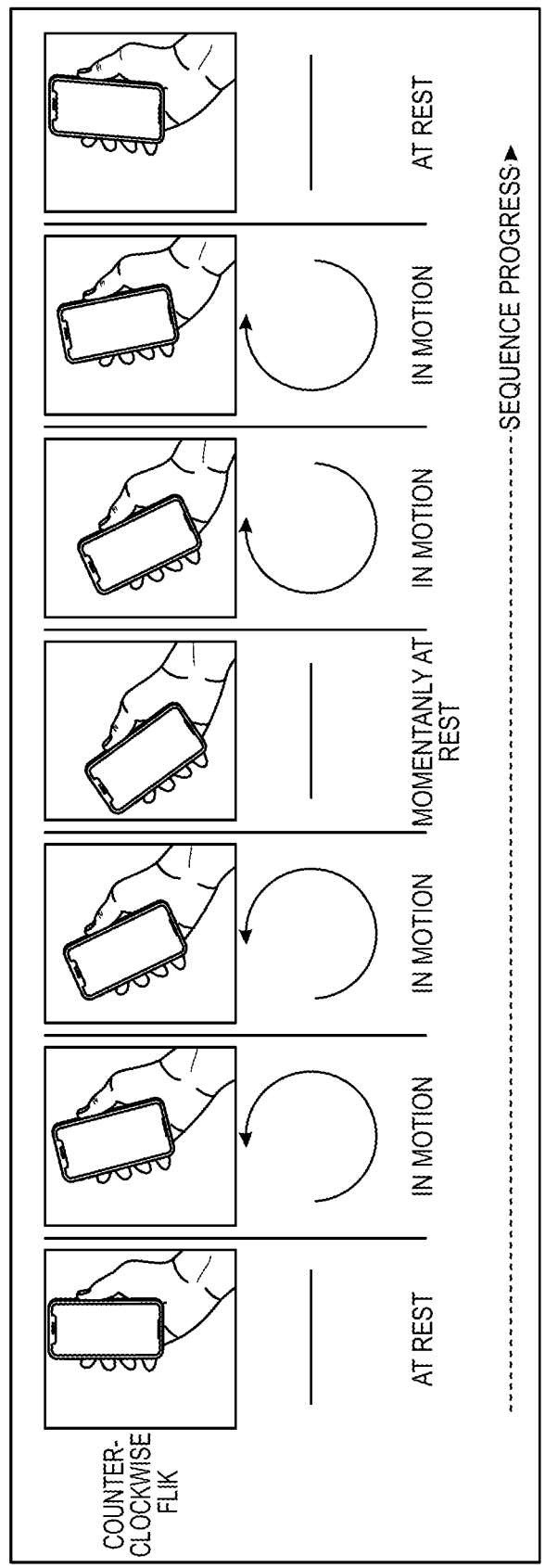

FIGS. 2A-2F illustrates performance of six Fliks in accordance with one embodiment. Referring to FIGS. 2A-2F, a user will rotate their device, such as the portable electronic device 101 of FIG. 1, to trigger the six directions of Fliks. FIG. 2A is a series of images of a device, such as device 101 of FIG. 1, being rotated with the user's hand to trigger a backward Flik. FIG. 2B is a series of images illustrating the device being rotated by a user's hand to trigger a forward Flik. FIG. 2C is a series of images illustrating the device being rotated by a user's hand to trigger a left Flik. FIG. 2D is a series of images illustrating the device being rotated by a user's hand to trigger a right Flik. FIG. 2E is a series of images illustrating the device being rotated by a user's hand to trigger a clockwise Flik. FIG. 2F is a series of images illustrating the device being rotated by a user's hand to trigger a counterclockwise Flik.

In some embodiments, Flik processing logic running on the portable electronic device operates when the user holds the device and freely rotates it in order to trigger one or more sensors on the device to turn on and capture motion data (e.g., rotation data) that may be used to create the touchless inputs. In some embodiments, motion data from the portable electronic device's accelerometer, gyroscope and magnetometer (sensors) is used to determine if one or more Fliks has been performed by a user. In some embodiments, Flik processing logic receives data from the sensors and computes a rotation rate to identify when a Flik has occurred. In some embodiments, the rotation rate is computed and delivered by an API supplied by an operating system that uses dedicated chips on the portable electronic device to compute it. The rotation rate could be computed in the Flik processing logic itself using data from the sensors.

In one embodiment, the Flik processing logic comprises software (e.g., software running on a device, on a chip in a device, or a dedicated machine, etc.), hardware (e.g., circuitry, dedicated logic, etc.), firmware, or a combination of the three. For example, in one embodiment, software is included in a device (e.g., stored in a memory on the device, download onto a device, included in software streamed to run on the device, etc.) and is run on hardware (e.g., one or more processors, sensors, etc.) in the device to perform the operations of the Flik processing logic described herein. In one embodiment, the Flik processing logic includes an Application Programming Interface (API) to allow software of the Flik processing logic to interact with other software, such as software (e.g., a browser, etc.) being controlled by the touchless inputs (e.g. Fliks) identified by the Flik processing logic.

The Flik processing logic disclosed herein allows portable device users, such as, for example, but not limited to, smartphone users, to interact with their devices in a rich and immersive way without ever having to touch the screen. In some embodiments, the Flik processing logic learns how each user tilts and rotations their phone to perform a Flik and automatically integrates that information into the application logic resulting in a better user experience.

There are a number of uses of the touchless inputs created by the Fliks. In some embodiments, Fliks are used to enable web browsing capability to a user simply by "Fliking" their device in one of the multiple relevant directions. The use of touchless inputs is ideally suited to provide the user with a single-handed touchless web browsing experience. By performing Fliks with their device in one of the multiple directions, a user is able to browse and interact with the web. For example, in one embodiment, a user can perform a backward Flik and forward Flik to scroll up and down websites, respectively, while performing a left Flik and a right Flik to scroll between their websites or through their browsing history, respectively.

In some embodiments, in order to give a user more functionality, movements can occur in succession. These are referred herein and are classified as primary and secondary Fliks. The secondary Flik is one that closely follows an initial primary Flik (that precedes it) and extends the number of actions a user can do on their portable electronic device. In other words, the touchless inputs provided by the use of Fliks is not limited to only to the number of Flik directions (e.g., forward, backwards, left and right, clockwise and counter clockwise as shown in FIG. 2A-F) as multiple secondary actions are allowed for each tilt direction. For example, in one embodiment, if the user is browsing a website and Fliks upwards, the primary action is to scroll the page upwards while the secondary actions, of which there can be a number, can include, for example: scroll to the top of the page, go to bookmarks, bookmark this page, etc. As another example, in one embodiment, if the user is browsing a website and performs a backward Flik, the primary Flik action is to scroll upwards on the webpage. As soon as this Flik has been triggered, a selection menu of Flik-selectable secondary Flik actions are displayed in the user interface which the user can then select to be performed. In some embodiments, this menu overlay is ephemeral and lasts only for a short, predetermined amount of time after the primary Flik action is triggered with the primary Flik. In one example, these secondary actions could be, for example, scrolling to the top of the website or adding the website to the user's bookmarks. In this example, after a primary Flik occurs and a menu of secondary Flik actions appears on the display screen of the user's device, the user can then perform a left Flik to trigger a secondary Flik action of scrolling to the top of the webpage. In some embodiments, the Flik processing logic also registers a Flik in opposite direction to the initial one as a request from the user to unwind or cancel the initial action and return the state of the application to what it was before the first Flik was registered. Afterwards performing the secondary Flik actions, the device automatically monitors for further primary Fliks. Note that primary and secondary trigger actions can be easily tailored to the user's personal choice.

The Flik processing logic described herein and its use are not limited to use in web browsing and have a number of other uses. For example, the Flik processing logic may be integrated into a smartphone (or other electronic device) operating system (OS) and allows users to use the Flik processing logic anywhere in the OS or throughout all applications on the device. In some embodiments, the Flik processing logic can also be used with any application in which data is displayed and interacted with by the user. The movement model used to perform operations based on the Fliks is well suited to modern UI/UX where most navigation comes through vertical and horizontal scrollable lists. Furthermore, the use of secondary Fliks allows the user to perform most common functions throughout the OS without any need for touching the screen.

The software of the Flik processing logic may also be integrated into various smartphone applications in the form of software. For example, the software could be integrated into social media applications (e.g., Twitter, Instagram, etc.), particularly because of the horizontal scrolling nature of the applications and the simple interactions most commonly needed (e.g., like, reply, etc.).

The Flik processing logic may also be used to control and interact with augmented reality (AR)/virtual reality (VR) technologies. For example, the touchless inputs provided by the Flik processing logic can be used for interaction with AR information that usually displays a minimal amount of information and benefits from a simple interaction paradigm that the Flik processing logic could deliver.

The Flik processing logic may also be used to interact with hardware or robotics. For example, the Flik motion could be used to create touchless inputs to control the movement of hardware or robotics and/or be used to either dictate movement or perform functions or tasks.

Furthermore, the Flik processing logic may also be used to interact with or control another device. For example, the Flik processing logic can be used to remotely control another smartphone or personal computer (PC). Also, horizontal and vertical scrollable lists are a universal standard for displaying information throughout desktop and mobile computing and may be manipulated using the touchless inputs provided by the Flik processing logic.

An Example of Software for Generating Touchless Inputs Using Fliks

In some embodiments, Flik processing logic, including software executing on the portable electronic device, generates touchless inputs that are used as inputs for application and/or the operating system running on the device. The Flik processing logic generates the touchless inputs in response to Fliks being performed by the user and the associated movements of the device being captured by sensors on the device. In one embodiment, the captured movements are converted into information that indicates rotation rates associated with the movements and the directions of those movements. The rotation rates and their associated directions enables the Flik processing logic to determine the type of Flik.

In some embodiments, the type of Flik that is performed corresponds to an input or control for the application being displayed on the portable electronic device. In other words, the Flik processing logic associates particular actions for an application with a particular type of Flik. Thus, when the application is running and the Flik processing logic recognizes the type of Flik that is performed, the Flik processing logic is able to notify the application of the input and/or action the application is to take. This notification of the input can occur in much the same way an input is recognized by a touch screen when a user interacts with an application through their touch screen.

Using Fliks to signify touchless inputs has a number of issues, some of which are discussed herein. For example, in some embodiments, the Flik processing logic is able to mitigate Fliks in unintended directions. This issue arises as a natural consequence of how users rotate their device when performing a Flik where there is the possibility that a Flik in an unintended direction may be registered. As an example, when a user is holding their device in their right hand and is attempting to Flik to the left, as the device returns to its neutral position the device sensors will register a movement in the opposite direction to the initial Flik. The Flik processing logic ensures that the return movement is not registered as another unintended Flik. That is, the Flik processing logic ensures that only purposeful actions are captured as a triggers and discards any inconsequential data resulting from the device returning to its initial neutral position.

In some embodiments, to prevent Fliks in unintended directions, the Flik processing logic uses active pausing between subsequent triggers. In other words, the Flik processing logic pauses recognition of another Flik for a predetermined amount of time after a Flik is trigged. During this pause time, the user is able to return the device to the neutral position. In some embodiments, the computed pause times that reflect exactly how the current user is moving their device. In some embodiments, the Flik processing logic also stores and uses peak and trough data points to optimize pausing times.

In some embodiments, the Flik processing logic computes the acceleration of the device in each of the four directions and uses that to give precedence to the direction with the highest acceleration at any given time. In some embodiments, computing a trigger value that is personalized to each user and therefore more likely to reflect their usage pattern.

In some embodiments, the Flik processing logic effectively capturing Fliks in multiple directions in rapid succession. Using computed time to neutral values for each user, which indicates the amount of time for a user to return a device to its initial neutral position as part of performing a Flik, allows for the Flik processing logic to accept subsequent Flik triggers as fast as the user would naturally be able to rotate their device. In some embodiments, the Flik processing logic allows for multiple actions for a Flik in any given direction. In order for the application to effectively allow users to interact with rich data on screen the limitation of only one action per each direction the device can Flik had to be overcome. The solution was to use both software and user interface to extend the number of actions a user could perform for any given Flik direction. In some embodiments, the Flik processing logic knows what direction the initial Flik was triggered in and then react to subsequent Fliks in any four directions with a set of different actions based on that specific situation. To do so, the Flik processing logic continually identifies what is on screen and reacts with the relevant primary and secondary Flik actions.

In some embodiments, the system adapts to the variation in user's movement of the device because each user moves and rotates their device in a specific and individual manner. The Flik processing logic has to account for these variations and adapt to the user's movement rather than require the user adapt to the Flik processing logic. In order to achieve this a number of strategies are involved including, capturing and interpreting user movement and then translating that into unique values that allow the Flik processing logic to adapt to each user's unique movement profile; calculating user's time to neutral; calculating user's unique trigger and potential trigger values; calculating user's unique neutral state; and calculating which hand the user is holding the device, etc. These are described in more detail below.

In some embodiments, to perform these functions, the Flik processing logic uses a number of variables. In some embodiments, variables in the Flik processing logic are split between those that are outputted by the sensors on the device and those that are computed by the Flik processing logic as well as those that are available as a default variables and those that are computed as the user session is ongoing. In some embodiments, these variables includes Essential Trigger variables, Computed Trigger variables, and other variables.

In some embodiments, Essential Trigger variables are those that are required by the Flik processing logic to be accessible at the startup of the Flik processing logic. In some embodiments, at first use or if previous session data is not available, these values will be set to a universal default value. In some embodiments, Essential Trigger variables includes Trigger values and Potential Trigger values.

In some embodiments, Trigger values are a value of the rotation rate on either X or Y-axis where a Flik is deemed to have been triggered by a user. In some embodiments, the Trigger values includes a Forward Trigger (TF) representing a trigger value for a Flik on the positive X-axis, a Backward Trigger (TB) representing a trigger value for a Flik on the negative X-axis, a Left Trigger (TL) representing a trigger value for a Flik on the negative Y-axis, and a Right Trigger (TR) representing a trigger value for a Flik on the positive Y-axis. In some embodiments, trigger values are a value of the rotation rate on the Z-axis where a Flik is deemed to have been triggered by the user in either the clockwise or counterclockwise directions on the negative and positive Z-axis respectively.

In some embodiments, Potential Trigger values are a value in the relevant direction that is below a Flik trigger value but still relevant to the Flik processing logic and are used to ensure that the current trigger value is not set to too high and to help optimize other parts of the Flik processing logic throughout a usage session. Potential Trigger values includes a Forward Potential Trigger (PTF) representing a trigger value for a Flik on the positive X-axis, a Backward Potential Trigger (PTB) representing a trigger value for a Flik on the negative X-axis, a Left Potential Trigger (PTL) representing a trigger value for a Flik on the negative Y-axis, and a Right Potential Trigger (PTR) representing a trigger value for a Flik on the positive Y-axis.

Computed trigger variables are computed from usage and data collected by the Flik processing logic during the session. In some embodiments, the Computed trigger variables include Neutral State (NT), Time to Neutral (NTT), Peak (TPK), Trough (TTR) and Left Hand/Right Hand (H).

Neutral state (NT) values are computed values that software uses in order to ascertain when the user is likely not trying to trigger any specific action and the Flik processing logic therefore assumes the device to be at an artificial state of rest. This value is computed because the sensors are constantly registering minute movements of the device in the user's hand and an artificial threshold is created below which the application perceives the device to be at rest.

Time to Neutral (NTT) is a variable that the Flik processing logic computes from monitoring the amount of time it takes the user to rotate the phone and return it to its initial position. This variable is unique to each user and allows the Flik processing logic to tailor the experience to the given user and make its use be natural and predictable. This variable is also computed for each of the tilt directions as each of those numbers will likely differ.

Peak (TPK) is a variable computed after a Flik has been identified and measures the Movement Data over a set amount of time to ascertain what the highest value was on the relevant axis of rotation after the Flik was triggered. In some embodiments, there are four Peak variables, namely Forward Peak (TPKF); Backward Peak (TPKB); Left Peak (TPKL); and Right Peak (TPKR), one for each direction.

Trough (TTR) is a variable computed after a Flik has been identified and measures the Movement Data over a set amount of time to ascertain what the lowest value was on the relevant axis of rotation after the Flik was triggered. In some embodiments, there are four Trough variables, namely Forward Trough (TTKF); Backward Trough (TTKB); Left Trough (TTKL); and Right Trough (TTKR), one for each direction.

Left Hand/Right Hand (H) is a variable computed based on the difference between left and right Flik Peaks to identify if the user is currently holding the device in their right or left hand. This variable is then used to change the relevant Trigger values to better suit usage in one hand or the other. In some embodiments, there are two variables: Left Hand (HL) and Right Hand (HR).

Figure 3A:
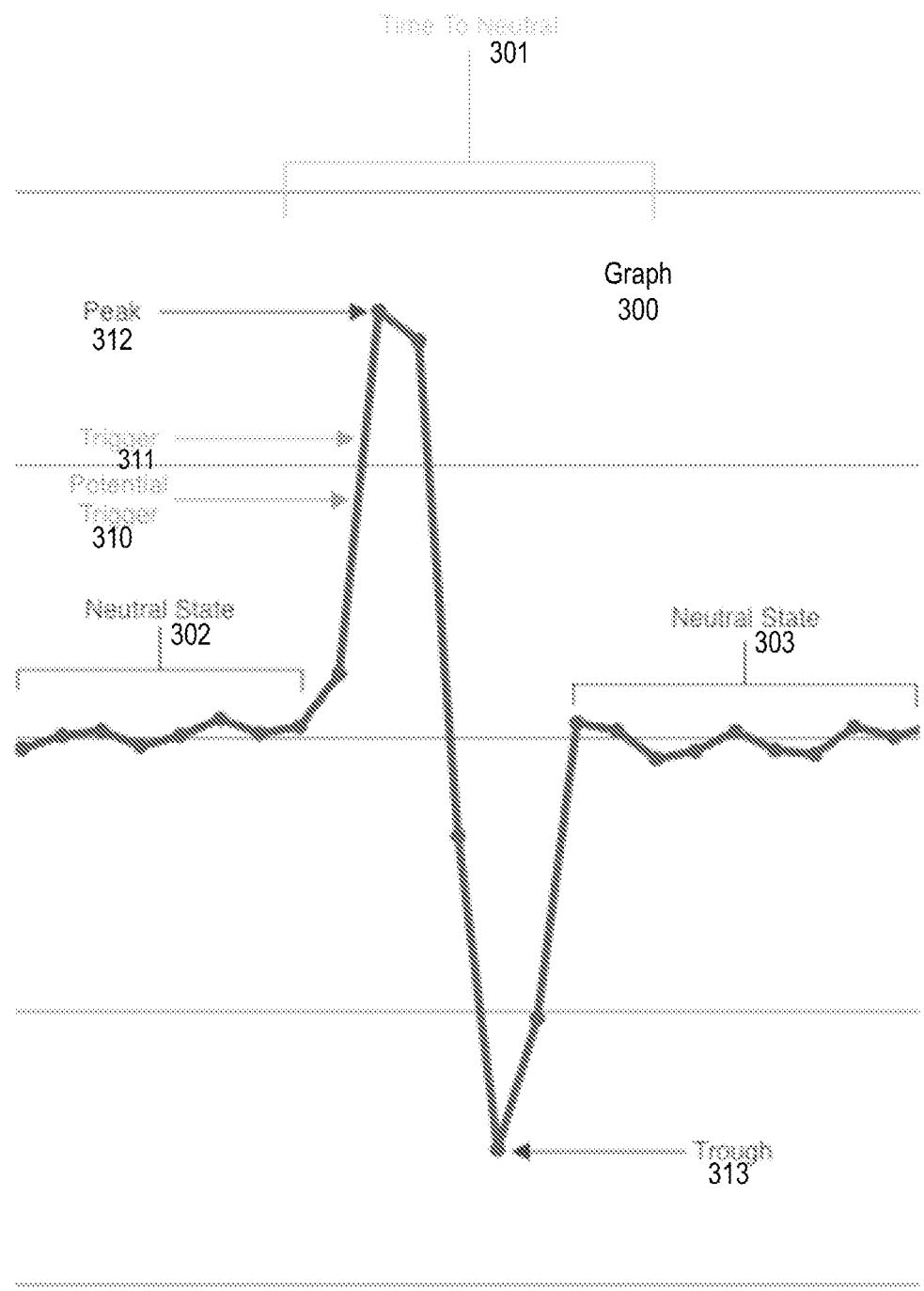
FIG. 3A illustrates in a sample forward or left Flik™ with various variables identified on a graph of the rotation values.

FIG. 3A illustrates in a sample forward Flik with various variables identified on a graph of rotation values. Referring to FIG. 3A, graph 300 includes a Neutral States 302 and 303 with a Time to Neutral 301 between the two Neutral States 302 and 303. A Potential Trigger 310 may occur when the device is Time to Neutral State 301. Subsequently, a Trigger 311 is identified and represents a Flik that ends after proceed through Peak 312, transitioning down to Trough 313, and returning to Neutral State 303. A graph of rotation values for a right Flik resembles the same shape as the graph in FIG. 3A.

Figure 3B:
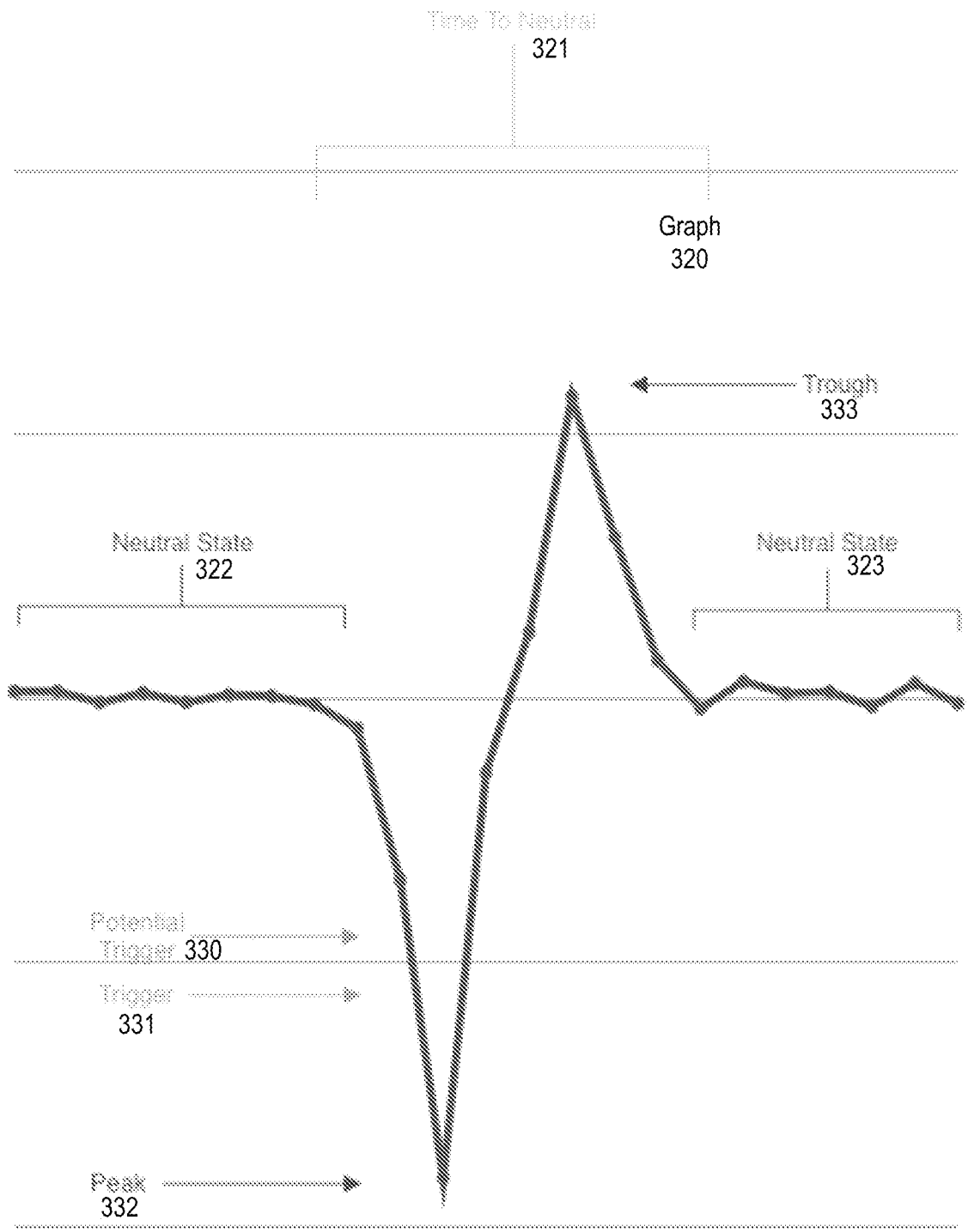
FIG. 3B illustrates in a sample backward or right Flik with various variables identified on a graph of rotation values.

FIG. 3B illustrates in a sample backward Flik with various variables identified on a graph of rotation values. Referring to FIG. 3B, graph 320 includes a Neutral States 322 and 323 with a Time to Neutral 321 between the two Neutral States 322 and 323. A Potential Trigger 330 may occur when the device is Time to Neutral State 321. Subsequently, a Trigger 331 is identified and represents a Flik that ends after proceed through Peak 332, transitioning up to Trough 333, and returning to Neutral State 323. A graph of rotation values for a left Flik resembles the same shape as the graph in FIG. 3B.

The Flik processing logic uses other variables that includes data arrays (DA), counters (CN), Polling Speed (PL), Reduction Value (RV), and Pauses (PS). Data Arrays (DA) are arrays used to store variables used for computation and to store and retrieve historical data. In some embodiments, Data Arrays include a Master Array, a Computer data array, a Triggers array and a Potential Triggers array. Master array (DAM) holds an array of Essential Trigger Variables, Computed Variables as well at Movement Data in one array. Computed data array (DACD) holds only computed data generated over the session. Triggers arrays (DAT) hold a collection of Movement Data points identified at the point at which the Flik processing logic determines a Flik was triggered. In some embodiments, there is a Triggers array for each direction, namely Forward Trigger Array (DATF), Backward Trigger Array (DATB), Left Trigger Array (DATL), and Right Trigger Array (DATR). Potential Triggers arrays (DAPT) hold a collection of Movement Data points identified at the point at which the Flik processing logic determines a Potential Flik was triggered. In some embodiments, there is a Potential Triggers array for each direction, namely Forward Potential Trigger Array (DAPTF), Backward Potential Trigger Array (DAPTB), Left Potential Trigger Array (DAPTL), and Right Potential Trigger Array (DAPTR).

In some embodiments, Counters (CN) are used throughout the application to ensure concurrency of data stored in various arrays and to allow for computation to occur within a precise segment of time. In some embodiments, Counters include Master counter, Trigger counters, and Potential Triggers counters. Master counter (CNM) is the main counter that begins with the first data point received from the motion Sensors. Triggers counters (CNT) for all directions keep track of the number of primary triggers that have been detected during the session and include Forward Trigger Counter (CNTF), Backward Trigger Counter (CNTB), Left Trigger Counter (CNTL), and Right Trigger Counter (CNTR). Potential Triggers counters (CNTR) for all directions keep track of the number of potential triggers that have been detected during the session and include Potential Forward Trigger Counter (CNPTF), Potential Backward Trigger Counter (CNPTB), Potential Left Trigger Counter (CNPTL), and Potential Right Trigger Counter (CNPTR).

Polling Speed (PL) is a variable that dictates how fast the motion sensors update and deliver data. In some embodiments, there are three polling speeds: High (PLH), Medium (PLM); and Low (PLL).

Reduction Value (RV) is the value that the Flik processing logic uses to compute the amount to reduce Trigger and other values based on the usage during the current session.

Pause (PS) variables are used through the application in order to mitigate false Fliks and ensure that the user experience is optimized. In some embodiments, there are two Pause variables including a Trigger pause time (PST) indicating how long the pause is between when one trigger can be detected and another and a Secondary interval (PSSC) indicating the length of time allow for Secondary Fliks to be triggered.

Variables that the Flik processing logic uses includes movement data. Movement data is data that is captured from the motion sensors of the electronic device. Timestamp (MOTS) is the amount of time in seconds since the device booted. Pitch (MDP) is the pitch of the device, in radians. Roll (MDR) is the roll of the device, in radians. Yaw (MDY) is the yaw of the device, in radians. Gravity (MDG) is the gravity acceleration vector expressed in the device's reference frame. In some embodiments, there are three gravity acceleration vectors, namely X-axis (MDGX), Y-axis (MDGY), and Z-axis (MDGZ), one for each axis. Rotation (MDR) is the rotation rate of the device. In some embodiments, there are three rotation rates, namely X-axis (MDRX), Y-axis (MDRY), and Z-axis (MDRZ), one for each axis. Acceleration (MDA) is the acceleration that the user is giving to the device. In some embodiments, there are three accelerations, namely X-axis (MDAX), Y-axis (MDAY), and Z-axis (MDAZ), one for each axis. Magnetic Field (MDMF) returns the magnetic field vector with respect to the device.

Initially, the setup of application computes all variables for which data is available and reverts to defaults where no data is available. In some embodiments, default values can initially be refined if certain user data is entered before a session is begun. In some embodiments, the default values can be based on user entered information and made without user entered information. For example, the user entered information may include initial information such as sex, which hand is being used, etc. or if previous session data has been saved in the application. Without any user information, in some embodiments, the default values are set using values developed from user testing, and these numbers may be identical across all users or segmented.

In some embodiments, once a session begins and the user is actively using the application, the Flik processing logic automatically computes values based on current usage. These values can be stored for use in future sessions.

FIGS. 4-26 illustrates process for calculating variables used by the Flik processing logic are part of the Flik generation process.

Figure 4:
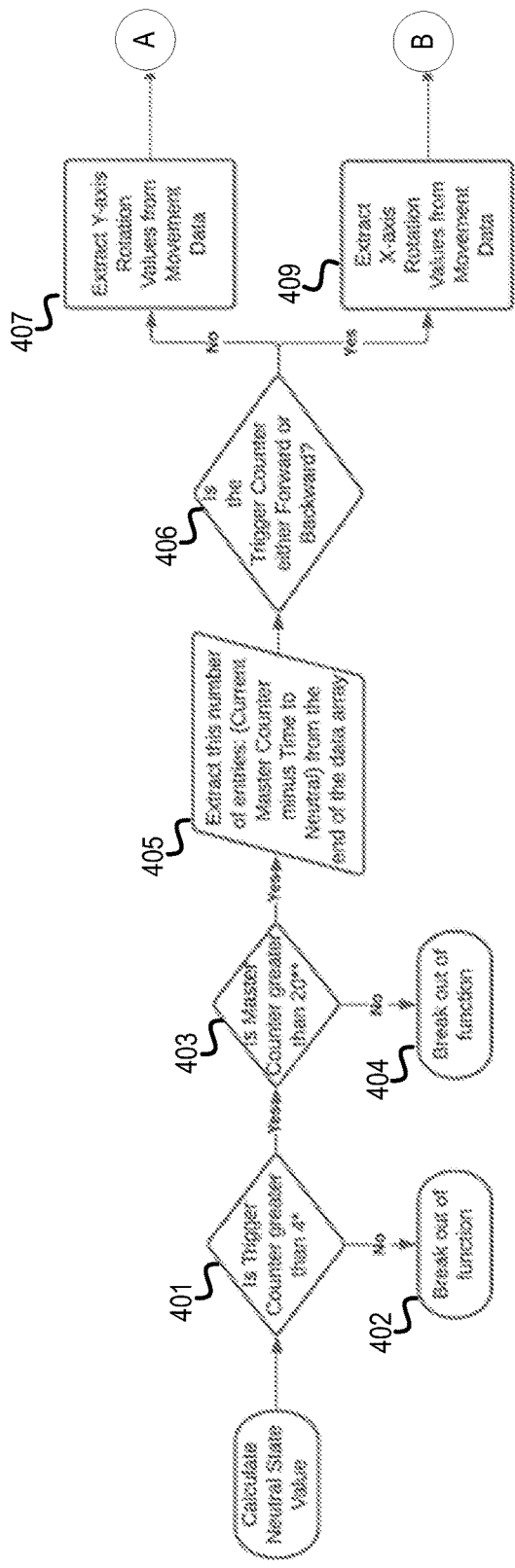
FIG. 4 is a flow diagram of one embodiment of a process for calculating a neutral state value.
Figure 4:
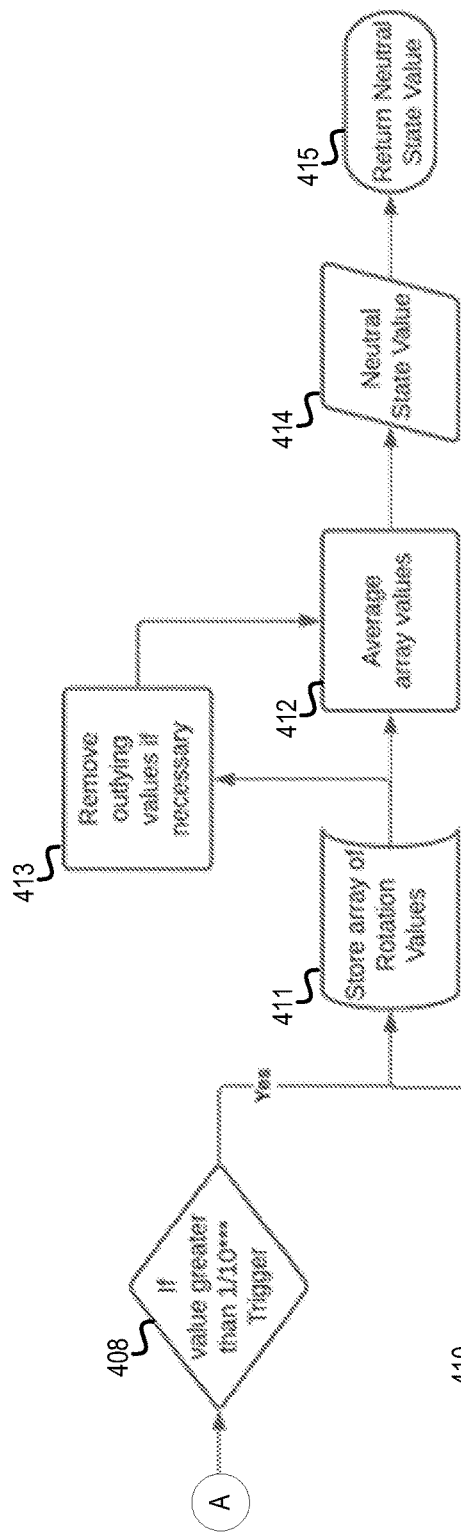

FIG. 4 is a flow diagram of one embodiment of a process for calculating a neutral state value. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 4, the process begins by processing logic testing whether the Trigger Counter for each direction is greater than a predetermined integer value (processing block 401). In some embodiments, the predetermined integer value is four. Note that the number four is a representative number to signify that there are enough trigger values to start this process. Without a minimum number of trigger values, the calculation would not yield the useful answer. Alternatively, a number other than four may be used.

If the Trigger Counter value is less than the predetermined number (e.g., less than four), then the process transition processing block 402 and the process of calculating the Neutral State value ends. If the Trigger counter is greater than the predetermined number, then the process transition processing block 403 where processing logic determines whether the Master Counter that contains data from the device sensors is greater than a predetermined number (e.g., 20). Note that this predetermined number is a representative number that signifies that there are enough values in the Data Array to proceed as the Flik processing logic needs a minimum number of data points that would accurately reflect a flow Flik from start to finish as well as interim data between Fliks. If processing logic determines that the Master Counter is not greater than the predetermined number (e.g., 20), then the process transitions to processing block 404 where the process ends. If processing logic determines that the Master Counter is greater than the predetermined number, then processing logic extracts a number of entries equal to the quantity currently in Master Counter minus the Time to Neutral value) from the end of the data array (processing block 405).

Thereafter, processing logic looks at whether the Trigger Counter that is being used for this computation is for the Forward or Backward Fliks and then uses that information to determine whether it should look at the values for the X-axis; otherwise, processing logic examines data from the Y-axis because the computation is for a Right or Left Flik. More specifically, processing logic determines whether the Trigger Counter is either for Forward or Backward Fliks (processing block 406). If not, processing logic extracts the Y-axis rotation values from the Movement data (processing block 407) and determines whether the value is greater than one-tenth of the Trigger value (processing block 408) and then transitions to processing block 411. Note that the one-tenth value is a representative number of a level below which the trigger value will be considered as neutral (artificially at rest). In some embodiments, the sensors in the device are very sensitive and are constantly registering user movement so the Flik processing logic benefits from creating an artificial state of rest. The number used here is an attempt to reflect that without negatively impacting the ability for the application to detect Fliks and thus, numbers other than one-tenth may be used.

If processing logic determines that the Trigger Counter is Backward or Forward, then processing logic extract X-axis rotation values from the Movement data (processing block 409) and determines if the value is greater than one-tenth the Trigger value (processing block 410) and then transitions to processing block 411.

At processing block 411, processing logic stores the array of rotation values. Once the array of rotation values are stored, processing logic generates an average on the array values (processing block 412). In an alternative embodiment, after the array of rotation values are stored, processing logic removes outlying values if necessary (processing block 413) and then generates the average of the array values at processing block 412. Processing logic sets the Neutral State value to the average (processing block 414) and returns the Neutral state value (processing block 415).

Figure 5:
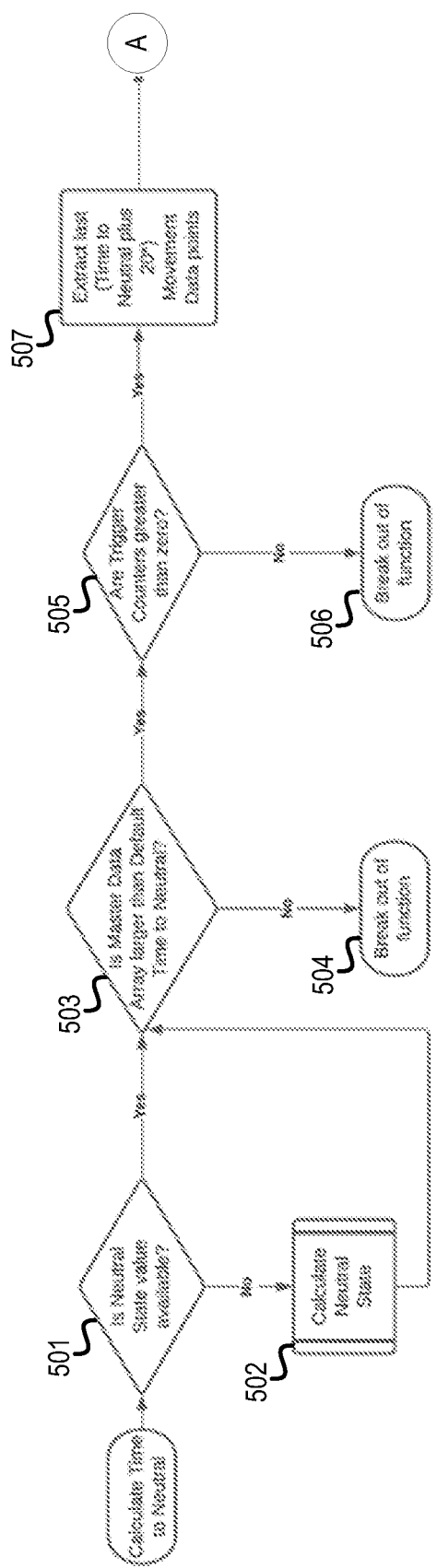
FIG. 5 is a flow diagram of one embodiment of a process for calculating a time to neutral value.
Figure 5:
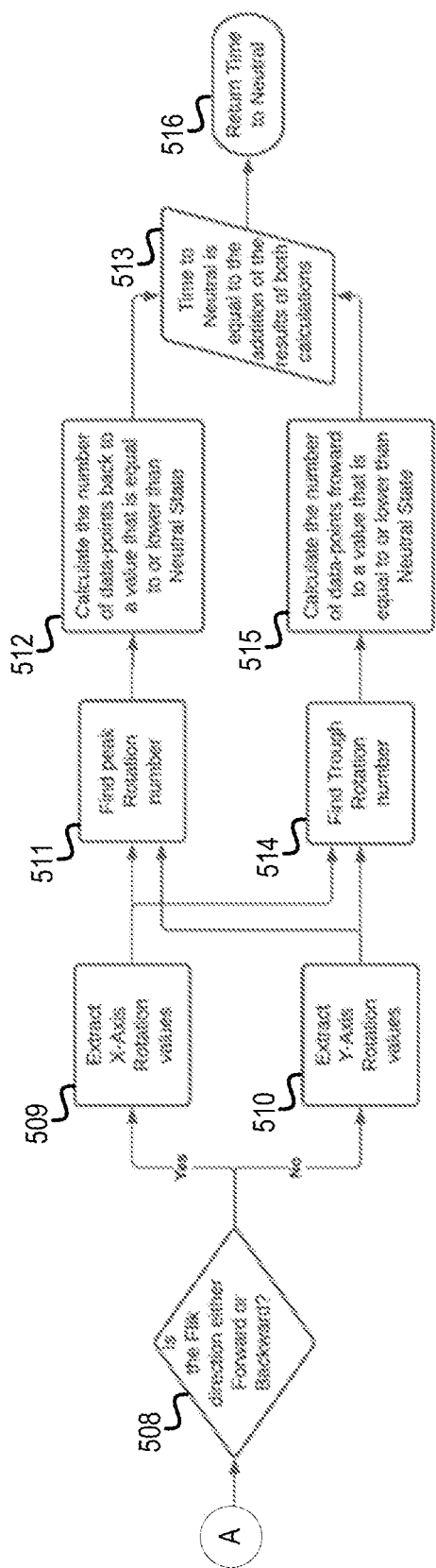

FIG. 5 is a flow diagram of one embodiment of a process for calculating a Time to Neutral value. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 5, the process begins by processing logic determining whether the Neutral State value is available (processing block 501). If not, processing logic calculates the Neutral State (processing block 502). If the Neutral State value is available or after calculating the Neutral State value, the process transitions to processing block 503 where processing logic tests whether the Master Data Array is larger than a default Time to Neutral value. If not, the process ends (processing block 504). If the Master Data Array is larger than the default Time to Neutral value, the process transitions of processing block 505 were processing logic tests whether the Trigger Counter values are greater than 0. If not, the process ends (processing block 506). If the Trigger Counter values are greater than 0, processing logic extracts a number of Movement Data points equal in number to the last (Time to Neutral plus 20). Note that 20 or a different number may be used for different embodiments, and that this number is a representative number to signify that there are enough values in the Data Array to proceed. This is because in some embodiments the Flik processing logic needs a minimum number of data points that would accurately reflect the flow Flik from start to finish.

After extracting the Movement Data points, processing logic tests whether the Flik direction is for a Backward or Forward Flik (processing block 509). If the Flik direction is Forward or Backward, processing logic extracts the X-axis rotation values (processing block 509) and the process continues. If not, the Flik direction is Left or Right and processing logic extracts the Y-axis rotation values (processing block 510). After extracting the X-axis rotation values or the Y-axis rotation values, processing logic finds the peak rotation number (processing block 511) and calculates the number of data point back to a value that is equal to or lower than the Neutral State value (processing block 512). Also after extracting the X-axis rotation values and the Y-axis rotation values, processing logic finds the Trough Rotation number representing the trough point on any given Flik (e.g., trough 313 of FIG. 3A) (processing block 514) and calculates the number of data points forward to a value that is equal to or lower than the Neutral State value (processing block 515).

Processing logic uses the number of data points back to the value that is equal to or lower than a Neutral State value and the number of data points that is forward to value that is equal to or lower than the Neutral State value to determine the Time to Neutral value (processing block 513). That is, processing logic sets the Time to Neutral value equal to the addition of the results of both the calculations of processing block 512 and 515. Thereafter, processing logic returns to Time to Neutral value (processing block 516).

Figure 6:
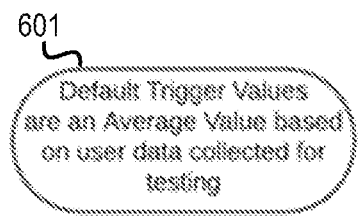
FIG. 6 illustrates one embodiment for a process for generating default trigger values.

FIG. 6 illustrates one embodiment for a process for generating default trigger values. Referring to FIG. 6, the process generating default trigger values comprises generating an average value based on user data collected for testing and optimization (processing block 601).

Figure 7:
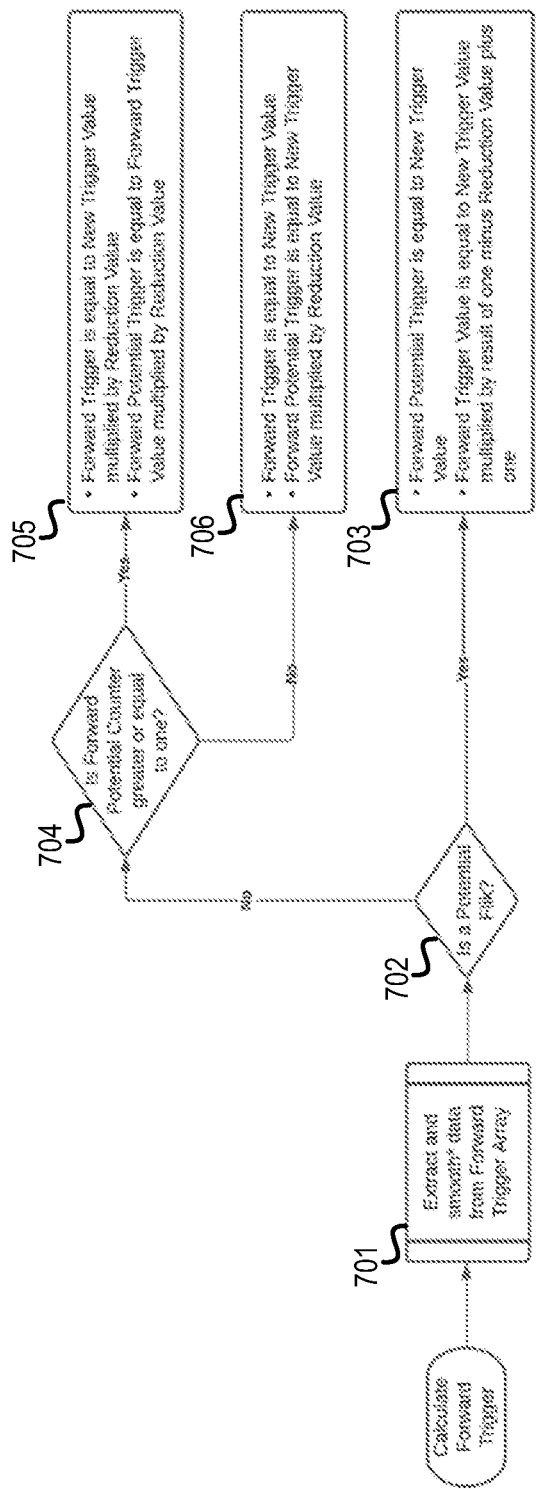
FIG. 7 is a flow diagram of one embodiment of a process for calculating forward trigger values.

FIG. 7 is a flow diagram of one embodiment of a process for calculating forward trigger values. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 7, the process begins by processing logic extracting and smoothing data from the forward trigger array (processing block 701). In some embodiments, smoothing data indicates that unrepresentative data points will be removed in order to ensure an accurate calculation. In some embodiments, this means that outlier minimum and maximum values are scrubbed; however, other forms of smoothing that are well-known in the art may be used.

After extracting smoothing data from the forward trigger array, processing logic tests whether there is a Potential Flik (processing block 702). If so, processing logic sets the Forward Potential Trigger value equal to the New Trigger value and the processing logic sets the Forward Trigger value equal to the result of multiplying the New Trigger value by the result of subtracting the sum of one minus Reduction value plus one (processing block 703).

If processing logic determines that there is not a potential Flik, the process transitions to processing block 704 where processing logic tests whether the Forward Potential Counter value is greater than or equal to 1. If it is, processing logic sets the Forward Trigger value equal to New Trigger value multiplied by Reduction value and sets the Forward Potential Trigger value equal to the Forward Trigger value multiplied by the Reduction value (processing block 705).

If processing logic determines that the Forward Potential Counter value is not greater to or equal to 1, processing logic sets the Forward Trigger value equal to the New Trigger value and sets the Forward Potential Trigger value equal to the New Trigger value multiplied by the Reduction value (processing block 706).

Figure 8:
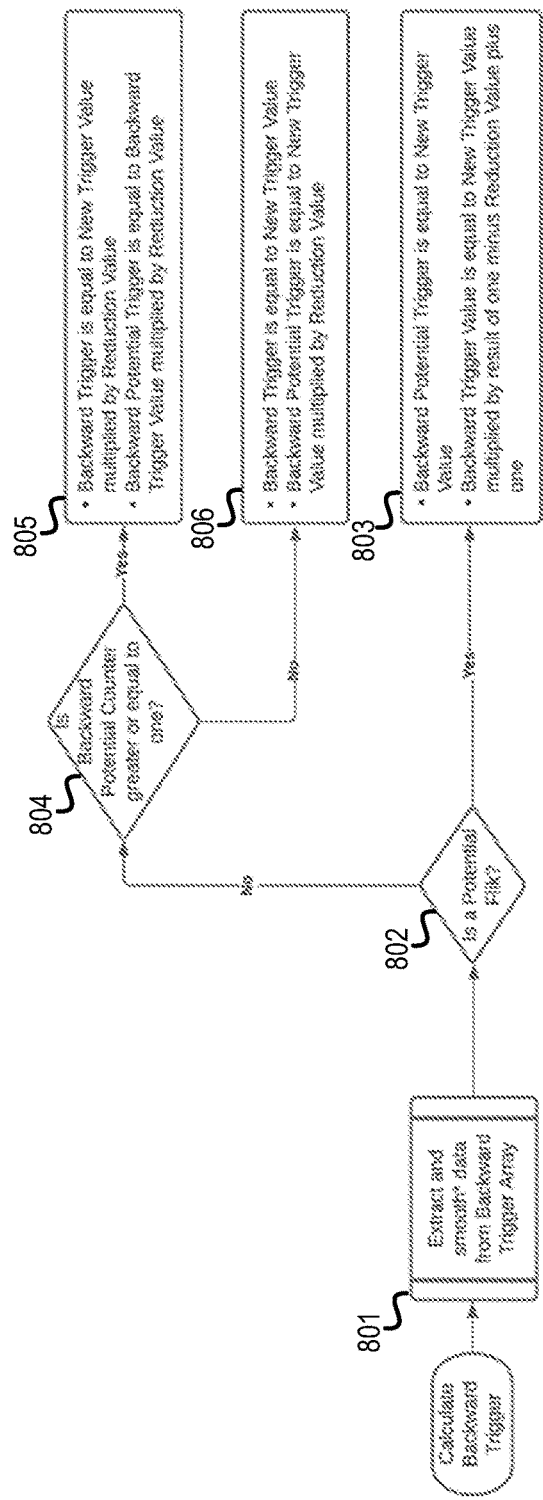
FIG. 8 is a flow diagram of one embodiment of a process for calculating backward trigger values.

FIG. 8 is a flow diagram of one embodiment of a process for calculating backward trigger values. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 8, the process begins by processing logic extracting and smoothing data from the Backward Trigger array (processing block 801). In some embodiments, smoothing data indicates that unrepresentative data points will be removed in order to ensure an accurate calculation. In some embodiments, this means that outlier minimum and maximum values are scrubbed; however, other forms of smoothing that are well-known in the art may be used.

After extracting smoothing data from the Backward Trigger array, processing logic tests whether there is a Potential Flik (processing block 802). If so, processing logic sets the Backward Potential Trigger value equal to the New Trigger value and the processing logic sets the Backward Trigger value equal to the result of multiplying the New Trigger value by the result of subtracting the sum of one minus Reduction value plus one (processing block 803).

If processing logic determines that there is not a potential Flik, the process transitions to processing block 804 where processing logic tests whether the Backward Potential Counter value is greater than or equal to 1. If it is, processing logic sets the Backward Trigger value equal to New Trigger value multiplied by Reduction value and sets the Backward Potential Trigger value equal to the Backward Trigger value multiplied by the Reduction value (processing block 805).

If processing logic determines that the Backward Potential Counter value is not greater to or equal to 1, processing logic sets the Backward Trigger value equal to the New Trigger value and sets the Backward Potential Trigger value equal to the New Trigger value multiplied by the Reduction value (processing block 806).

Figure 9:
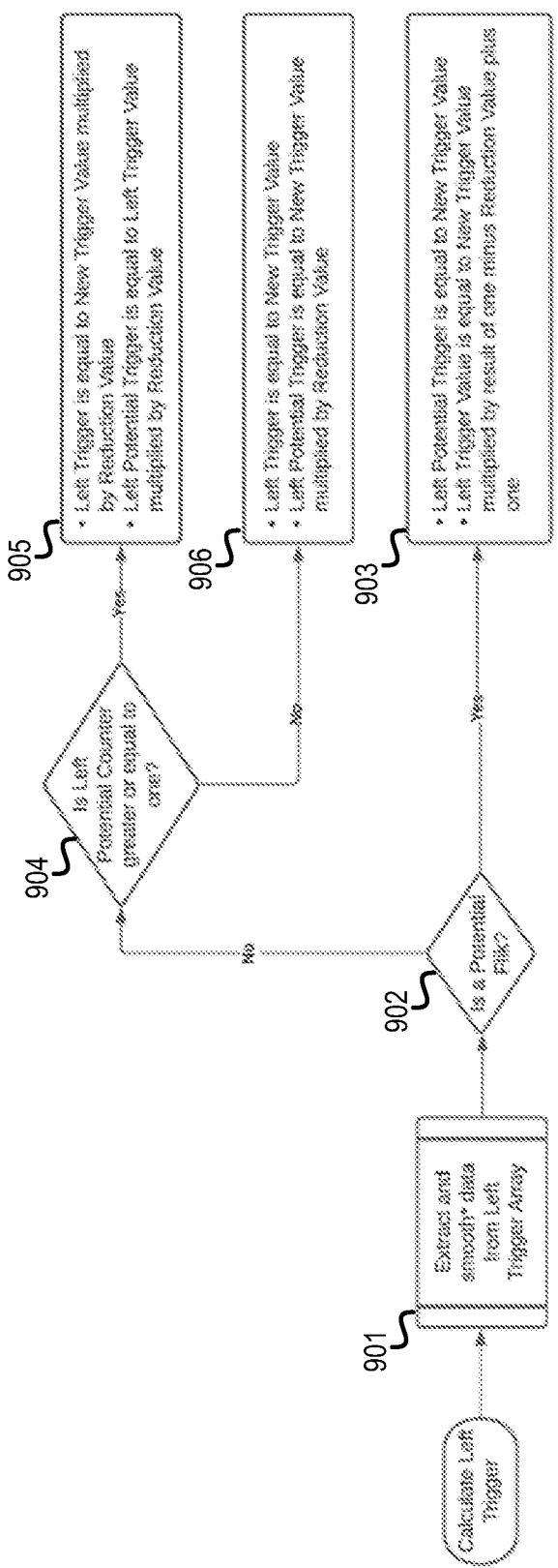
FIG. 9 is a flow diagram of one embodiment of a process for calculating left trigger values.

FIG. 9 is a flow diagram of one embodiment of a process for calculating left trigger values. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 9, the process begins by processing logic extracting and smoothing data from the Left Trigger array (processing block 901). In some embodiments, smoothing data indicates that unrepresentative data points will be removed in order to ensure an accurate calculation. In some embodiments, this means that outlier minimum and maximum values are scrubbed; however, other forms of smoothing that are well-known in the art may be used.

After extracting smoothing data from the Left Trigger array, processing logic tests whether there is a Potential Flik (processing block 902). If so, processing logic sets the Left Potential Trigger value equal to the New Trigger value and the processing logic sets the Left Trigger value equal to the result of multiplying the New Trigger value by the result of subtracting the sum of one minus Reduction value plus one (processing block 903).

If processing logic determines that there is not a potential Flik, the process transitions to processing block 904 where processing logic tests whether the Left Potential Counter value is greater than or equal to 1. If it is, processing logic sets the Left Trigger value equal to New Trigger value multiplied by Reduction value and sets the Left Potential Trigger value equal to the Left Trigger value multiplied by the Reduction value (processing block 905).

If processing logic determines that the Left Potential Counter value is not greater to or equal to 1, processing logic sets the Left Trigger value equal to the New Trigger value and sets the Left Potential Trigger value equal to the New Trigger value multiplied by the Reduction value (processing block 906).

Figure 10:
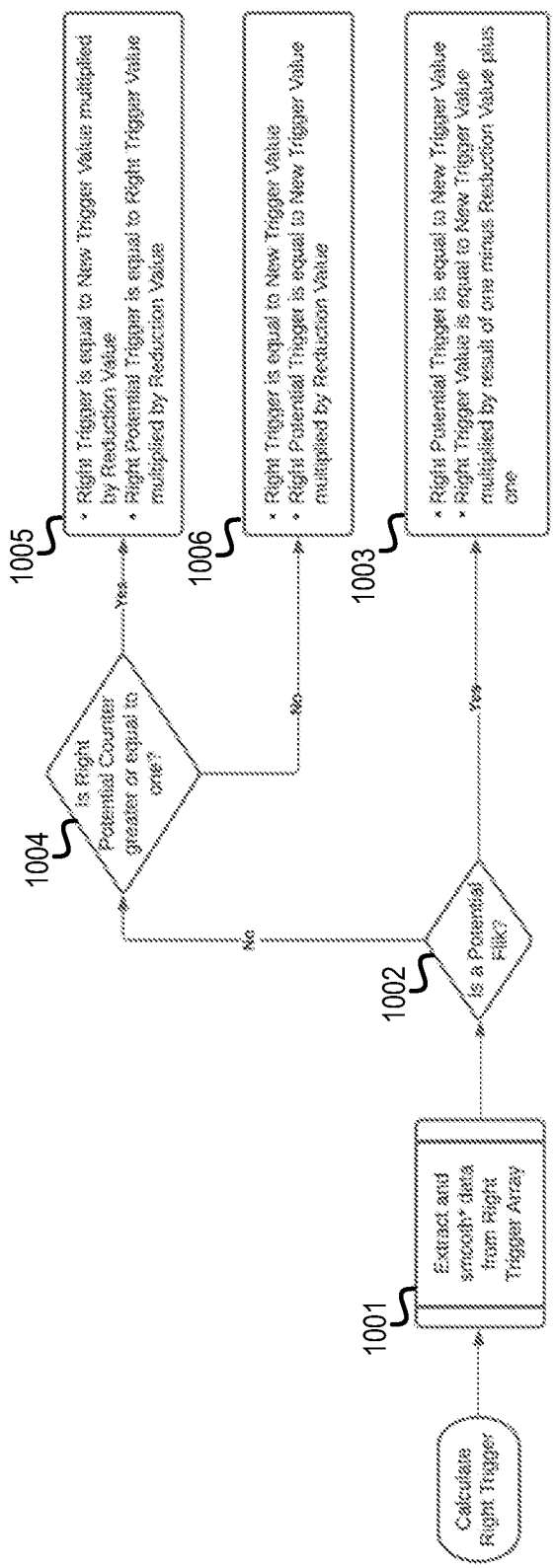
FIG. 10 is a flow diagram of one embodiment of a process for calculating right trigger values.

FIG. 10 is a flow diagram of one embodiment of a process for calculating right trigger values. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 10, the process begins by processing logic extracting and smoothing data from the Right Trigger array (processing block 1001). In some embodiments, smoothing data indicates that unrepresentative data points will be removed in order to ensure an accurate calculation. In some embodiments, this means that outlier minimum and maximum values are scrubbed; however, other forms of smoothing that are well-known in the art may be used.

After extracting smoothing data from the forward trigger array, processing logic tests whether there is a Potential Flik (processing block 1002). If so, processing logic sets the Right Potential Trigger value equal to the New Trigger value and the processing logic sets the Right Trigger value equal to the result of multiplying the New Trigger value by the result of subtracting the sum of one minus Reduction value plus one (processing block 1003).

If processing logic determines that there is not a potential Flik, the process transitions to processing block 1004 where processing logic tests whether the Right Potential Counter value is greater than or equal to 1. If it is, processing logic sets the Right Trigger value equal to New Trigger value multiplied by Reduction value and sets the Right Potential Trigger value equal to the Right Trigger value multiplied by the Reduction value (processing block 1005).

If processing logic determines that the Right Potential Counter value is not greater to or equal to 1, processing logic sets the Right Trigger value equal to the New Trigger value and sets the Right Potential Trigger value equal to the New Trigger value multiplied by the Reduction value (processing block 1006).

Figure 11:
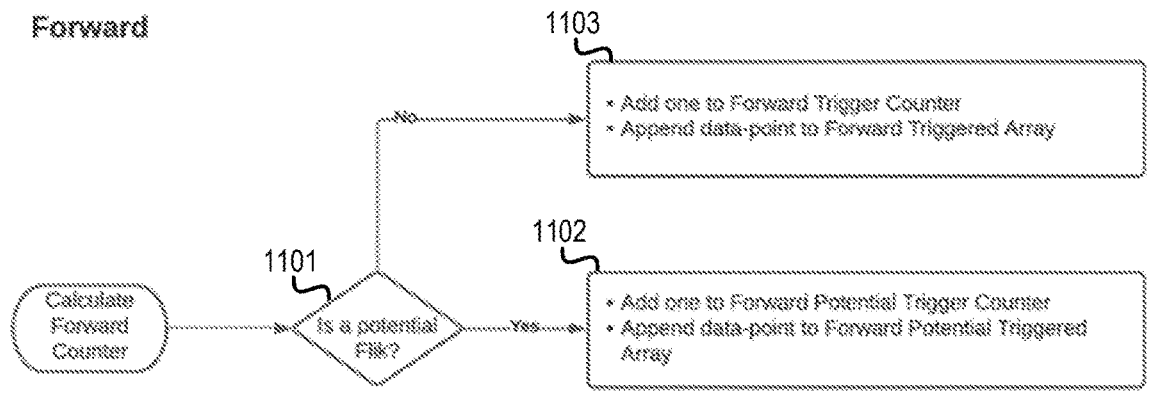
FIG. 11 is a flow diagram of one embodiment of a process for calculating a forward counter.

FIG. 11 is a flow diagram of one embodiment of a process for calculating a forward counter value. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 11, the process begins by processing logic determining if a potential Flik has occurred (processing block 1101). If processing logic determines that a potential Flik has occurred, processing logic adds 1 to the Forward Potential Trigger Counter value and appends a data point to the Forward Potential Triggered Array (processing block 1102). If processing logic determines that there was not a potential Flik, processing logic adds one to the Forward Trigger Counter value and appends the data point to the Forward Triggered Array (processing block 1103).

Figure 12:
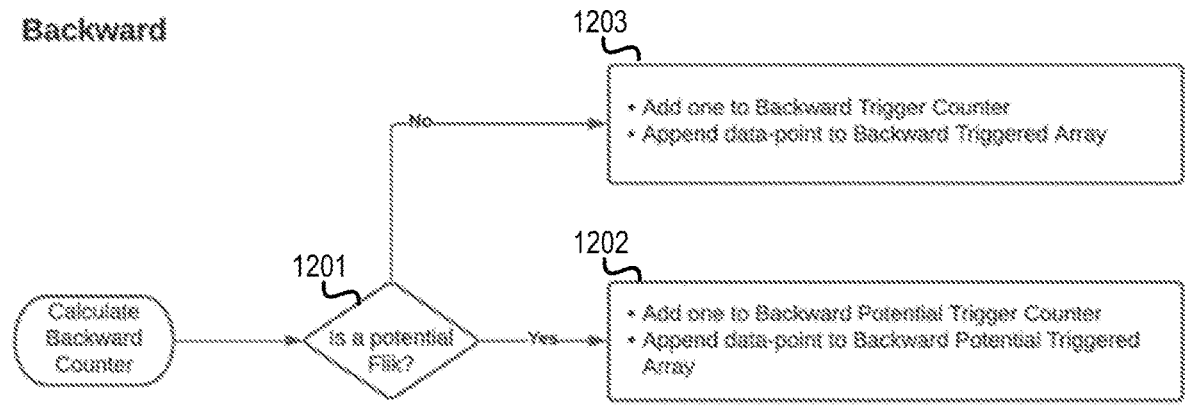
FIG. 12 is a flow diagram of one embodiment of a process for calculating a backward counter.

FIG. 12 is a flow diagram of one embodiment of a process for calculating a backward counter value. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 12, the process begins by processing logic determining if a potential Flik has occurred (processing block 1201). If processing logic determines that a potential Flik has occurred, processing logic adds one to the Backward Potential Trigger Counter value and appends a data point to the Backward Potential Triggered Array (processing block 1202). If processing logic determines that there was not a potential Flik, processing logic adds one to the Backward Trigger Counter value and appends the data point to the Backward Triggered Array (processing block 1203).

Figure 13:
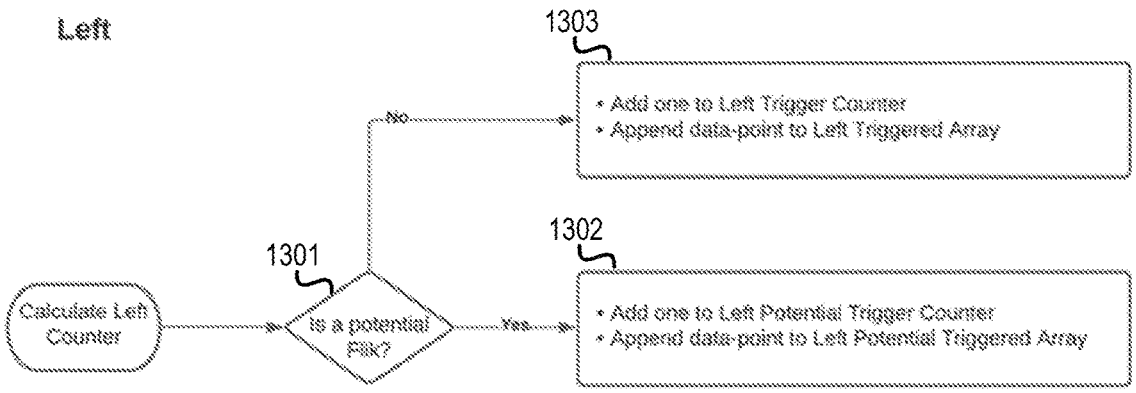
FIG. 13 is a flow diagram of one embodiment of a process for calculating a left counter.

FIG. 13 is a flow diagram of one embodiment of a process for calculating a left counter value. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 13, the process begins by processing logic determining if a potential Flik has occurred (processing block 1301). If processing logic determines that a potential Flik has occurred, processing logic adds one to the Left Potential Trigger Counter value and appends a data point to the Left Potential Triggered Array (processing block 1302). If processing logic determines that there was not a potential Flik, processing logic adds one to the Left Trigger Counter value and appends the data point to the Left Triggered Array (processing block 1303).

Figure 14:
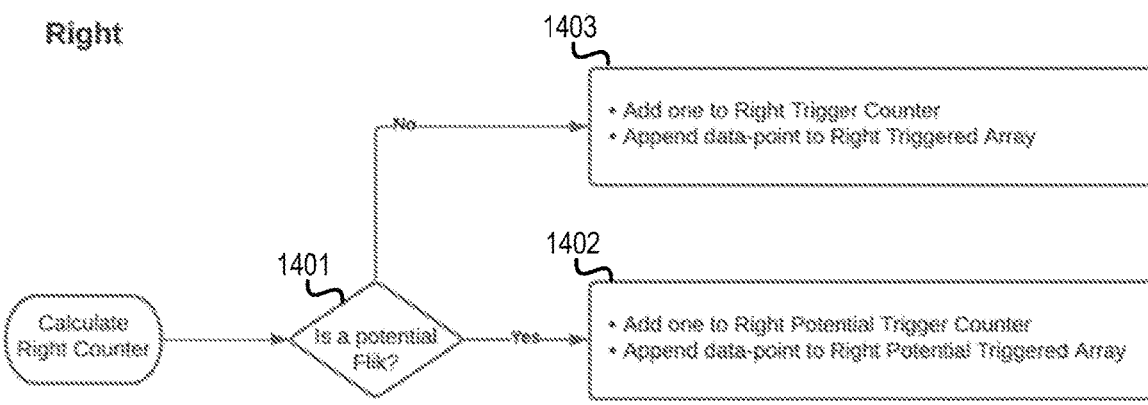
FIG. 14 is a flow diagram of one embodiment of a process for calculating a right counter.

FIG. 14 is a flow diagram of one embodiment of a process for calculating a right counter value. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 14, the process begins by processing logic determining if a potential Flik has occurred (processing block 1401). If processing logic determines that a potential Flik has occurred, processing logic adds one to the Right Potential Trigger Counter value and appends a data point to the Right Potential Triggered Array (processing block 1402). If processing logic determines that there was not a potential Flik, processing logic adds one to the Right Trigger Counter value and appends the data point to the Right Triggered Array (processing block 1403).

Figure 15:
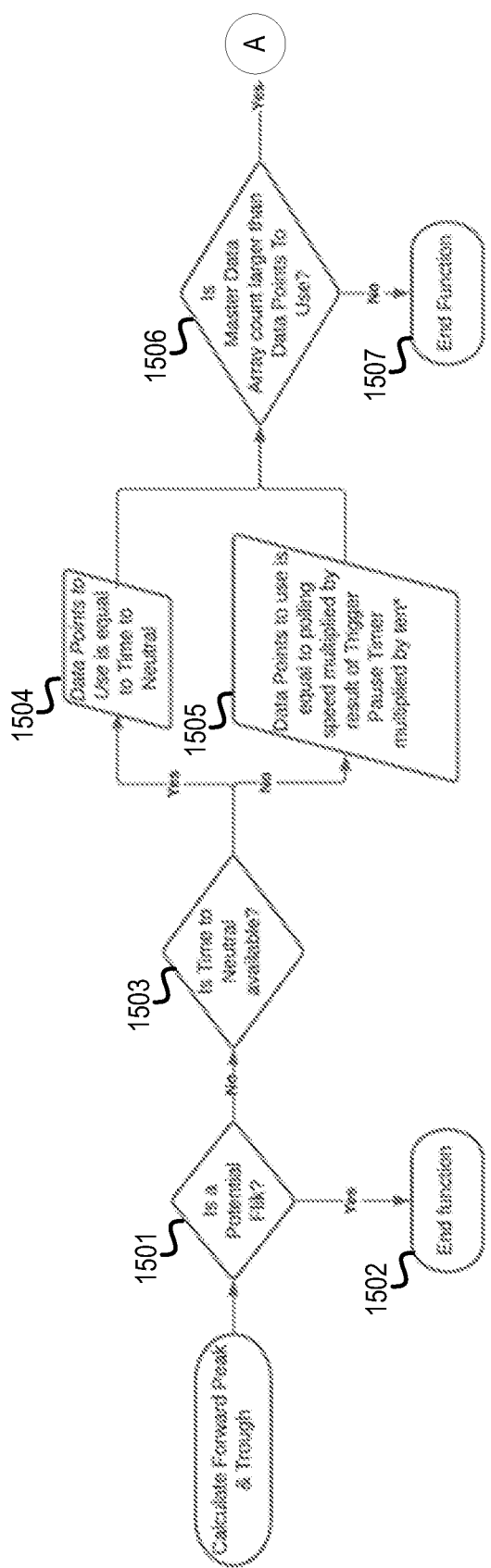
FIG. 15 is a flow diagram of one embodiment of a process for calculating the forward peak and trough values.
Figure 15:
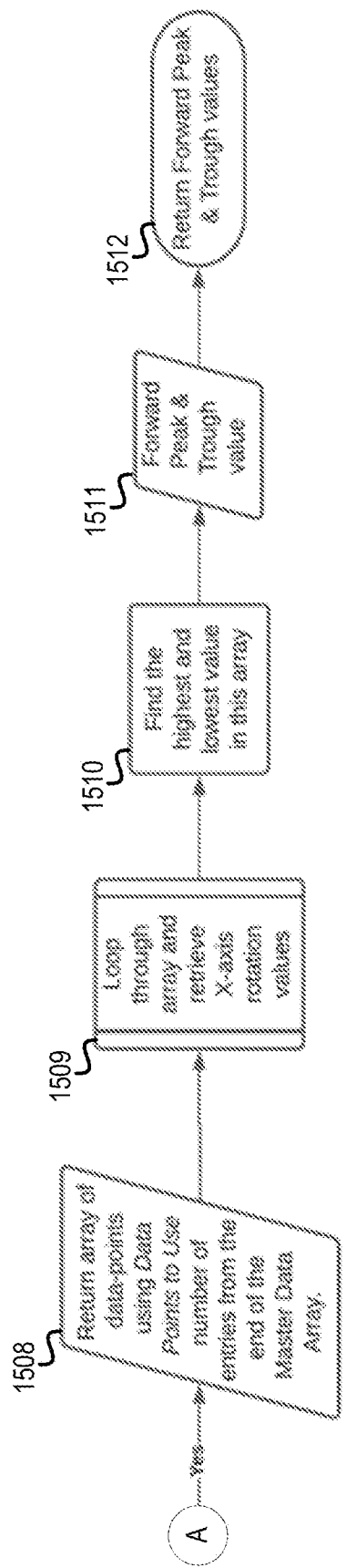

FIG. 15 illustrates one embodiment of a process for calculating Forward Peak and Trough values. Peak and trough values are used after a Flik is triggered and are used to smooth the curve of Fliks and enables the Flik processing logic to determine the most accurate way the user is moving the phone by helping determine if the trigger point is too high or too low. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 15, the process begins by processing logic checking whether a Potential Flik exists (processing block 1501). If there is a potential Flik, the process ends (processing block 1502). If a potential Flik has not been identified, the process transitions to processing block 1503 where processing logic test whether the Time to Neutral value is available.

If the Time to Neutral value is available, processing logic sets the Data Points to Use are set equal to the Time to Neutral value, where the Data Points to Use variable is used to store the number of data points required for the current computation (as used in processing blocks 1506 and 1508 below) (processing block 1504). If the Time to Neutral value is not available, processing logic sets the Data Points to Use equal to the polling speed multiplied by the result of multiplying the Trigger Pause Timer value by a predetermined number (e.g., 10), where the Trigger Pause Timer value is a variable that holds the amount of time the system pauses between identifying a Flik (processing block 1505). In some embodiments, the predetermined number, 10 in this case, is a representative number to reflect an average number of data points required for this process if the Time to Neutral value is not available. By doing so, the Flik processing logic is ensured of having enough data to accurately reflect an average Flik.

After determining the Data points to Use, processing logic test whether the Master Data Array count is larger than the Data Points to Use (processing block 1506). If the Master Data Count Array count is not larger than the Data Points to Use, the process ends (processing block 1507). If the Master Data Array count is larger than the Data Points to use, processing logic returns the Array of Data Points using Data Points to Use number of entries from the end of the Mater Data Array (processing block 1508). Next, processing logic loops through the Array and retrieves the X-axis rotation values (processing block 1509) and finds the highest and lowest values in this Array (processing block 1510). These highest and lowest values in the Array are the Forward Peak and Trough values (processing block 1511) and those are returned (processing block 1512).

Figure 16:
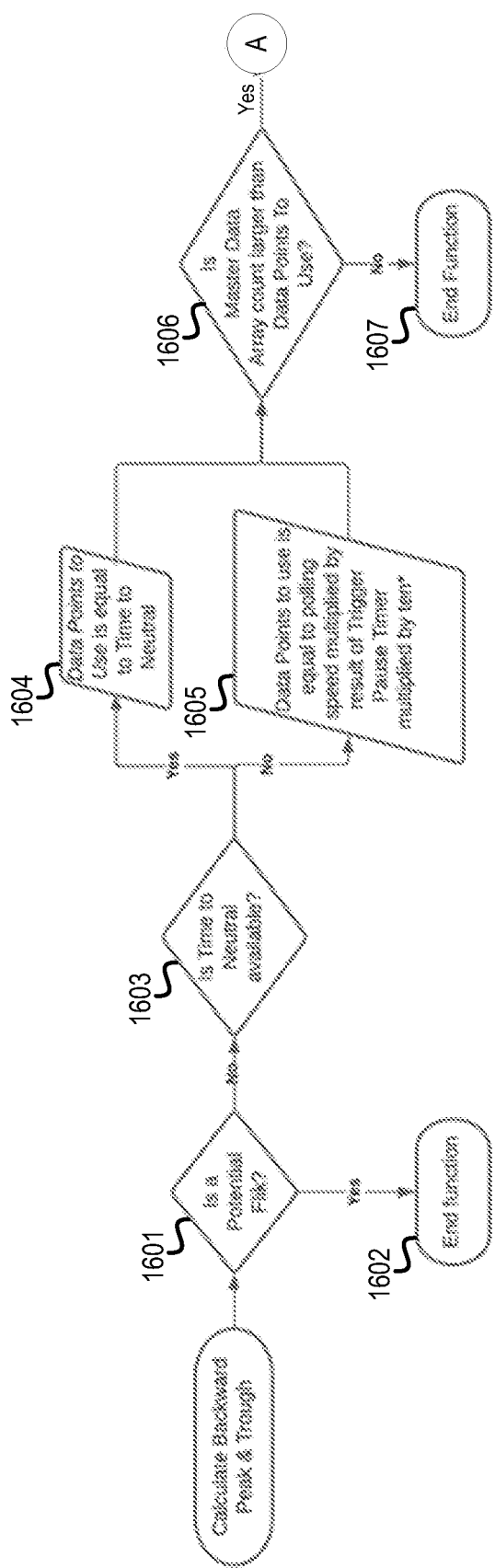
FIG. 16 is a flow diagram of one embodiment of a process for calculating the backward peak and trough values.
Figure 16:
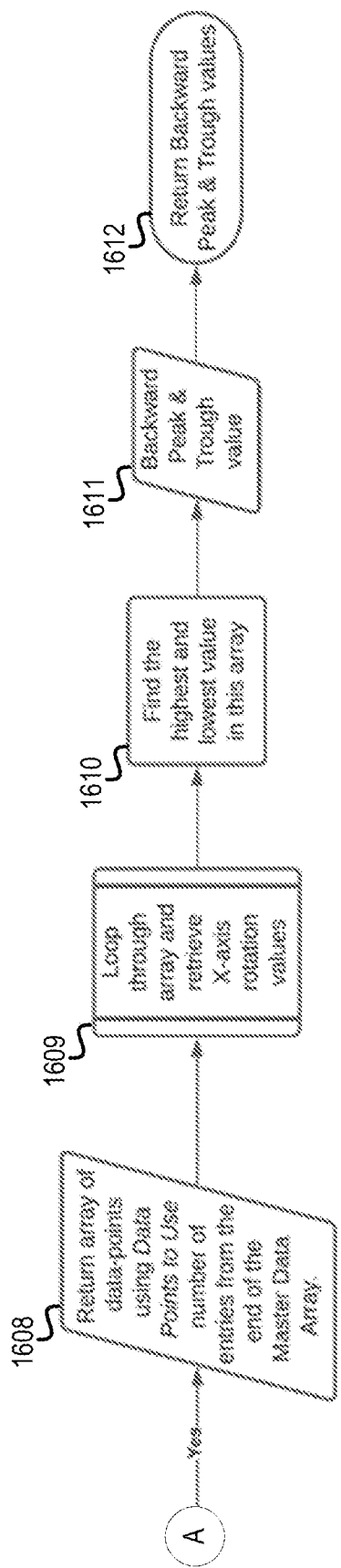

FIG. 16 illustrates one embodiment of a process for calculating Backward Peak and Trough values. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 16, the process begins by processing logic checking whether a Potential Flik exists (processing block 1601). If there is a potential Flik, the process ends (processing block 1602). If a potential Flik has not been identified, the process transitions to processing block 1603 where processing logic test whether the Time to Neutral value is available.

If the Time to Neutral value is available, processing logic sets the Data Points to Use are set equal to the Time to Neutral value (processing block 1604). If the Time to Neutral value is not available, processing logic sets the Data Points to Use equal to the polling speed multiplied by the result of multiplying the Trigger Pause Timer value by a predetermined number (e.g., 10) (processing block 1605). In some embodiments, the predetermined number, ten in this case, is a representative number to reflect an average number of data points required for this process if the Time to Neutral value is not available. By doing so, the Flik processing logic is ensured of having enough data to accurately reflect an average Flik.

After determining the Data points to Use, processing logic test whether the Master Data Array count is larger than the Data Points to Use (processing block 1606). If the Master Data Count Array count is not larger than the Data Points to Use, the process ends (processing block 1607). If the Master Data Array count is larger than the Data Points to use, processing logic returns the Array of Data Points using Data Points to Use number of entries from the end of the Mater Data Array (processing block 1608). Next, processing logic loops through the Array and retrieves the X-axis rotation values (processing block 1609) and finds the highest and lowest values in this Array (processing block 1610). These highest and lowest values in the Array are the Backward Peak and Trough values (processing block 1611) and those are returned (processing block 1612).

Figure 17:
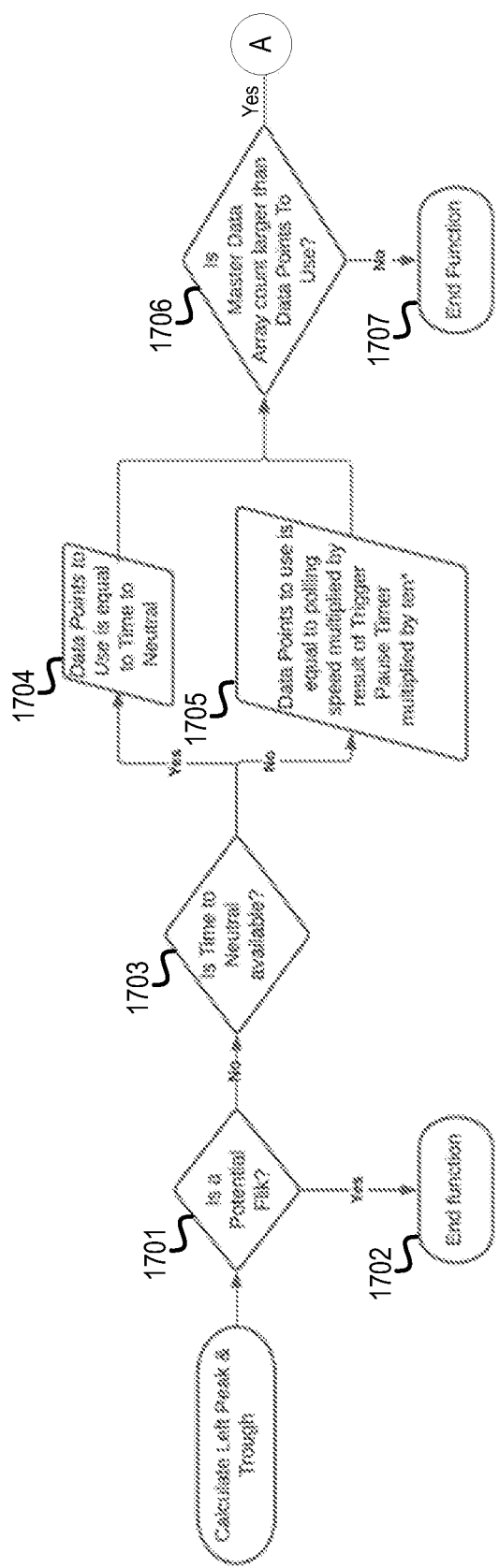
FIG. 17 is a flow diagram of one embodiment of a process for calculating the left peak and trough values.
Figure 17:
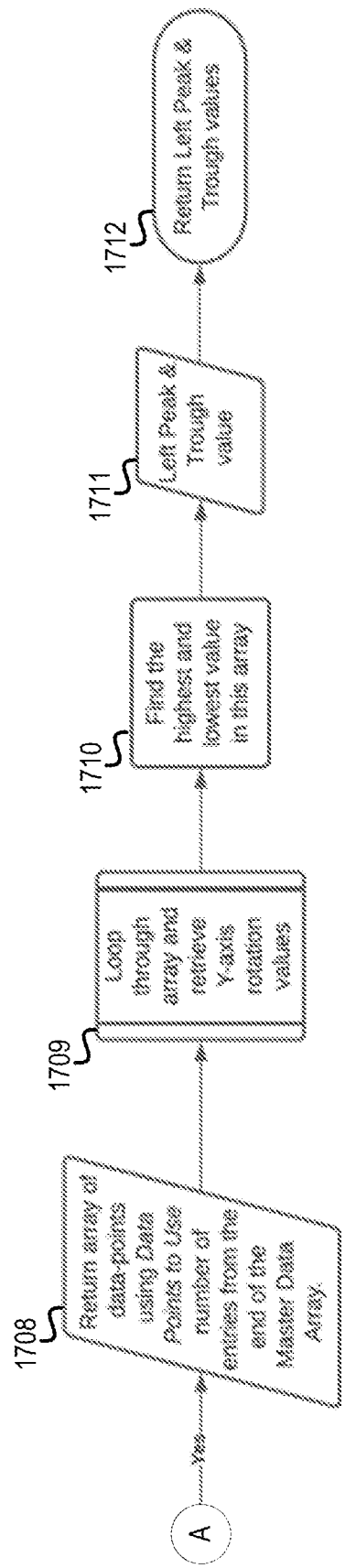

FIG. 17 illustrates one embodiment of a process for calculating Left Peak and Trough values. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 17, the process begins by processing logic checking whether a Potential Flik exists (processing block 1701). If there is a potential Flik, the process ends (processing block 1702). If a potential Flik has not been identified, the process transitions to processing block 1703 where processing logic test whether the Time to Neutral value is available.

If the Time to Neutral value is available, processing logic sets the Data Points to Use are set equal to the Time to Neutral value (processing block 1704). If the Time to Neutral value is not available, processing logic sets the Data Points to Use equal to the polling speed multiplied by the result of multiplying the Trigger Pause Timer value by a predetermined number (e.g., 10) (processing block 1705). In some embodiments, the predetermined number, ten in this case, is a representative number to reflect an average number of data points required for this process if the Time to Neutral value is not available. By doing so, the Flik processing logic is ensured of having enough data to accurately reflect an average Flik.

After determining the Data points to Use, processing logic test whether the Master Data Array count is larger than the Data Points to Use (processing block 1706). If the Master Data Count Array count is not larger than the Data Points to Use, the process ends (processing block 1707). If the Master Data Array count is larger than the Data Points to use, processing logic returns the Array of Data Points using Data Points to Use number of entries from the end of the Mater Data Array (processing block 1708). Next, processing logic loops through the Array and retrieves the X-axis rotation values (processing block 1709) and finds the highest and lowest values in this Array (processing block 1710). These highest and lowest values in the Array are the Left Peak and Trough values (processing block 1711) and those are returned (processing block 1712).

Figure 18:
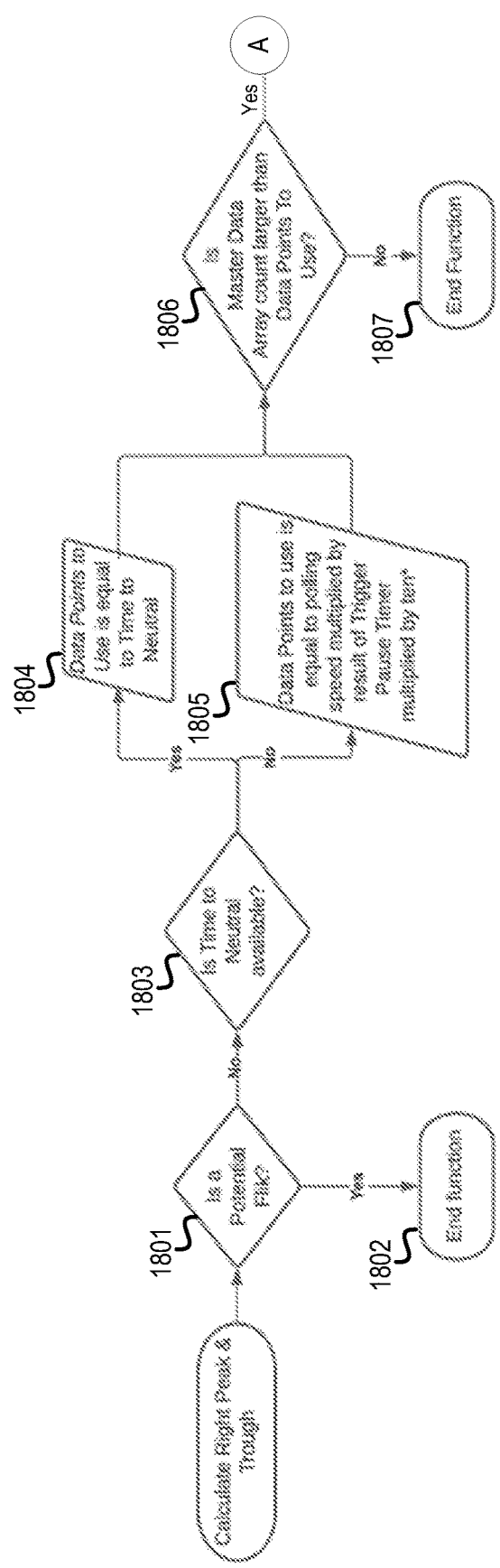
FIG. 18 is a flow diagram of one embodiment of a process for calculating the right peak and trough values.
Figure 18:
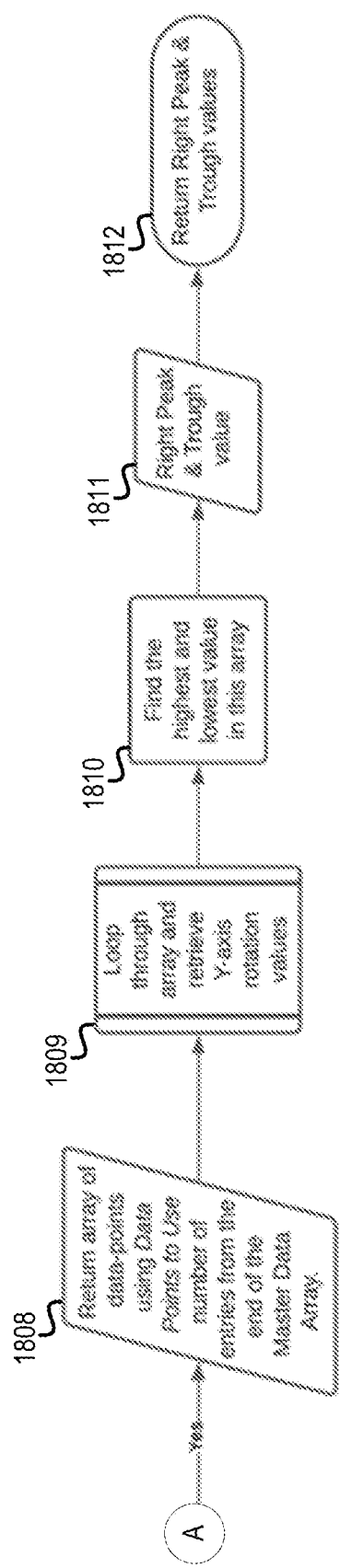

FIG. 18 illustrates one embodiment of a process for calculating Right Peak and Trough values. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 18, the process begins by processing logic checking whether a Potential Flik exists (processing block 1801). If there is a potential Flik, the process ends (processing block 1802). If a potential Flik has not been identified, the process transitions to processing block 1803 where processing logic test whether the Time to Neutral value is available.

If the Time to Neutral value is available, processing logic sets the Data Points to Use are set equal to the Time to Neutral value (processing block 1804). If the Time to Neutral value is not available, processing logic sets the Data Points to Use equal to the polling speed multiplied by the result of multiplying the Trigger Pause Timer value by a predetermined number (e.g., 10) (processing block 1805). In some embodiments, the predetermined number, ten in this case, is a representative number to reflect an average number of data points required for this process if the Time to Neutral value is not available. By doing so, the Flik processing logic is ensured of having enough data to accurately reflect an average Flik.

After determining the Data points to Use, processing logic test whether the Master Data Array count is larger than the Data Points to Use (processing block 1806). If the Master Data Count Array count is not larger than the Data Points to Use, the process ends (processing block 1807). If the Master Data Array count is larger than the Data Points to use, processing logic returns the Array of Data Points using Data Points to Use number of entries from the end of the Mater Data Array (processing block 1808). Next, processing logic loops through the Array and retrieves the X-axis rotation values (processing block 1809) and finds the highest and lowest values in this Array (processing block 1810). These highest and lowest values in the Array are the Right Peak and Trough values (processing block 1811) and those are returned (processing block 1812).

Figure 19:
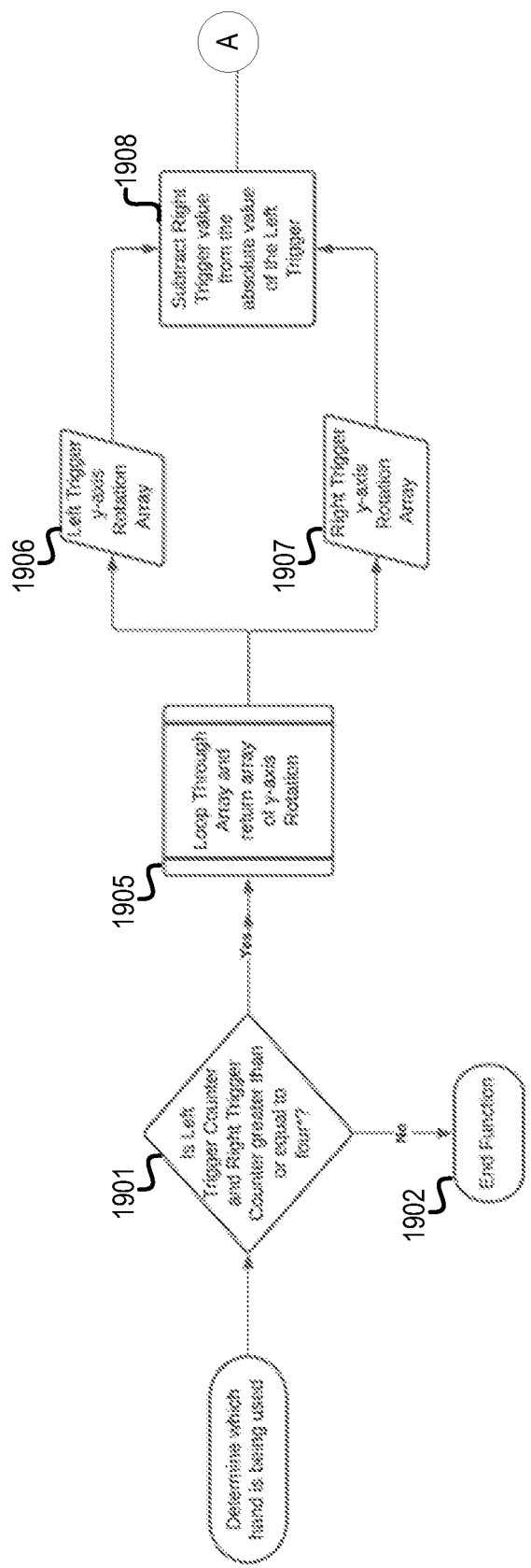
FIG. 19 is a flow diagram of one embodiment of a process for determining the hand that is being used by the user to hold an electronic portable device.
Figure 19:
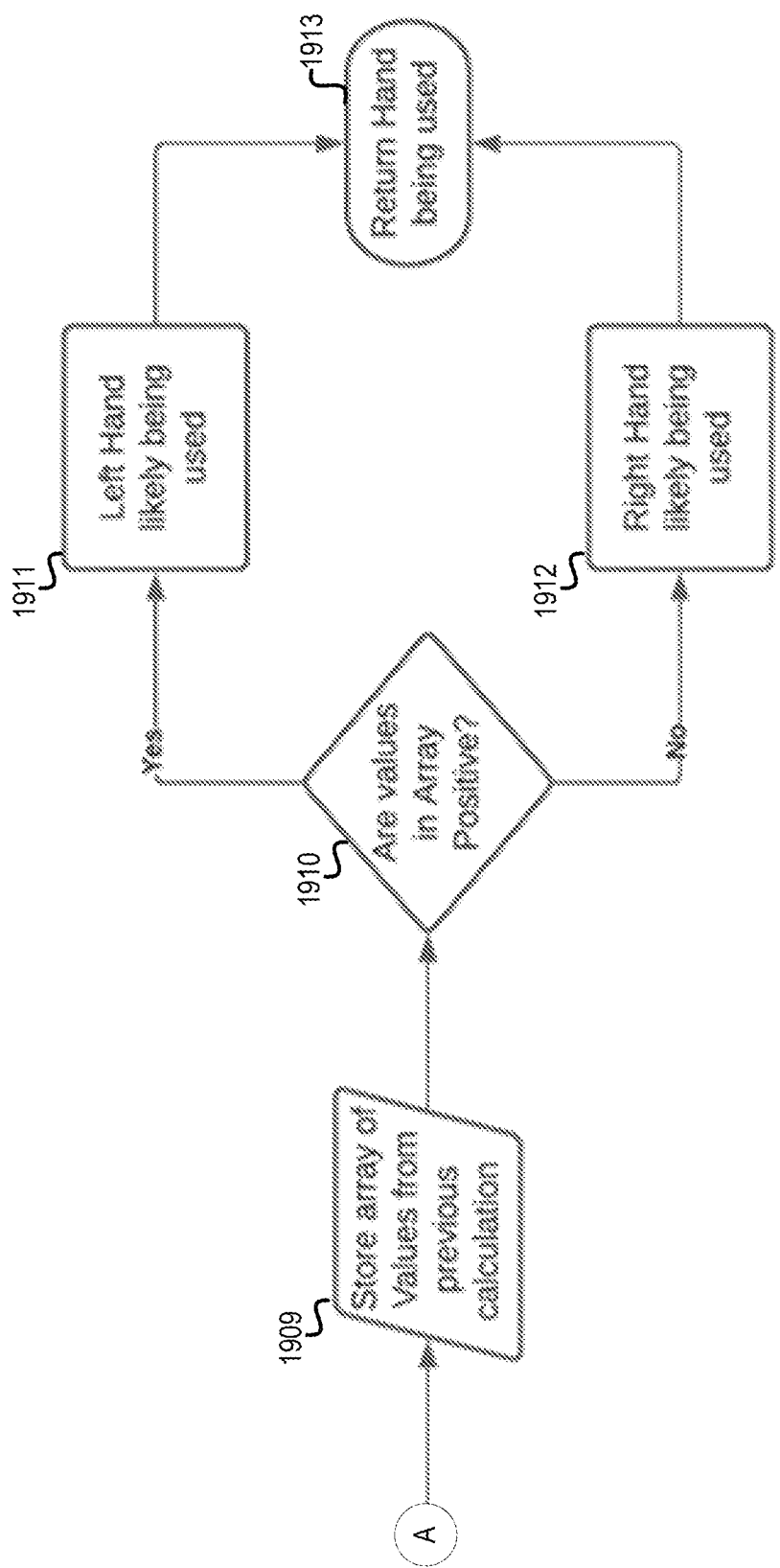

FIG. 19 illustrates one embodiment of a process for determining the hand that is being used by the user to hold the device. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 19, the process begins by processing logic checking whether the Left Trigger Counter value and the Right Trigger Counter value are greater than or equal to a predetermined number (processing block 1901). In some embodiments, the predetermined number is four. Note the predetermined number is a representative number to reflect an average number of data points required for this process. In some embodiments, the system requires a minimum number of Fliks in either direction to be able to accurately compare them and make a determination.

After determining whether the Left Trigger Counter value and Right Trigger Counter value are greater than or equal to the predetermined number (e.g., 4), processing logic loops through the array and returns the array of Y-axis rotation values. After doing so, processing logic creates the Left Trigger Y-axis rotation array (processing block 1906) and the Right Trigger Y-axis rotation array (processing block 1907), and subtracts the Right Trigger value from the absolute value of the Left Trigger value (processing block 1908). After the subtraction, processing logic stores the array of values from this previous calculation (processing block 1909).

Next, processing logic tests whether the values in the array are positive (processing block 1910). If not, processing logic concludes that the right hand is likely being used to hold the device (processing block 1912). If the values in the array are positive, processing logic determines that the left hand is likely being used to hold the device (processing block 1911). Processing logic them returns an indication of the hand that was determined to be in use (processing block 1913).

Figure 20:
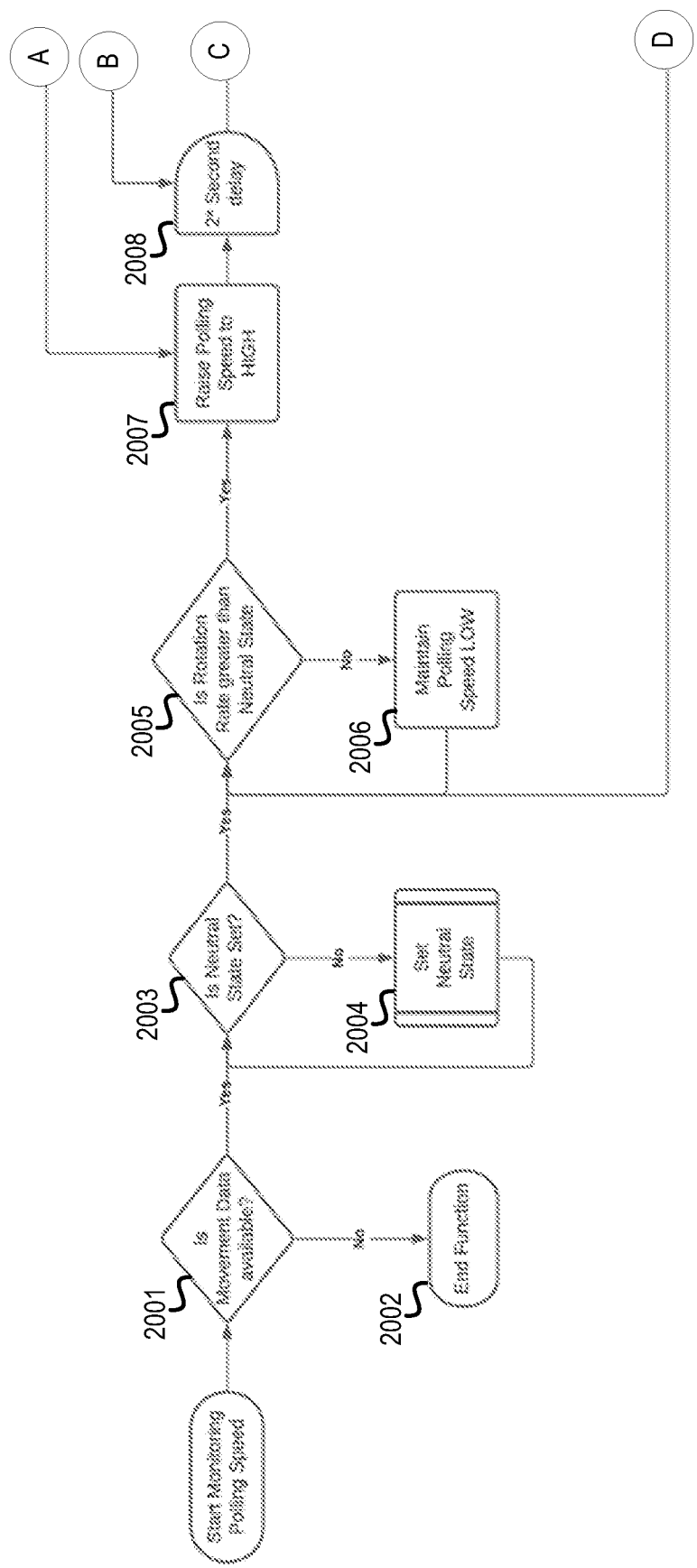
FIG. 20 is a flow diagram of one embodiment of a process for starting to monitor the polling speed.
Figure 20:
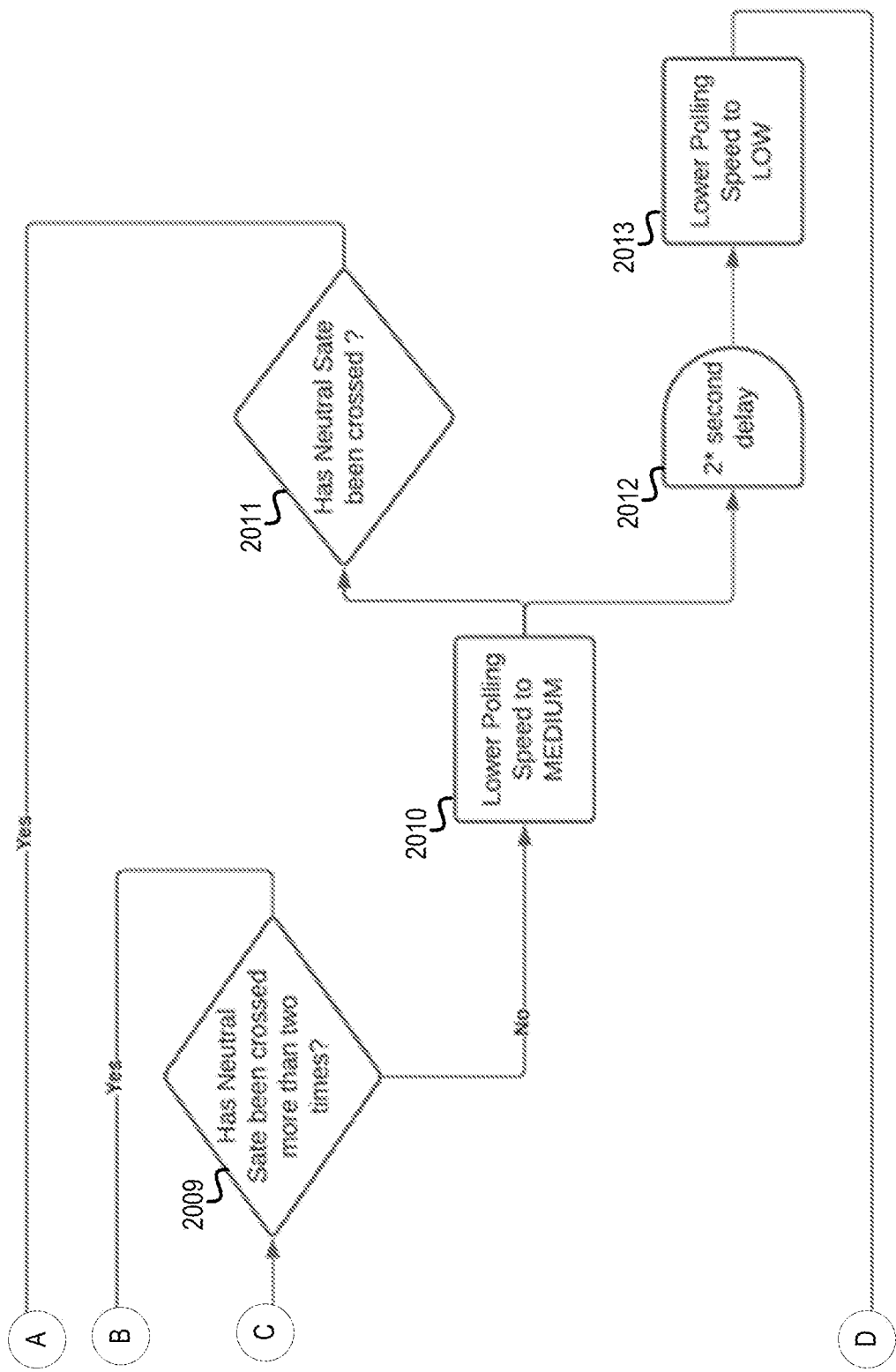

FIG. 20 is a flow diagram of one embodiment of a process for monitoring polling speed. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 20, the process begins by processing logic determining whether the Movement Data is available (processing block 2001). If not, the process ends (processing block 2002). If Movement Data is available, the process transitions to processing block 2003 where processing logic checks whether the Neutral State value is set. If not, processing logic sets the Neutral State value (processing block 2004) and transitions back to processing block 2003.

If the Neutral State value has been set, processing logic transitions to processing block 2005 where processing logic determines if the rotation rate is greater than the Neutral State value. If not, processing logic maintains the Polling Speed as low (processing block 2006) and transitions back to processing block 2005. If processing logic determines that the rotation rate is greater than the neutral state, the processing logic raises the Polling Speed to high (processing block 2007) and allows a delay to occur to identify if the Neutral State threshold has been crossed twice during that time (processing block 2008). In some embodiments, a predetermined number of seconds is used to delay is a representative number of a likely pause time to allow for further actions to occur that the system will use to make a determination of when to lower the polling speed. In some embodiments, the delay is a 2 second delay. In alternative embodiments, delays of other sizes are used.

After the delay has transpired, processing logic checks whether the Neutral State value has been crossed more than two times (processing block 2009). If so, processing logic returns to processing block 2008 to wait for another delay. If not, processing logic lowers the Polling Speed to medium (processing block 2010). Next, processing logic determines if the Neutral State has been crossed (processing block 2011). If it has, processing logic transitions back to processing block 2007 where the polling speed is raised to high again.

At processing block 2012, a delay of a predetermined number of seconds occurs and this occurs right after processing block 2010. In some embodiments, the predetermined delay is a two second delay. After the two second delay has transpired, if the Neutral State hasn't been crossed, then processing logic lowers the polling speed to low (processing block 2013). The process then transitions back to processing block 2005 to allow the system to raise the polling speed when needed in the future.

As discussed above, the Polling Speed is three variables that hold predetermined speeds for the speed at which the device measures movements. For example, in some embodiments, low is equal to 0.38, medium is equal to 0.25 and high is equal to 0.1, however, these values can be changed depending on, for example, optimizations for better battery life or other reasons.

Figure 21:
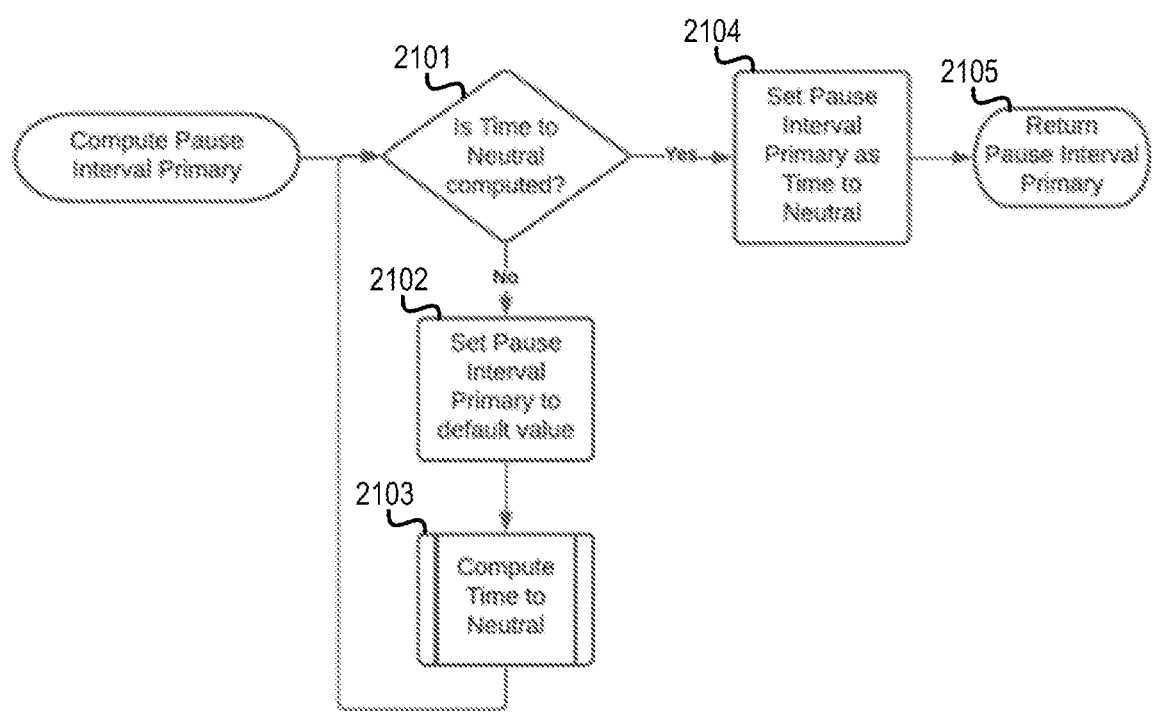
FIG. 21 is a flow diagram of one embodiment of a process for computing the pause interval primary.

FIG. 21 is a flow diagram of one embodiment of a process for computing the Pause Interval Primary value. Pauses are used by the Flik processing logic to ensure that another unintended Flik isn't registered when the device is being returned to a neutral state as part of the initial Flik. The pause length is based on Time to Neutral value. Once there is enough data to determine how long it takes to perform a Flik for a specific user, the Flik processing logic uses that as the pause time to ensure that once a Flik is registered, then registering another Flik in the opposite direction (due to the device returning to its initial state) will not occur. In other words, any possible unintended Flik occurring during the pause time is not registered.

In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 21, the process begins by processing logic determining whether the Time to Neutral value has been computed (processing block 2101). If not, processing logic sets the Pause Interval Primary value to a default value (e.g., 0.7) (processing block 2102), computes the Time to Neutral value (processing block 2103), and returns to processing block 2101. In some embodiments, the default value is based on an average time determined from user data. In some embodiments, the Flik processing logic needs such a value set for Pause Interval Primary before the user can begin using the device; otherwise the Flik processing logic would not be able to distinguish between an intended and unintended Flik.

If the Time to Neutral value has been computed, processing logic sets the Pause Interval Primary to the Time to Neutral value (processing block 2104) and returns to the Pause Interval Primary value (processing block 2105).

Figure 22:
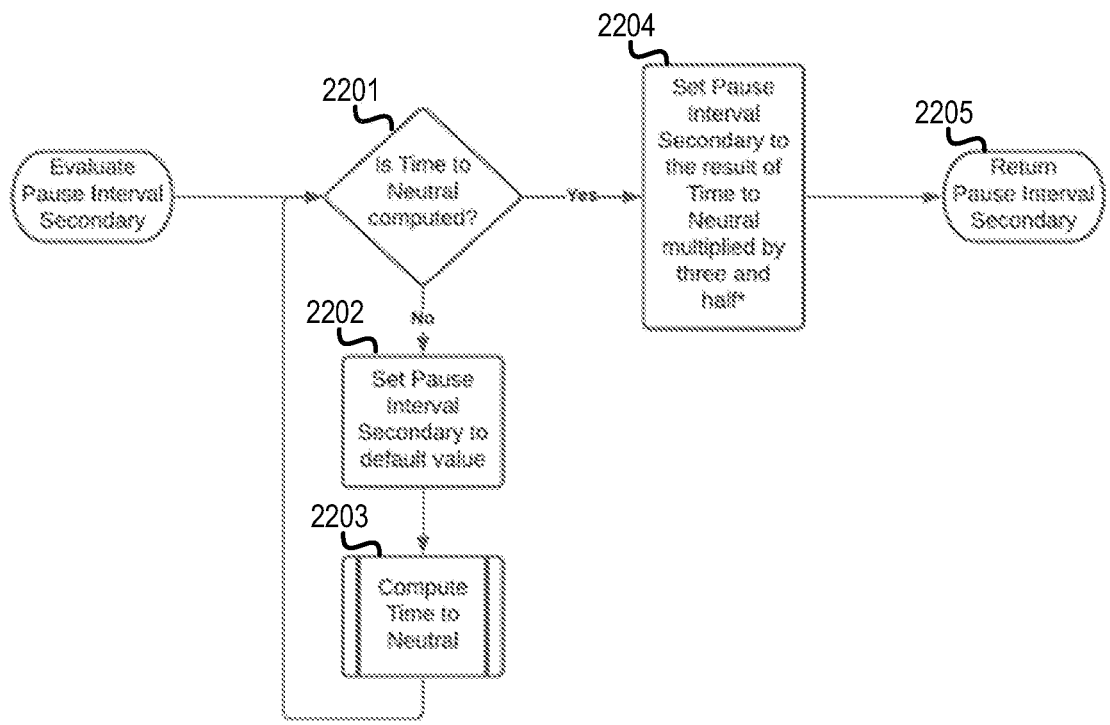
FIG. 22 is a flow diagram of one embodiment of a process for evaluating the pause interval secondary.

FIG. 22 is a flow diagram of one embodiment of a process for evaluating the Pause Interval Secondary value. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 22, the process begins by processing logic determining whether the Time to Neutral is computed (processing block 2201). If not, processing logic sets the Pause Interval Secondary value to a default value (e.g., 0.7) for the same reasons as given above with respect to Pause Interval Primary value, computes the Time to Neutral value (processing block 2203), and returns to processing block 2201.

If processing logic determines that a Time to Neutral value has been computed, processing logic sets the Pause Interval Secondary value to the result of the Time to Neutral value multiplied by a predetermined number (processing block 2204). In some embodiments, the predetermined number is 3½. Some embodiments the predetermined number is a representative number of how long of a pause would have to last in order to allow the user ample time to perform a secondary Flik. This takes into account the pause after a Primary Flik and then the amount of time the user would have to take to see the new options, make a decision, and perform an action. This number may be changed.

After setting the Pause Interval Secondary value, processing logic returns the Pause Interval Secondary value (processing block 2205).

Figure 23:
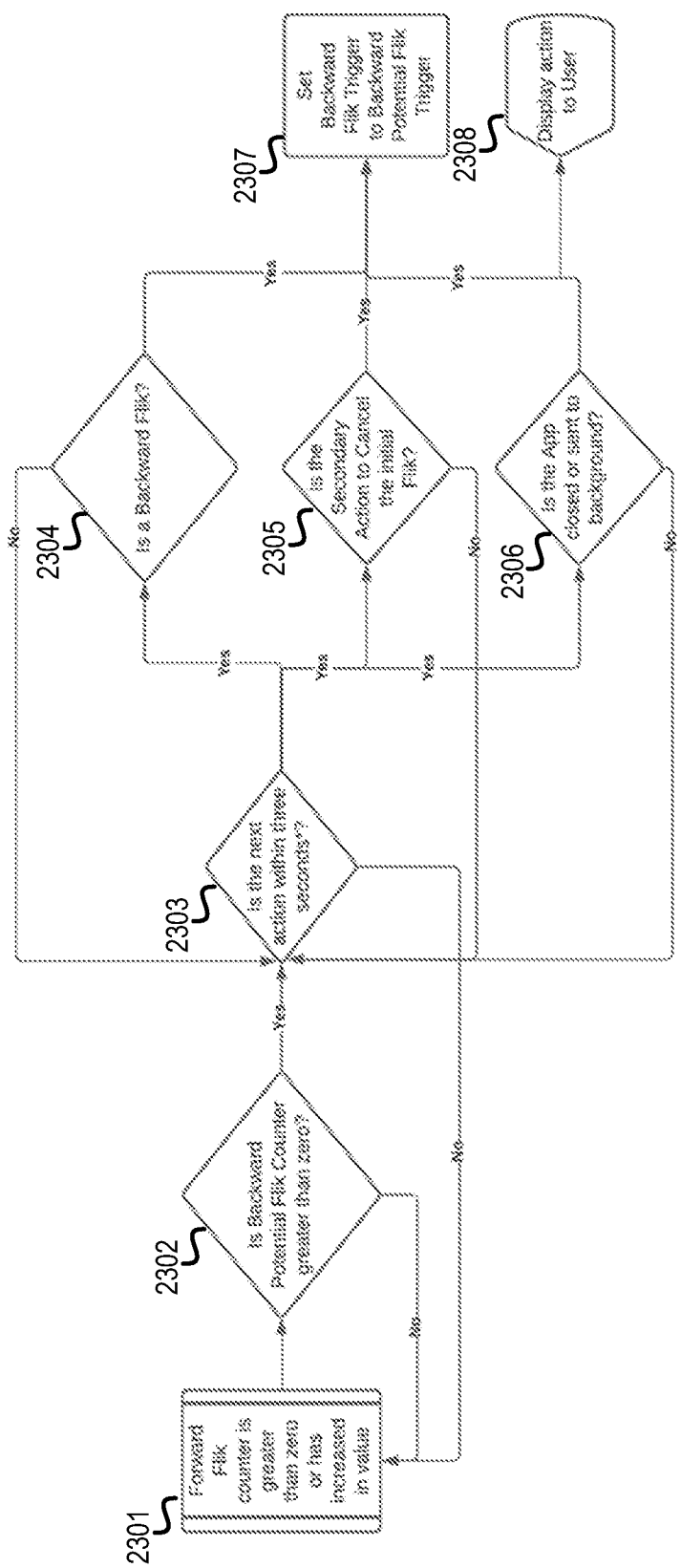
FIG. 23 is a flow diagram of one embodiment of a process for determining whether there is an adversarial Fliks in the forward direction.

FIG. 23 is a flow diagram of one embodiment of a process for determining whether there is an adversarial Flik in the forward direction. An adversarial Flik denotes when a user intends to Flik in one direction but ends up triggering a Flik in the opposite direction, the result of which is either that the user often backtracks their actions or closes the application. This can mean the Trigger value for the intended Flik direction is too high and the logic in this process attempts to rectify this issue. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 23, the process begins by processing logic determining the Forward Flik Counter value is greater than zero or has increased in value (processing block 2301). When this occurs, processing logic tests whether the Backward Potential Flik Counter value is greater than zero (processing block 2302). If not, process transitions to processing block 2301. If processing logic determines that the Backward Potential Flik Counter value is greater than 0, processing logic determines whether the next action occurs within a predetermined number of seconds (processing block 2303). In some embodiments, the predetermined number is 3 seconds. The predetermined number is a representative number of how long the Flik processing logic may wait to see if another adversarial Flik is detected. One goal is to be able to understand if the user is getting Fliks in unwanted direction or is unable to Flik in the desired direction. The pause allows the system to monitor these situations. Note that other numbers besides 3 seconds may be used. If the next action does not occur within 3 seconds, processing logic transitions back to processing block 2301. If the next action did occur within 3 seconds, processing logic checks whether the action is a Backward Flik (processing block 2304). If not, the process transitions back to processing block 2301. If the action is a Backward Flik, the process transitions to processing block 2307 and 2308.

If processing logic determines the next action occurs within a predetermined amount of time, the processing logic also determines if the secondary action is to cancel the initial Flik (processing block 2305). If that is not the case, processing logic transitions back to processing block 2301. If so, processing logic transitions to processing block 2307 and 2308.

Also processing logic determines the next action occur within the predetermined amount of time, processing determines whether the app is closed or sent to the background (processing block 2306). If not, the process transitions to processing block 2301. If so, processing logic transitions to processing block 2307 and 2308.

At processing block 2307, processing logic sets the Backward Flik Trigger value to the Backward Potential Flik Trigger value. At processing block 2308, processing logic displays the action to the user.

Figure 24:
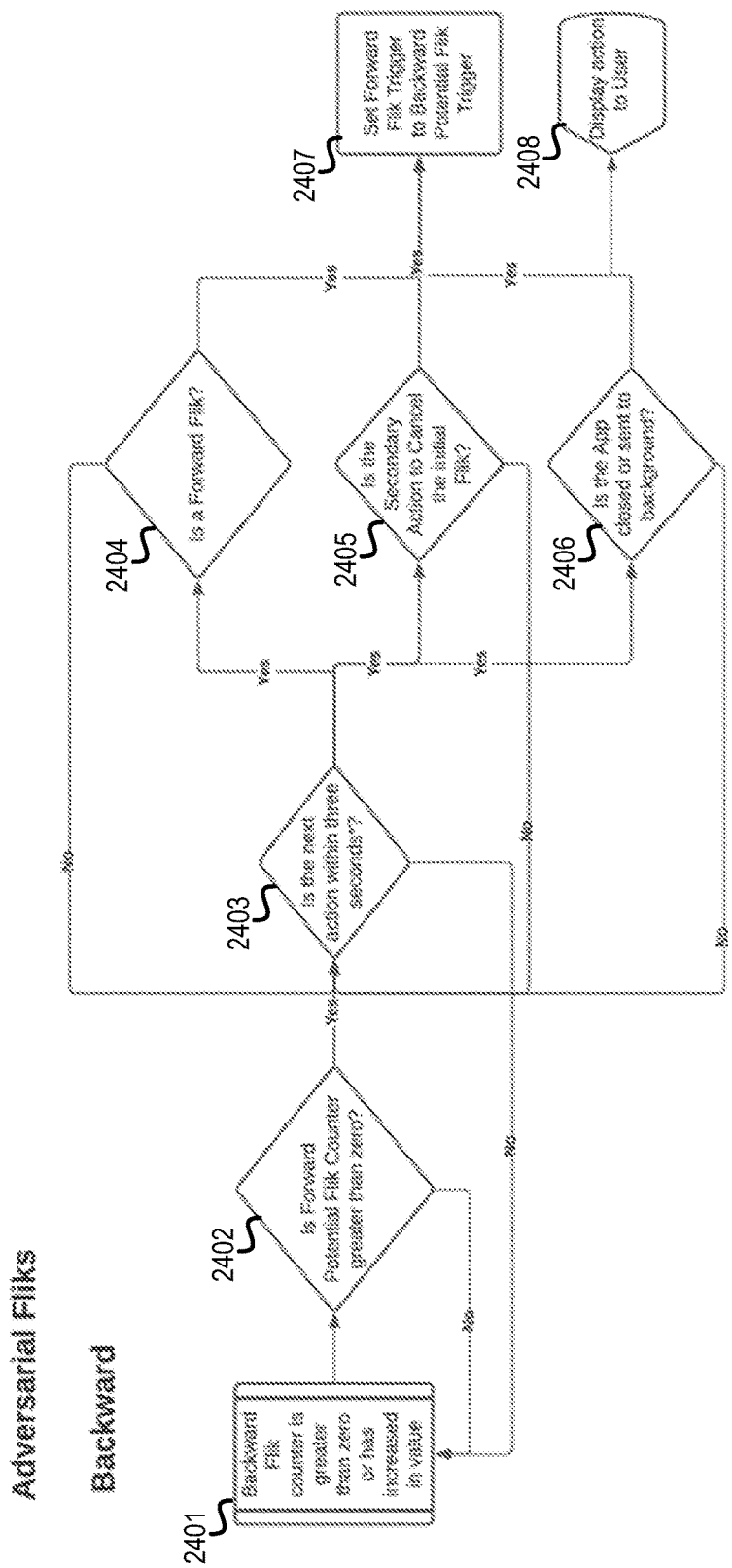
FIG. 24 is a flow diagram of one embodiment of a process for determining whether there is an adversarial Fliks in the backward direction.

FIG. 24 is a flow diagram of one embodiment of a process for determining whether there is an adversarial Flik in the backward direction. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 24, the process begins by processing logic determining the Backward Flik Counter value is greater than zero or has increased in value (processing block 2401). When this occurs, processing logic tests whether the Forward Potential Flik Counter value is greater than zero (processing block 2402). If not, process transitions to processing block 2401. If processing logic determines that the Forward Potential Flik Counter value is greater than 0, processing logic determines whether the next action occurs within a predetermined number of seconds (processing block 2403). In some embodiments, the predetermined number is 3 seconds. The predetermined number is a representative number of how long the Flik processing logic may wait to see if another adversarial Flik is detected. One goal is to be able to understand if the user is getting Fliks in unwanted direction or is unable to Flik in the desired direction. The pause allows the system to monitor these situations. Note that other numbers besides 3 seconds may be used. If the next action does not occur within 3 seconds, processing logic transitions back to processing block 2401. If the next action did occur within 3 seconds, processing logic checks whether the action is a Forward Flik (processing block 2404). If not, the process transitions back to processing block 2401. If the action is a Forward Flik, the process transitions to processing block 2407 and 2408.

If processing logic determines the next action occurs within a predetermined amount of time, the processing logic also determines if the secondary action is to cancel the initial Flik (processing block 2405). If that is not the case, processing logic transitions back to processing block 2401. If so, processing logic transitions to processing block 2407 and 2408.

Also processing logic determines the next action occur within the predetermined amount of time, processing determines whether the application is closed or sent to the background (processing block 2406). If not, the process transitions to processing block 2401. If so, processing logic transitions to processing block 2407 and 2408.

At processing block 2407, processing logic sets the Forward Flik Trigger value to the Forward Potential Flik Trigger value. At processing block 2408, processing logic displays the action to the user.

Figure 25:
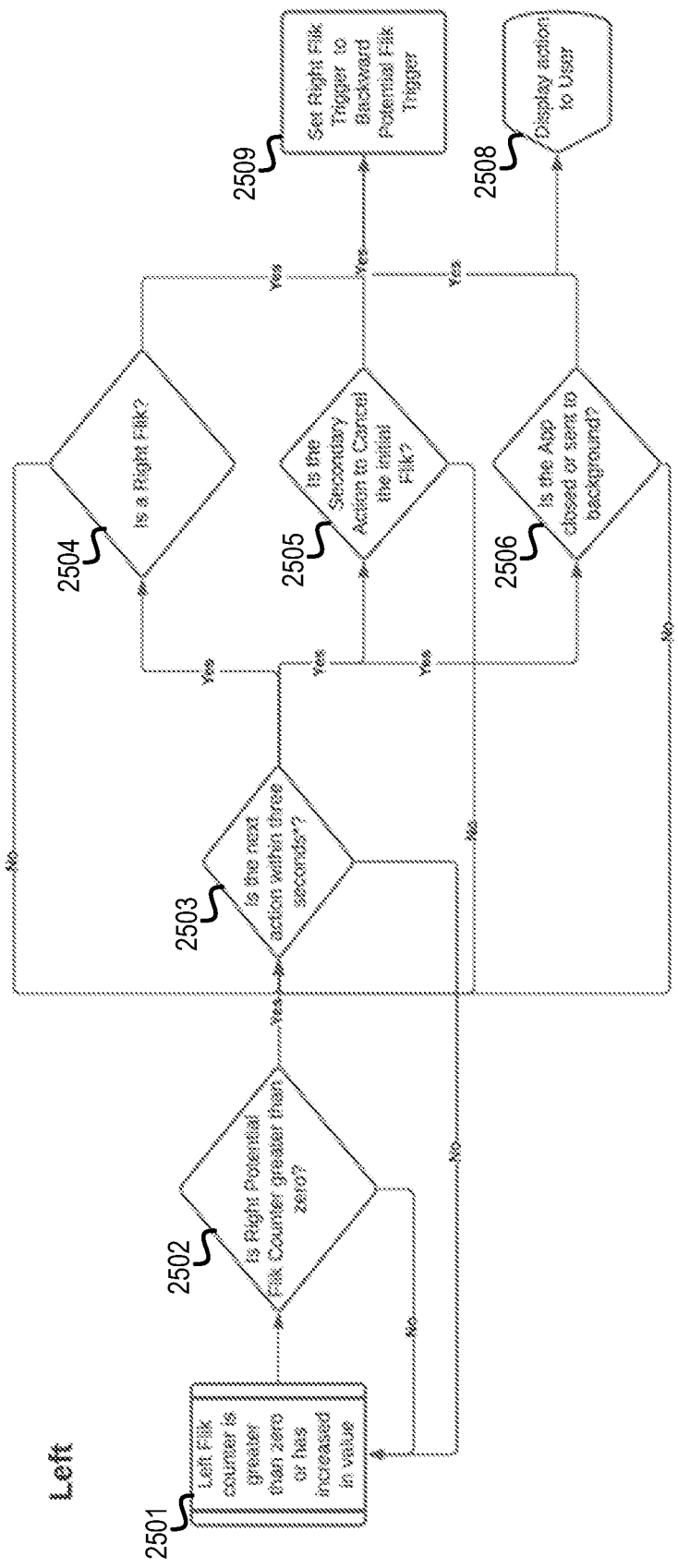
FIG. 25 is a flow diagram of one embodiment of a process for determining whether there is an adversarial Fliks in the left direction.

FIG. 25 is a flow diagram of one embodiment of a process for determining whether there is an adversarial Flik in the left direction. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 25, the process begins by processing logic determining the Left Flik Counter value is greater than zero or has increased in value (processing block 2501). When this occurs, processing logic tests whether the Right Potential Flik Counter value is greater than zero (processing block 2502). If not, process transitions to processing block 2501. If processing logic determines that the Right Potential Flik Counter value is greater than 0, processing logic determines whether the next action occurs within a predetermined number of seconds (processing block 2503). In some embodiments, the predetermined number is 3 seconds. The predetermined number is a representative number of how long the Flik processing logic may wait to see if another adversarial Flik is detected. One goal is to be able to understand if the user is getting Fliks in unwanted direction or is unable to Flik in the desired direction. The pause allows the system to monitor these situations. Note that other numbers besides 3 seconds may be used. If the next action does not occur within 3 seconds, processing logic transitions back to processing block 2501. If the next action did occur within 3 seconds, processing logic checks whether the action is a Right Flik (processing block 2504). If not, the process transitions back to processing block 2501. If the action is a Right Flik, the process transitions to processing block 2507 and 2508.

If processing logic determines the next action occurs within a predetermined amount of time, the processing logic also determines if the secondary action is to cancel the initial Flik (processing block 2505). If that is not the case, processing logic transitions back to processing block 2501. If so, processing logic transitions to processing block 2507 and 2508.

Also processing logic determines the next action occur within the predetermined amount of time, processing determines whether the application is closed or sent to the background (processing block 2506). If not, the process transitions to processing block 2501. If so, processing logic transitions to processing block 2507 and 2508.

At processing block 2507, processing logic sets the Right Flik Trigger value to the Right Potential Flik Trigger value. At processing block 2508, processing logic displays the action to the user.

Figure 26:
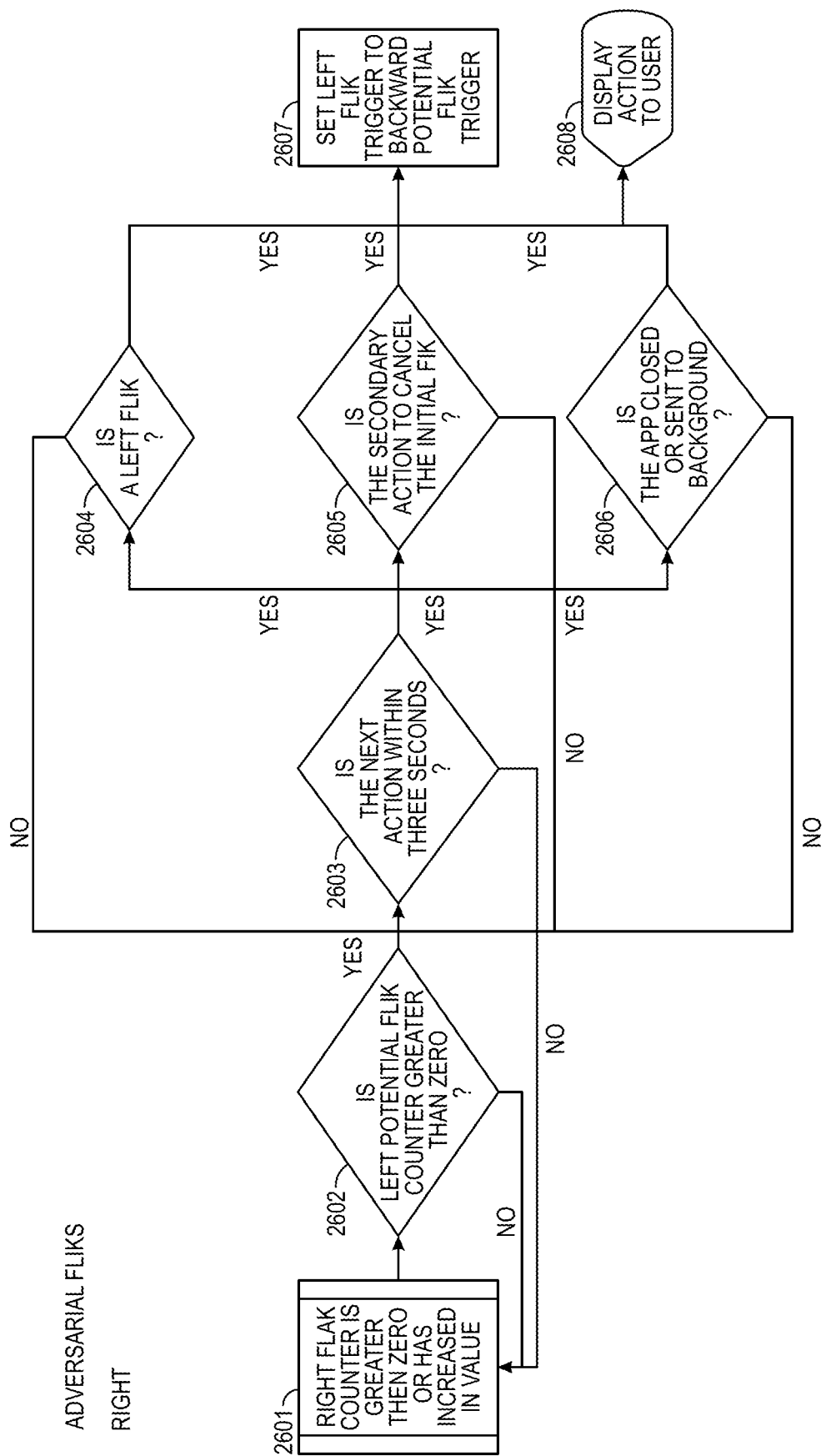
FIG. 26 is a flow diagram of one embodiment of a process for determining whether there is an adversarial Fliks in the right direction.

FIG. 26 is a flow diagram of one embodiment of a process for determining whether there is an adversarial Flik in the right direction. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 26, the process begins by processing logic determining the Right Flik Counter value is greater than zero or has increased in value (processing block 2601). When this occurs, processing logic tests whether the Left Potential Flik Counter value is greater than zero (processing block 2602). If not, process transitions to processing block 2601. If processing logic determines that the Left Potential Flik Counter value is greater than 0, processing logic determines whether the next action occurs within a predetermined number of seconds (processing block 2603). In some embodiments, the predetermined number is 3 seconds. The predetermined number is a representative number of how long the Flik processing logic may wait to see if another adversarial Flik is detected. One goal is to be able to understand if the user is getting Fliks in unwanted direction or is unable to Flik in the desired direction. The pause allows the system to monitor these situations. Note that other numbers besides 3 seconds may be used. If the next action does not occur within 3 seconds, processing logic transitions back to processing block 2601. If the next action did occur within 3 seconds, processing logic checks whether the action is a Left Flik (processing block 2604). If not, the process transitions back to processing block 2601. If the action is a Left Flik, the process transitions to processing block 2607 and 2608.

If processing logic determines the next action occurs within a predetermined amount of time, the processing logic also determines if the secondary action is to cancel the initial Flik (processing block 2605). If that is not the case, processing logic transitions back to processing block 2601. If so, processing logic transitions to processing block 2607 and 2608.

Also processing logic determines the next action occur within the predetermined amount of time, processing determines whether the application is closed or sent to the background (processing block 2606). If not, the process transitions to processing block 2601. If so, processing logic transitions to processing block 2607 and 2608.

At processing block 2607, processing logic sets the Left Flik Trigger value to the Left Potential Flik Trigger value. At processing block 2608, processing logic displays the action to the user.

FIGS. 29A-F illustrate one embodiment of the anatomy of six Fliks. As described herein, to trigger a Flik, the Flik processing logic examines data from sensors on the device and once the threshold of a potential or actual Flik has been reach, then the Flik processing logic is notified that an event has occurred. The graphs of FIGS. 29A-F show how the data—pitch, roll, yaw; rotation of x, y and z axis, rotation rate (from data of the accelerometer and gyros of the device) is translated into useful information from the Flik processing logic.

Referring to FIGS. 29A-F, the profile of a single Flik waveform. The waveform is derived from the data output by the sensors on the device relating to the manner in which the device is being moved in the user's hand. Points along that wave coincide with variables used by the Flik processing logic to trigger specific functions, such as shown for example in FIG. 3. As discussed above, there are six Flik directions that the user can rotate their phone to trigger a Flik.

Figure 29A:
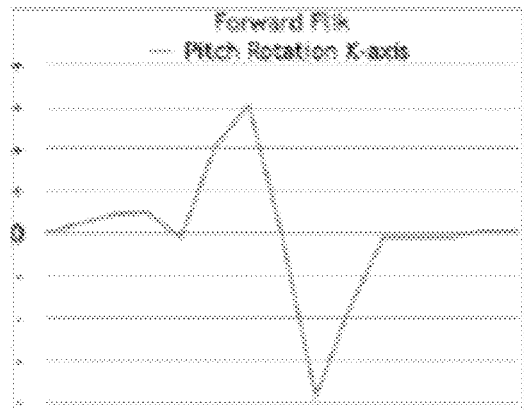
FIGS. 29A-F illustrate one embodiment of the anatomy of six Fliks.
Figure 29B:
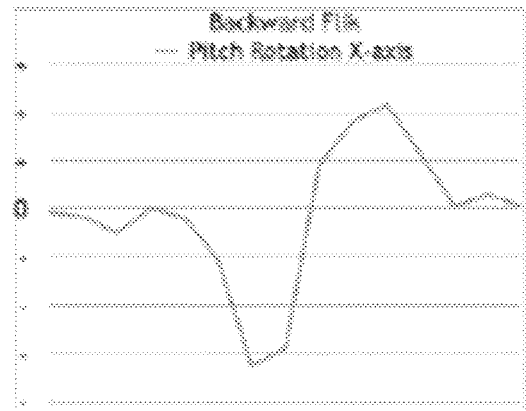
Figure 29C:
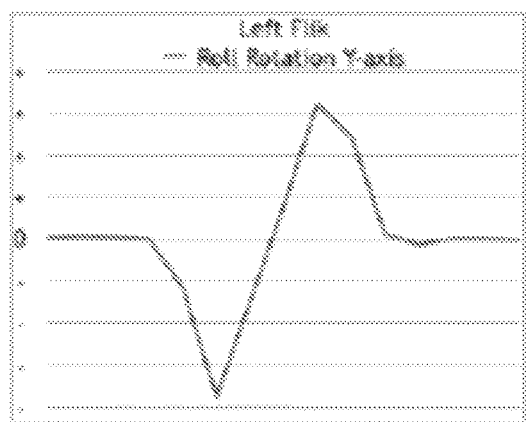
Figure 29D:
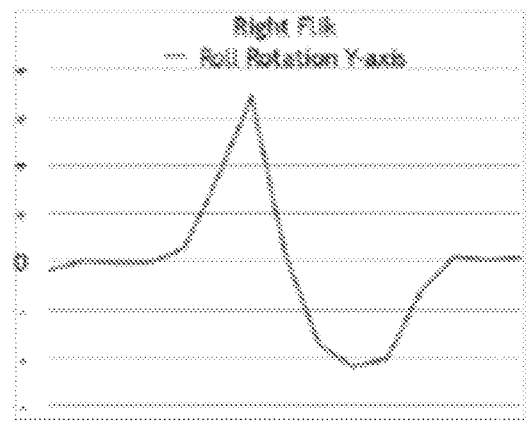
Figure 29E:
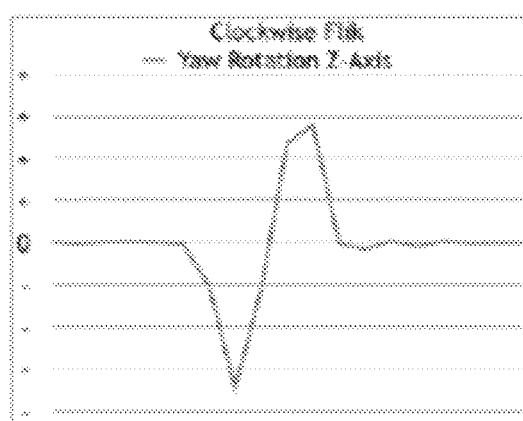
Figure 29F:
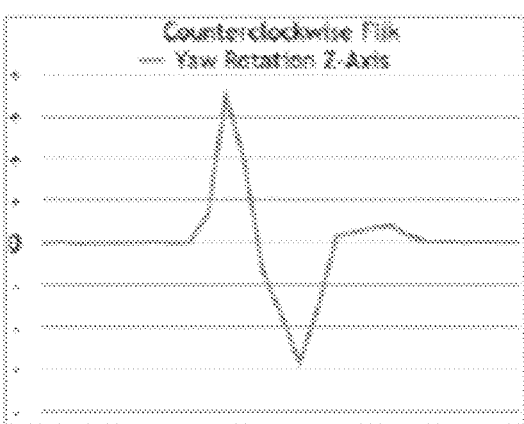

As shown, the six directions of Fliks use only the rotation rate values on the X, Y and Z axes. Paragraph 29A illustrates the Forward Flik rotation on the X-axis with an initial rotation towards the user on the positive X-axis before returning to neutral, while FIG. 29B illustrates the Backward Flik rotation on the X-axis with an initial rotation away from the user on the negative X-axis before returning to neutral. FIG. 29C illustrates the left Flik rotation on the Y-axis with an initial rotation to the left of the user on the negative Y-axis before returning to neutral, while FIG. 29D illustrates the Right Flik rotation on the Y-axis with an initial rotation to the right of the user on the positive Y-axis before returning to neutral. FIG. 29E illustrates the Flik rotation on the Z-axis with an initial clockwise rotation of the user on the negative Z-axis before returning to neutral, while FIG. 29F illustrates the rotation on the Z-axis with an initial counter clockwise rotation of the user on the positive Z-axis before returning to neutral.

As data is being calculated and collected, the Flik processing logic includes a Movement Engine, a Flik Engine, and a Trigger Engine to use the data. The Movement Engine collects the data from the hardware motion sensors and then shares the data throughout the rest of the application as Movement Data.

The Flik Engine monitors and triggers Fliks. To that end, the Flik Engine computes whether a trigger has been detected and distinguishes between primary and secondary Fliks. Once any of these events occurs, the Flik Engine then notifies the rest of the Flik processing logic about the event.

The Trigger Engine monitors and updates custom values over time and monitors for adversarial Fliks. In some embodiments, the Trigger Engine raises or lowers trigger values. Examples of this are shown in FIGS. 7-10. In some embodiments, the Trigger Engine determines whether the user has performed a change of hand for handling the device and performing Fliks. An example process for determining whether the user has changed hands is shown in FIG. 19. In some embodiments, the Trigger Engine also determines the polling speed based on usage. An example process for determining the polling speed based on usage is shown in FIG. 20. Example processes for monitoring for adversarial Fliks are shown in FIGS. 23-26.

Figure 30:
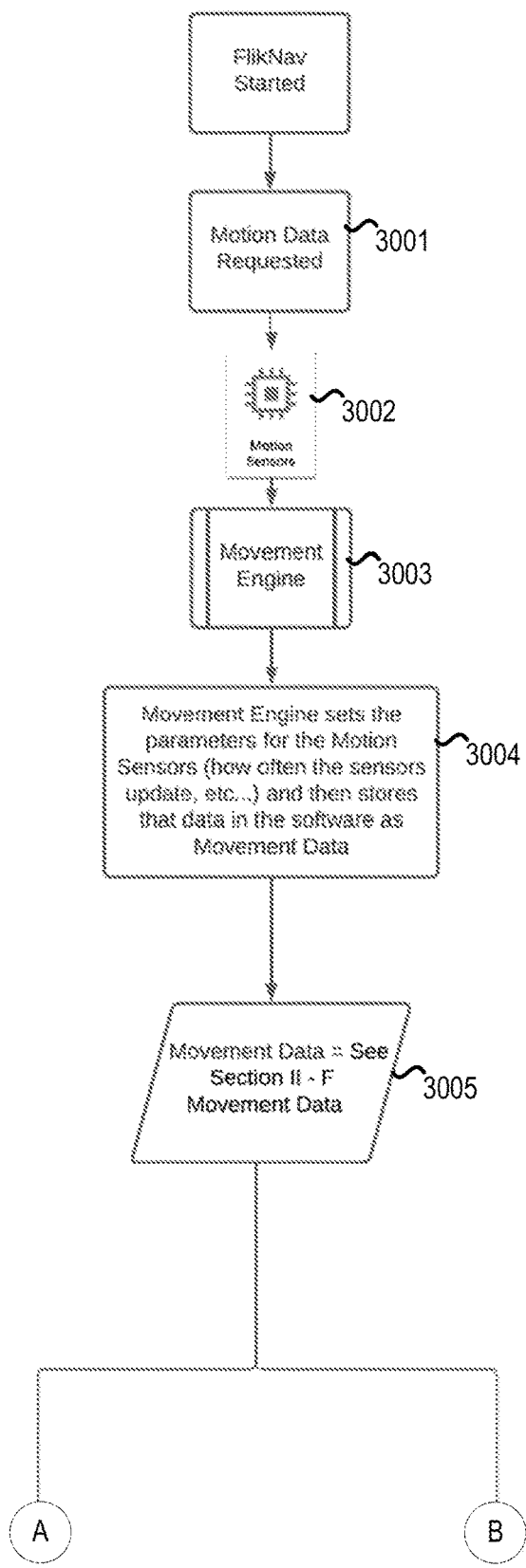
FIG. 30 is a data flow diagram of the processing of Fliks information in an example system.
Figure 30:
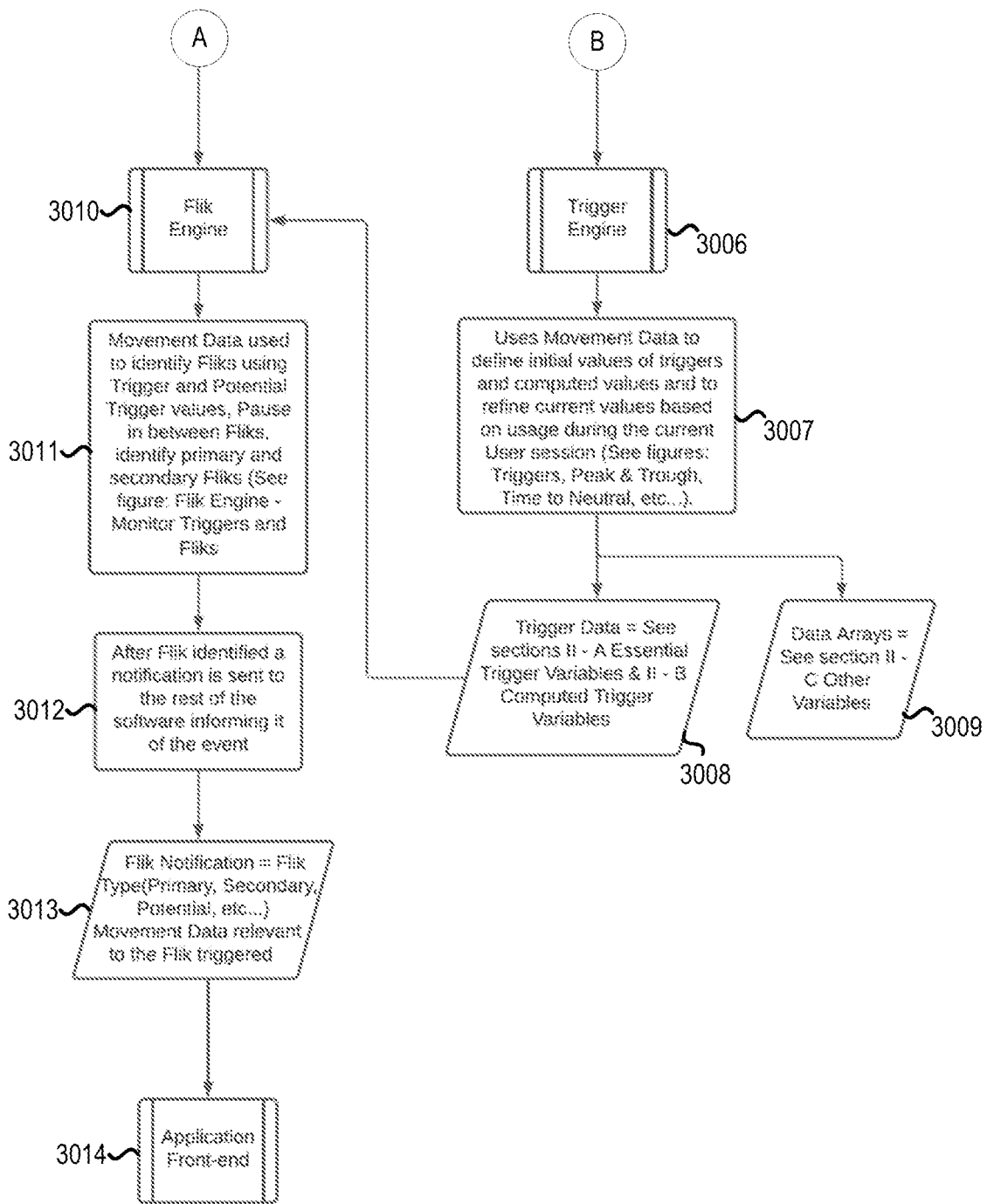

FIG. 30 is a data flow diagram of one embodiment of the process for handling Fliks to create touchless inputs using a portable electronic device. Referring to FIG. 30, when the Flik navigation is started, motion data is requested (3001). The motion data is requested for motion sensors 3002. Motion sensors 3002 are contacted and engaged by the Movement Engine 3003. Movement Engine 3003 sets the parameters for the motion sensors 3002 and receives and stores the motion data in the Flik processing logic as Movement data (3004). For example, Movement Engine 3003 may set how often the sensors 3002 update their data.

In some embodiments, the Movement Data includes Timestamp (MDTS), Pitch (MDP), Roll (MDR), Yaw (MDY), Gravity (MDG) acceleration vectors, Rotation (MDR) rates of the device, Accelerations (MDA), and Magnetic Field (MDMF).

Trigger Engine 3006 uses Movement Data 3005 to define initial values of triggers and computed values and to refine current values based on usage during the current user session (3007). Thus, Trigger Engine 3006 outputs Trigger Data 3008 and data stored in data arrays 3009.

Flik Engine 3010 receives Trigger Data 3008 along with Movement Data 3008. Flik Engine 3010 uses Movement Data 3008 to identify Fliks using trigger and potential trigger values, information related to Pauses in between Fliks, and identifies primary and secondary Fliks (3011). After a Flik has been identified, Flik Engine 3010 sends a notification to the rest of the Flik processing logic informing it of the event (3012). In some embodiments, the Flik notification can indicate whether the Flik type is a primary, secondary or potential Flik and provides the Movement Data relevant to the Flik triggered (3013). This data is returned to the application front (3014), such as, for example, a web browser for use as touchless inputs for the Flik navigation.

Figure 31:
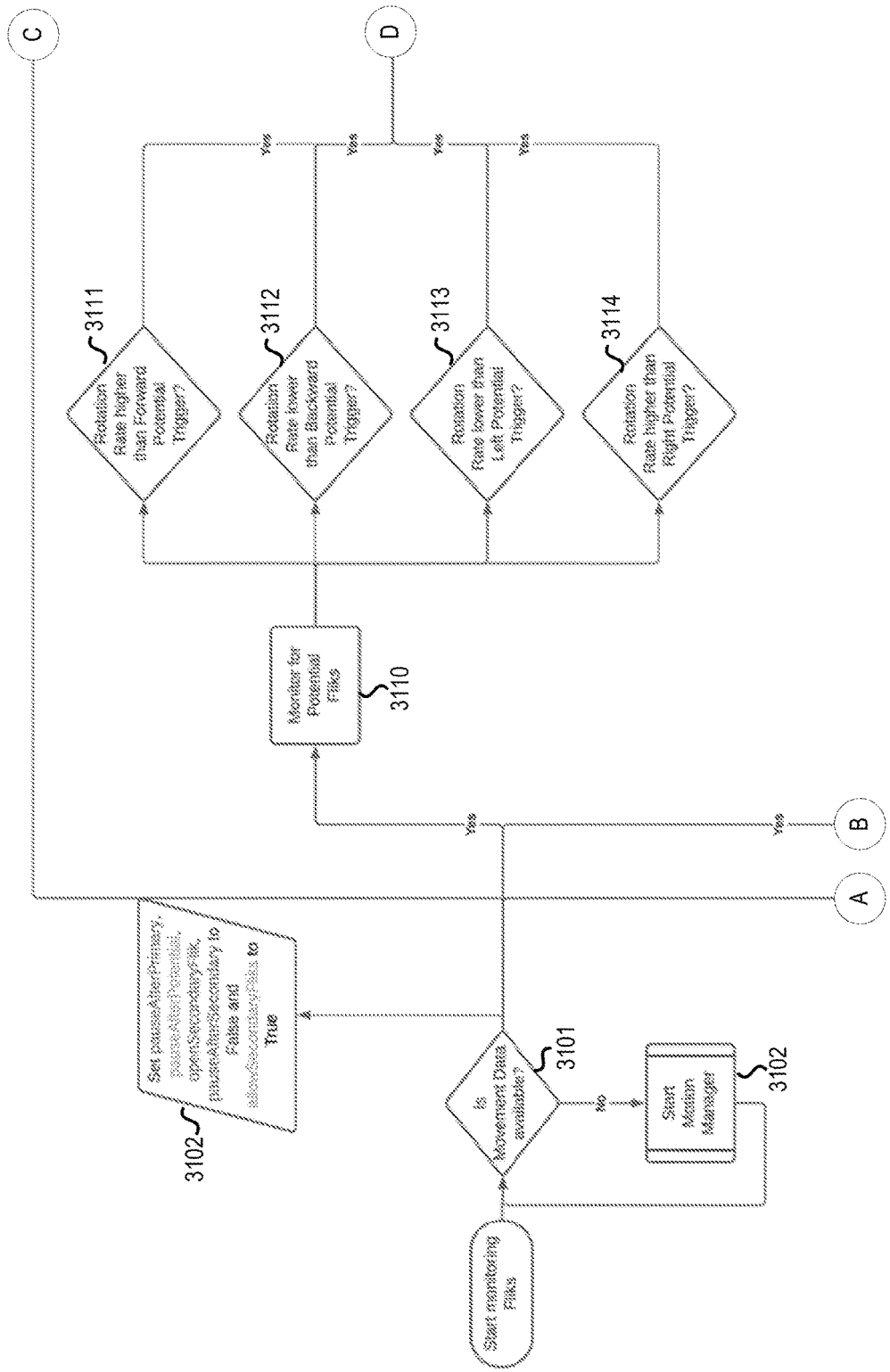
FIG. 31 is a flow diagram of one embodiment of a process for monitoring triggers and Fliks.
Figure 31:
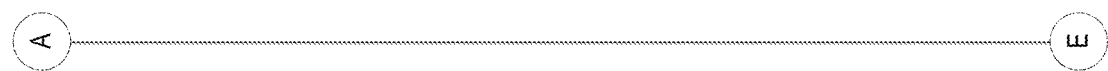
Figure 31:
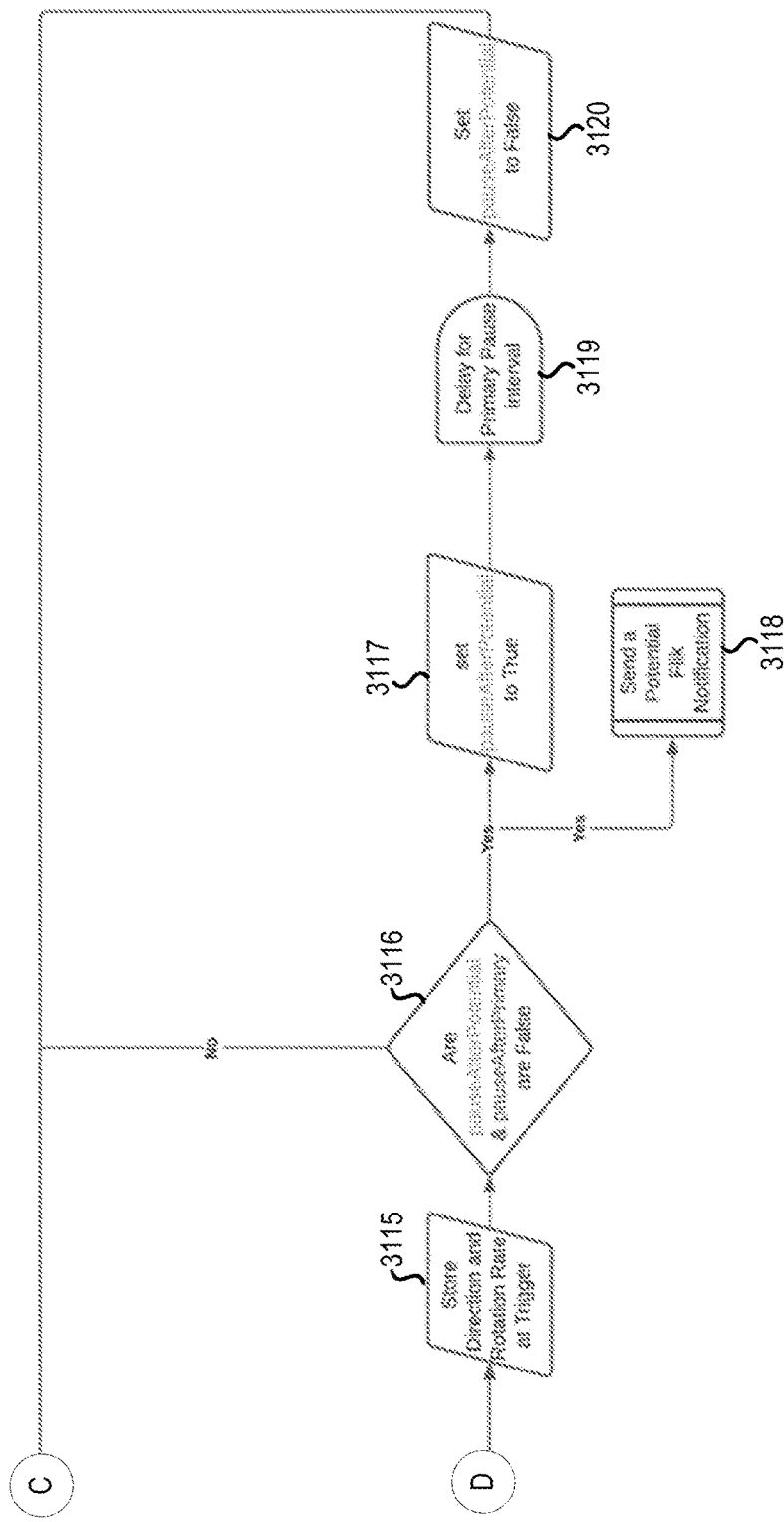
Figure 31:
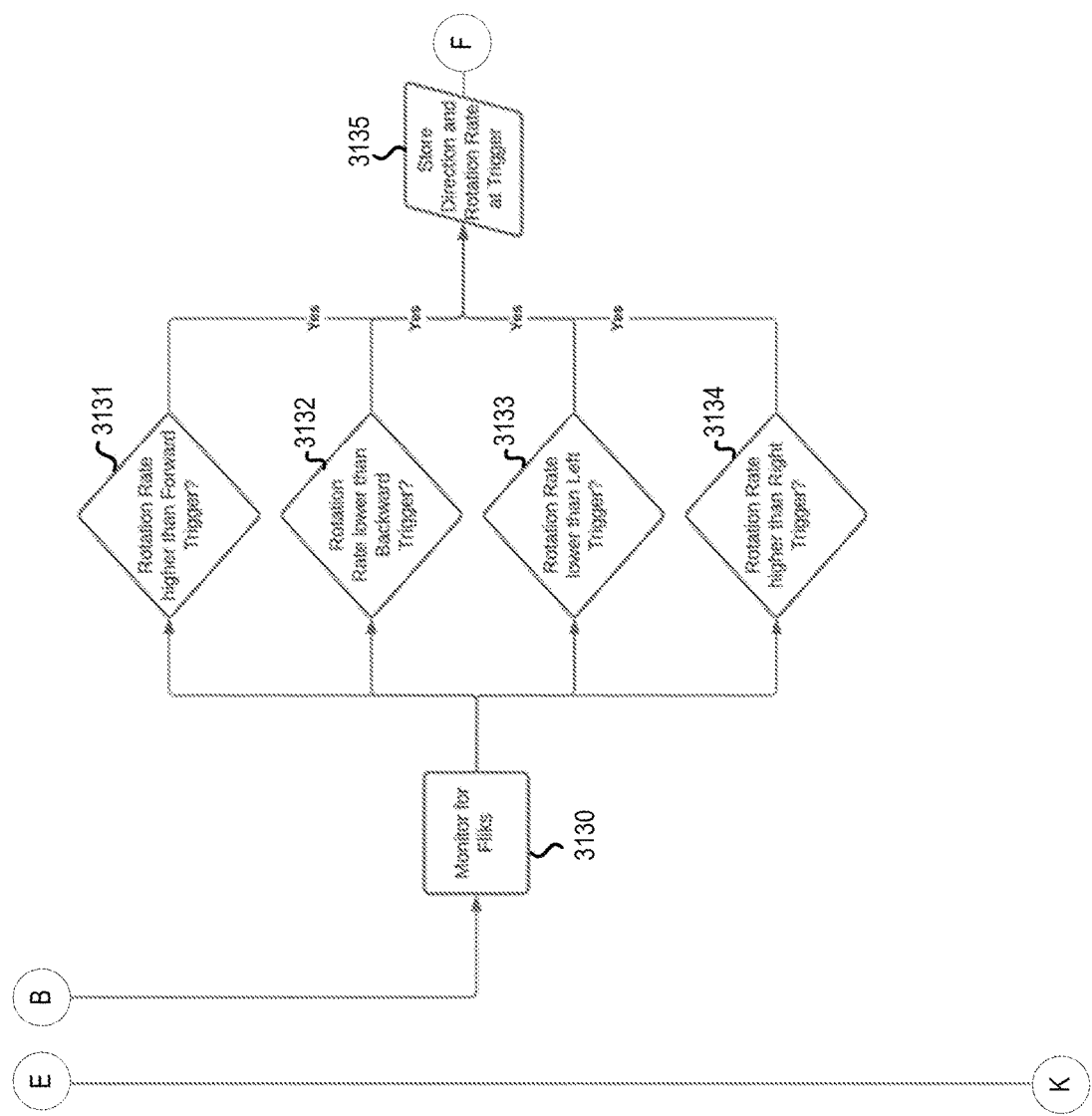
Figure 31:
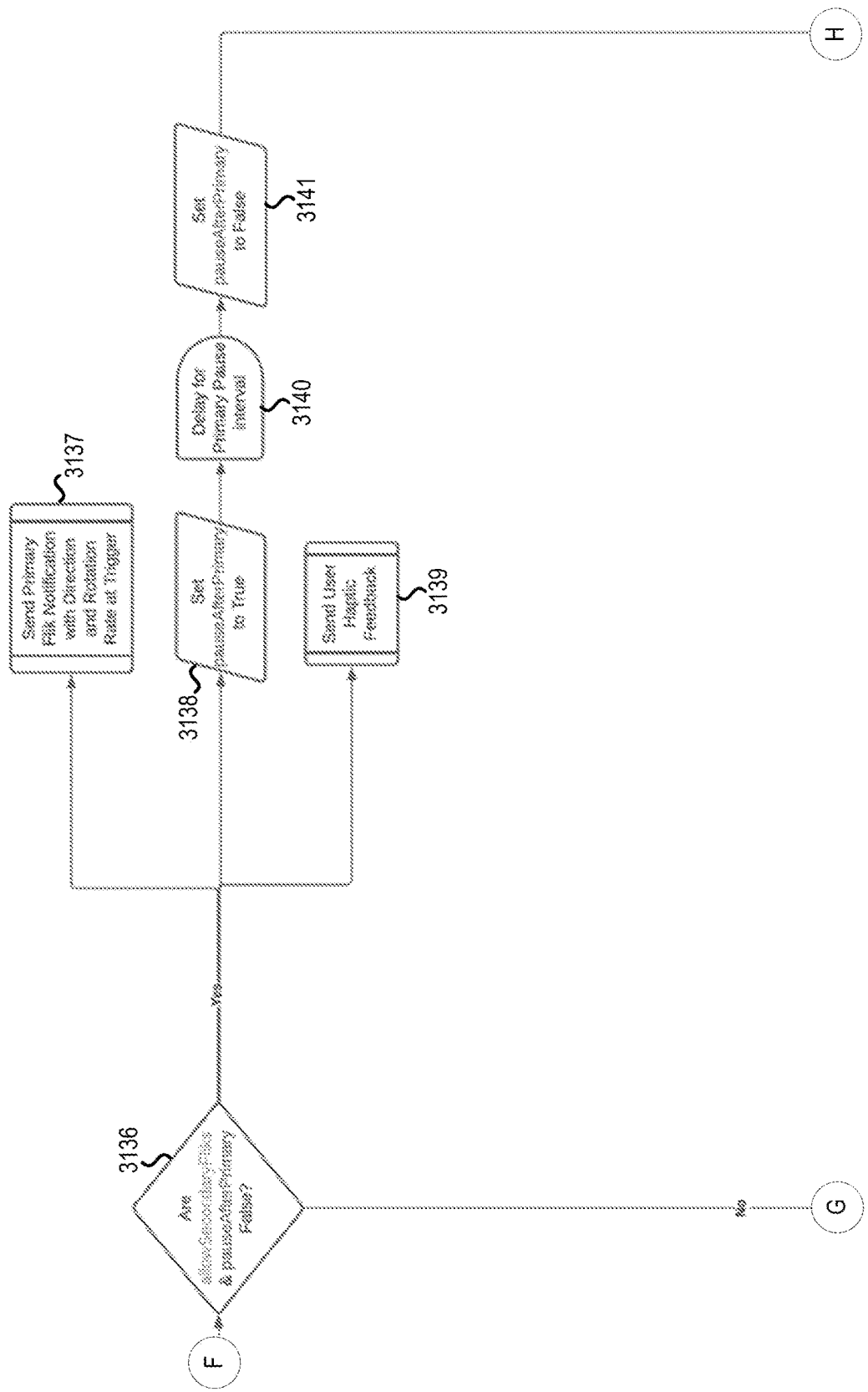
Figure 31:
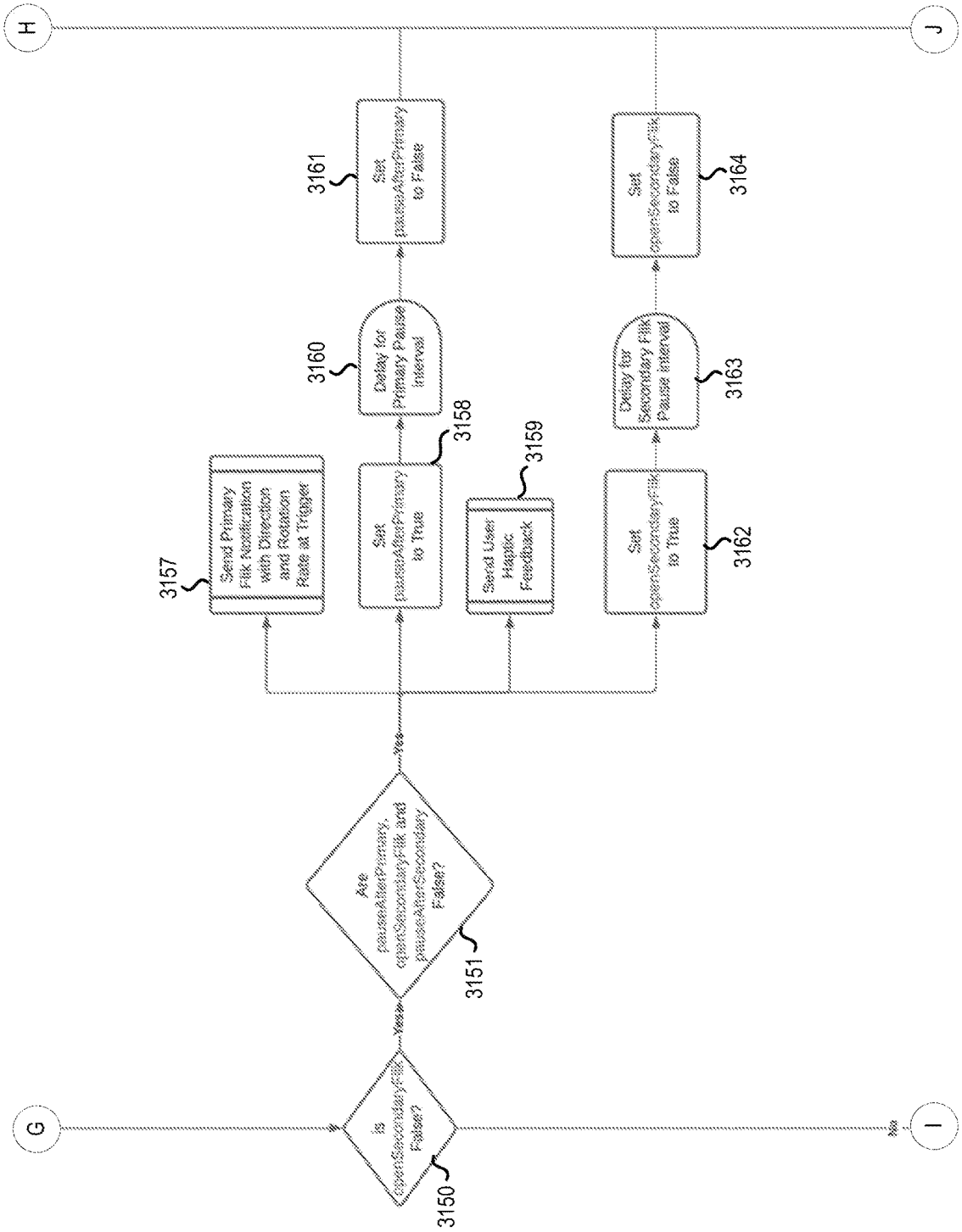
Figure 31:
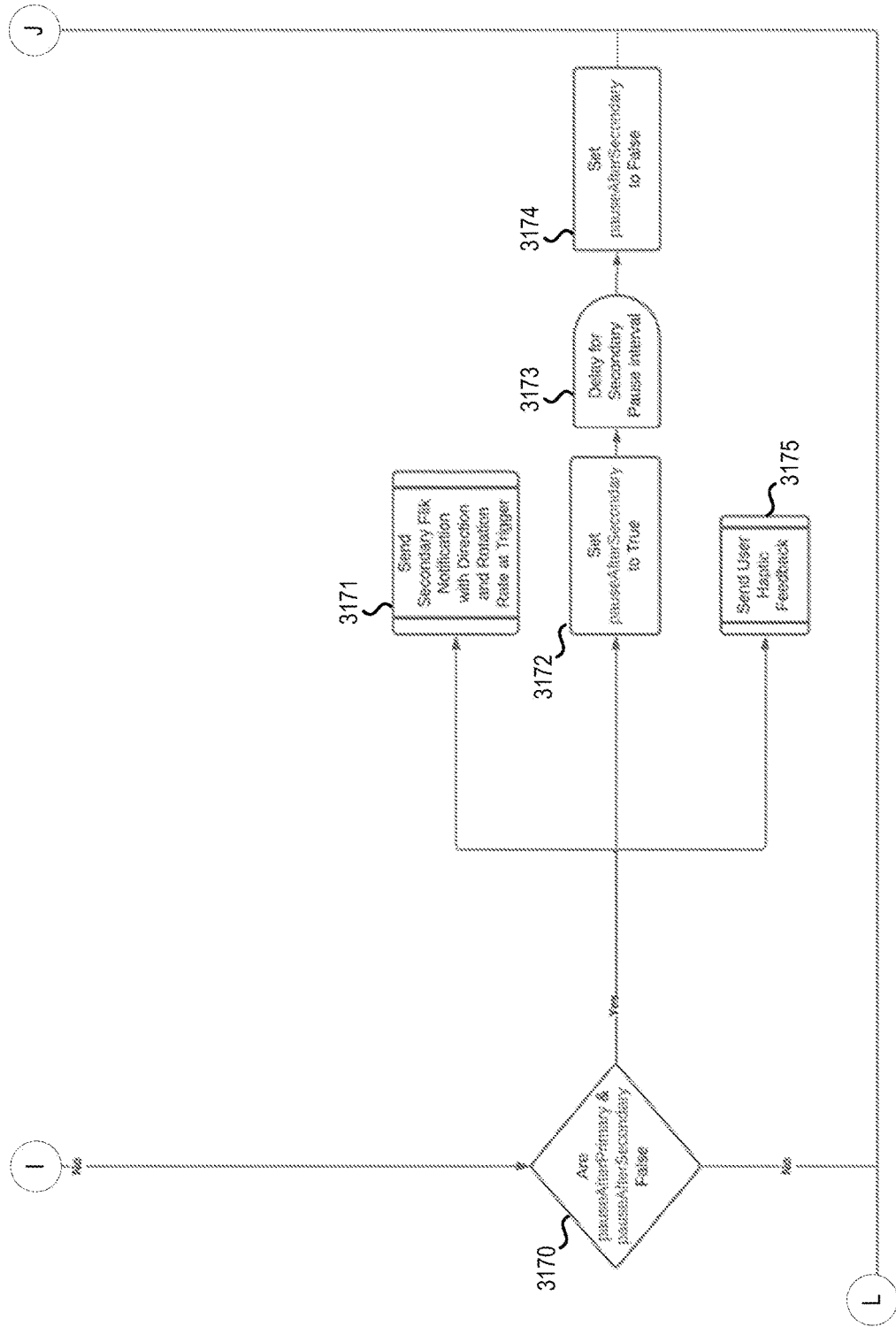

FIG. 31 is a flow diagram of one embodiment of a process for monitoring triggers and Fliks. This process is performed by the Flik Engine. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 31 the process begins by processing logic determining whether Movement Data is available (processing block 3101). If not, processing logic starts the Motion Manager to start collecting and/or obtaining Movement Data (processing block 3102) and returns to processing block 3101. If the Movement Data is available, processing logic sets pauseafterprimary, pauseafterpotential, opensecondaryFlik, and pauseaftersecondary to false and allows secondaryFliks to true (processing block 3102). In some embodiments, pauseAfterPrimary is a Boolean variable used in the processing logic to identify when a pause timer is set after a primary Flik has been triggered, pauseAfterPotential is a Boolean variable used in the processing logic to identify when a pause timer is set after a potential Flik has been triggered, openSecondaryFlik is a Boolean variable used in the processing logic to identify when a Flik should be considered a secondary rather than primary Flik, and pauseAfterSecondary is a Boolean variable used in the processing logic to identify when a pause timer is set after a secondary Flik has been triggered, and allowSecondaryFlik is a Boolean variable used in the processing logic to identify when secondary Fliks should be allowed to be identified by the application or otherwise only primary Flik actions will be identified Processing logic then monitors for Potential Fliks (processing block 3110). At this point, processing logic determines whether the rotation rate is higher than the Forward Potential Trigger value (processing block 3111), whether the rotation rate is lower than the Backward Potential Trigger value (processing block 3112), whether the rotation rate is lower than the Left Potential Trigger value (processing block 3113), and whether the rotation rate is higher than the Right Potential Trigger value (processing block 3114). If any of these other case, processing logic stores the direction and rotation rate at the Trigger variable (processing block 3115) and then determines if pauseafterpotential and pauseafterprimary are false (processing block 3116). If not, processing logic returns and remains in the holding pattern at processing blocks 3110 and 3130 to monitor for Fliks. If true, processing logic sets the pauseafterpotential to true and sends a notification indicating there is a Potential Flik (processing block 3118).

After setting the pauseafterpotential to true, there is a delay for a primary pause interval (processing block 3119). Thereafter processing logic sets the pauseafterpotential to false and processing logic returns to processing blocks 3110 and 3130.

After determining the Movement Data is available, processing logic also monitors for Fliks (processing block 3130). In doing so, processing logic determines whether the rotation rate is higher than the Forward Trigger value (processing block 3131), whether the rotation rate is lower than the Backward Trigger value (processing block 3132), whether the rotation rate is lower than the Left Trigger value (processing block 3133), and where the rotation rate is higher than the Right Trigger value (processing block 3134). If any of these are determined to be true, processing logic stores the direction and rotation rate at the Trigger variable (processing block 3135) and checks whether secondaryFliks and pauseafterprimary are false (processing block 3136). If so, processing logics sends a notification that there is Primary Flik with the direction and rotation rate at the Trigger variable (processing block 3137), sends the user haptic feedback (e.g., vibration, etc.) (processing block 3139), and sets pauseafterprimary to true (processing block 3138), delays for a primarypause interval (processing block 3140) and sets pauseafterprimary to false (processing block 3141). Thereafter, processing logic returns to processing blocks 3110 and 3130 to monitor for potential and regular Fliks.

If processing logic determines that secondaryFliks and pauseafterprimary are false, processing logic determines whether opensecondaryFlik is false (processing block 3150).

If the opensecondaryFlik is false, processing logic determines whether pauseafterprimary, opensecondarFlik and pauseaftersecondary are false (processing block 3151). If so, processing logic sends the primary Flik notification with the direction and rotation rate at the trigger (processing block 3157). Also if so, processing logic sets pauseafterprimary to true, delays for a primarypause interval (processing block 3160), sets pauseafterprimary to false (processing block 3161) and returns to processing blocks 3110 and 3130 to monitor potential Fliks and Fliks, respectively.

Furthermore, if pauseafterprimary, opensecondaryFlik and pauseaftersecondary are false, processing logic sends the use haptic feedback (processing block 3159) and sets opensecondaryFlik to true, delays the secondary Flik for a secondary Flik pause interval (processing block 3163), sets the open secondary Flik to false (processing block 3164) and returns to processing blocks 3110 and 3130.

If processing logic determines that opensecondarFlik is not false, processing logic transitions the processing block 3170 where processing logic determines whether pauseafterprimary and pauseaftersecondary are false. If not, processing logic returns to processing block 3110 and 3130. If processing logic determines that pauseafterprimary and pauseaftersecondary are false, processing logic sends the secondary Flik notification with the direction and rotation rate at the trigger (processing block 3171) and sends user haptic feedback (processing block 3175). Processing logic also sets pauseaftersecondary to true (processing block 3172), delays for a secondary pause interval (processing block 3173), sets pauseaftersecondary to false after the delay (processing block 3174) and returns to processing block 3110 and 3130.

Figure 32:
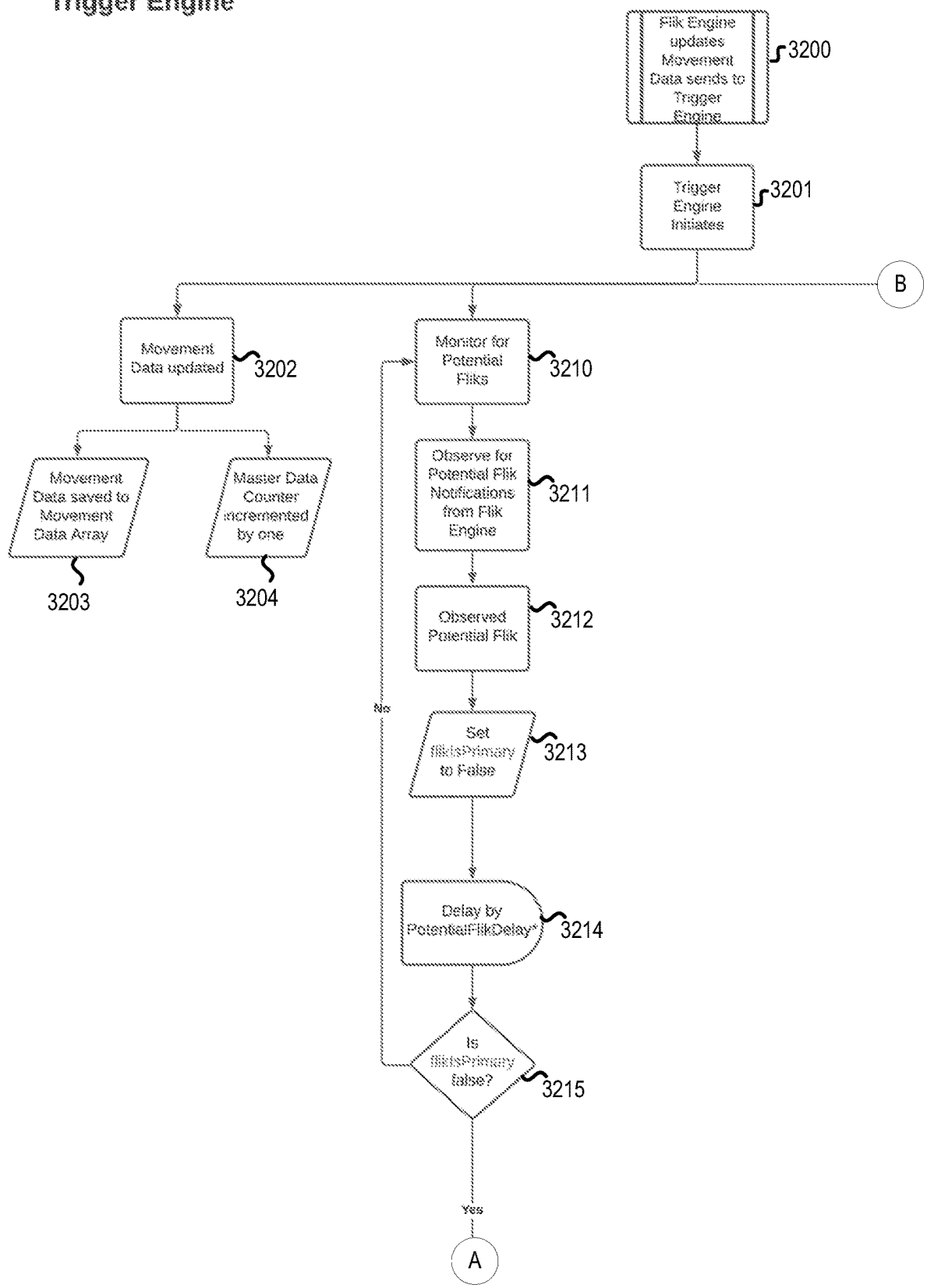
FIG. 32 is a data flow diagram of one embodiment of the process performed by the Trigger Engine.
Figure 32:
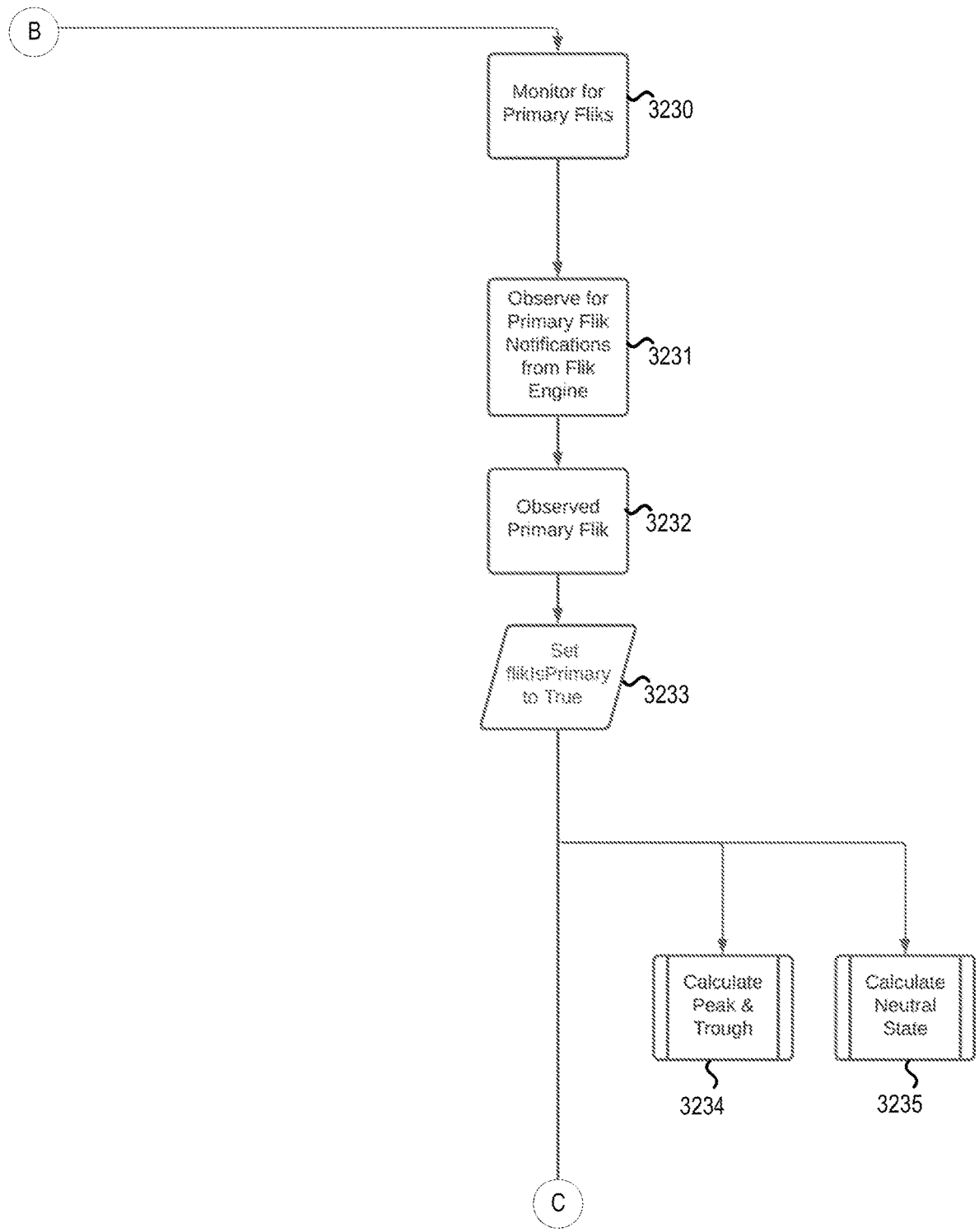
Figure 32:
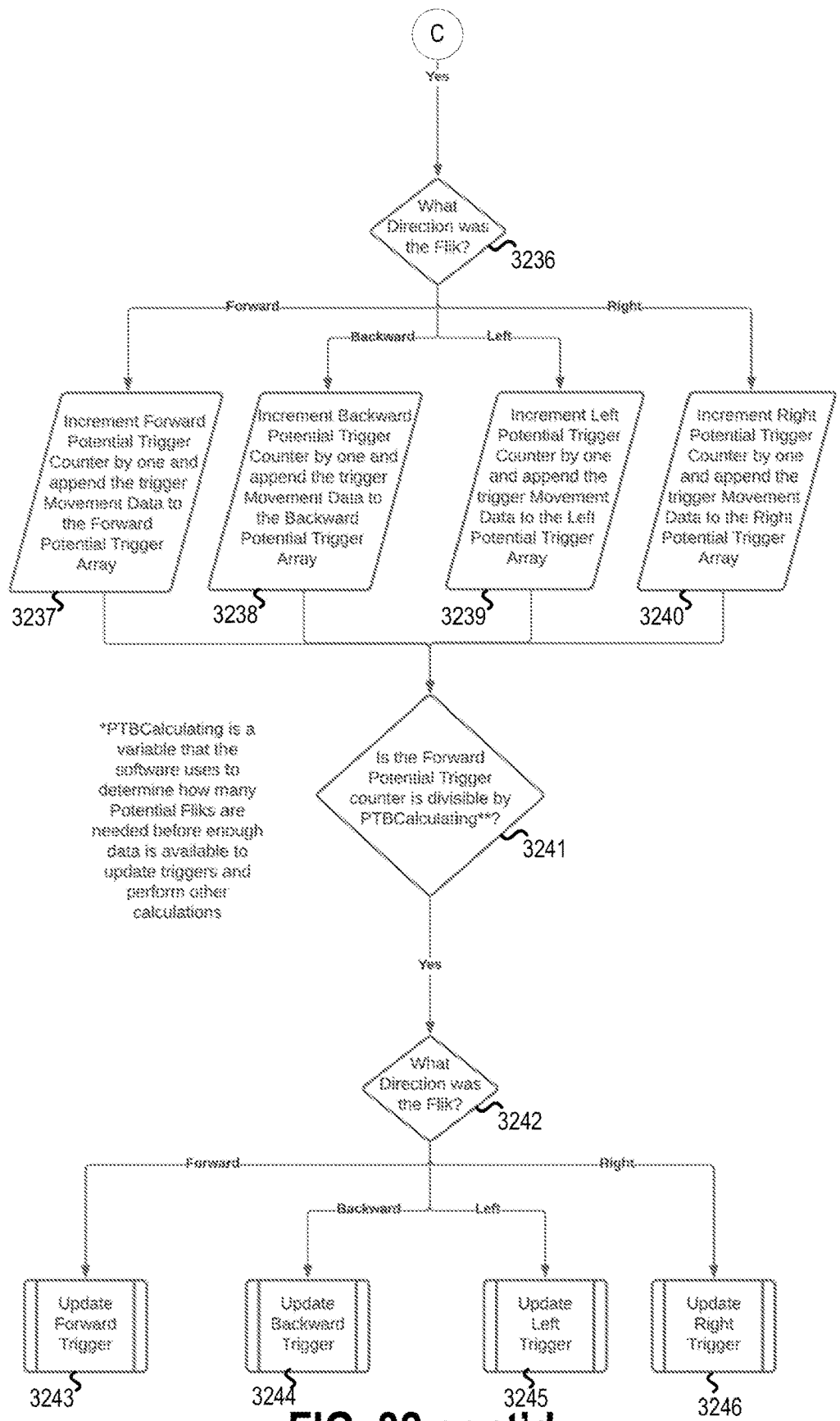
Figure 32:
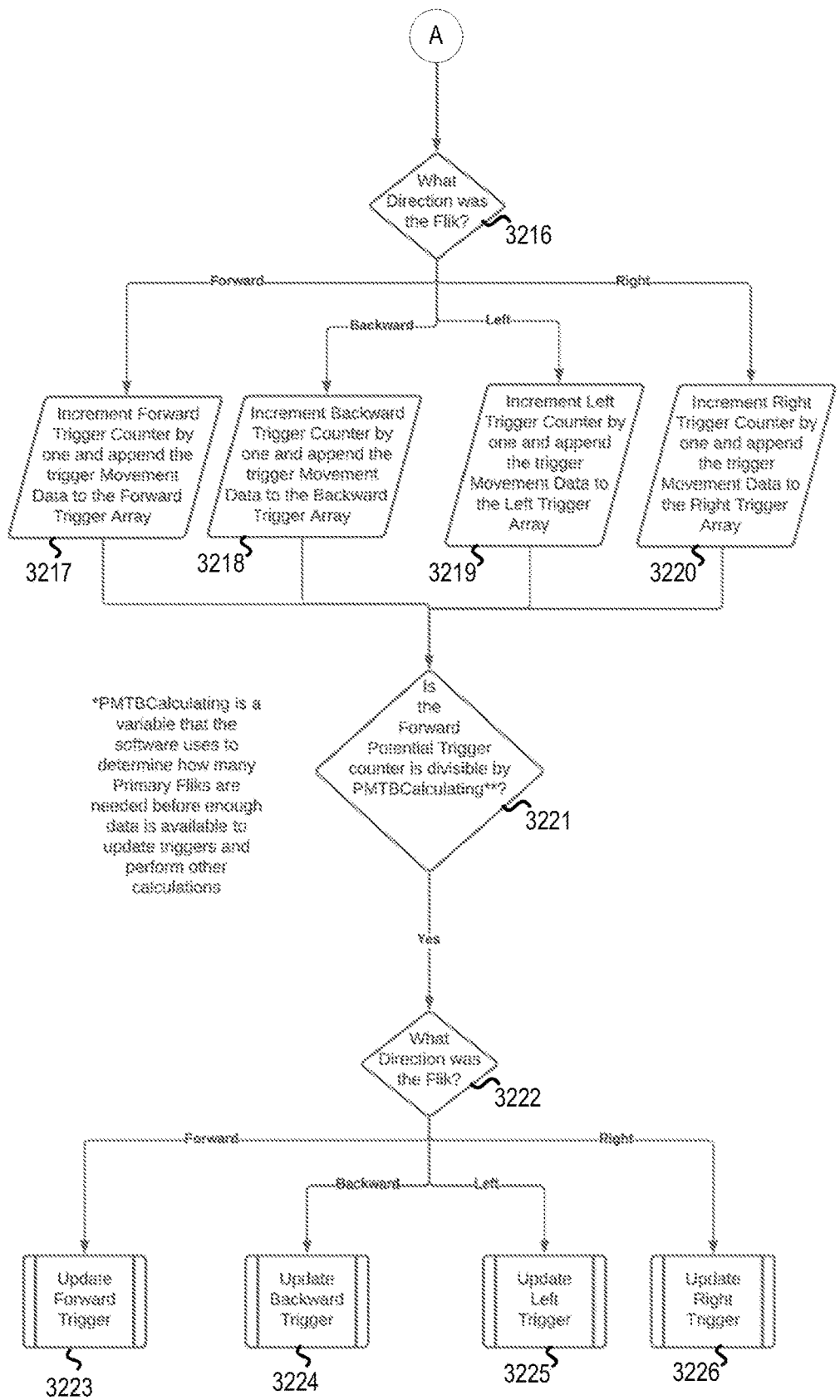

FIG. 32 is a data flow diagram of one embodiment of the process performed by one embodiment of the Trigger Engine. Referring to FIG. 32, processing logic starts by updating Movement Data and sending the Movement Data to the Trigger Engine (processing block 3200), which causes the Trigger Engine to initiate its operation (processing block 3201). In response to initiating operation, processing logic updates the Movement Data (processing block 3202), saves the Movement Data to a Movement Data Array (processing block 3203) and increments the Master Data Counter by 1 (processing block 3204).

After initiating the Trigger Engine, processing logic also monitors for Potential Fliks (processing block 3210), observes for Potential Flik notifications from the Flik Engine (processing block 3211), observes Potential Fliks (processing block 3212), sets the Primary Flik variable to false (processing block 3213), and delays a Potential Flik delay (processing block 3214). The Potential Flik delay is how long the Flik processing logic believes it must wait to ensure that a primary/second Flik is not registered shortly after the notification before a Potential Flik arrives.

Processing logic then checks where FlikIsprimary is false, where FlikIsprimary. Boolean variable used by the Flik processing logic to denote whether a Flik is either primary or secondary (processing block 3215). If it is not false, the process transitions back to processing block 3210 and the process continues. If FlikIsprimary is false, processing logic determines what direction the Flik was (processing block 3216). If it's a forward Flik, processing logic increments the Forward Potential Trigger Counter value by one and appends the Trigger Movement Data to the Forward Potential Trigger Counter Array (processing block 3217). If the direction was for a Backward Flik, the processing logic increments the Backward Potential Trigger Counter value by one and appends Trigger Movement Data to the Backward Potential Trigger Array (processing block 3218). If the direction of the Flik of left, processing logic increments the Left Potential Trigger Counter value by one and appends the Trigger Movement Data to the Left Potential Trigger Array (processing block 3219). If the direction of the Flik was right, processing logic increments the Right Potential Trigger Counter value by one and appends the Trigger Movement Data to the Right Potential Trigger Array (processing block 3220).

After taking the steps with respect to the forward, backward, left, and right Flik directions, processing logic tests whether the Forward Potential Trigger Counter value is divisible by the value of PTBcalculating. PTBcalculating is a variable that the Flik processing logic uses to determine how many potential Fliks are needed before an update is available to update triggers and perform other calculations.

Processing logic then determines the direction that the Flik occurred (processing block 3222). If the direction of the Flik was in the forward direction, processing logic updates the Forward Trigger value (processing block 3223). If the direction of the Flik was backward, processing logic updates the Backward Trigger value (processing block 3224). If the direction of the Flik was left, processing logic updates the Left Trigger value (processing block 3225). If the direction of the Flik was right, processing logic updates the Right Trigger value (processing block 3226).

Also after initiating the Trigger Engine, processing logic monitors for primary Fliks (processing block 3230) and observes for Primary Flik notifications from the Flik Engine (processing block 3231). In response to an observed Primary Flik (processing block 3232), processing logic sets FlikIsprimary to true (processing block 3233), calculates the Peak and Trough values (processing block 3234), and calculates the Neutral State value (processing block 3235).

After setting the FlikIsprimary variable to true, processing logic also determines the direction the Flik was (processing block 3236). If it's a forward Flik, processing logic increments the Forward Trigger Counter value by one and appends the Trigger Movement Data to the Forward Trigger Counter Array (processing block 3237). If the direction was for a Backward Flik, the processing logic increments the Backward Trigger Counter value by one and appends Trigger Movement Data to the Backward Trigger Array (processing block 3238). If the direction of the Flik of left, processing logic increments the Left Trigger Counter value by one and appends the Trigger Movement Data to the Left Trigger Array (processing block 3239). If the direction of the Flik was right, processing logic increments the Right Trigger Counter value by one and appends the Trigger Movement Data to the Right Trigger Array (processing block 3240).

After taking the steps with respect to the forward, backward, left, and right Flik directions, processing logic tests whether the Forward Potential Trigger Counter value is divisible by the value of PMTBcalculating. PMTBcalculating is a variable that the Flik processing logic uses to determine how many Primary Fliks are needed before an update is available to update triggers and perform other calculations.

Processing logic then determines the direction that the Flik occurred (processing block 3242). If the direction of the Flik was in the forward direction, processing logic updates the Forward Trigger value (processing block 3243). If the direction of the Flik was backward, processing logic updates the Backward Trigger value (processing block 3244). If the direction of the Flik was left, processing logic updates the Left Trigger value (processing block 3245). If the direction of the Flik was right, processing logic updates the Right Trigger value (processing block 3246).

In some embodiments, the Flik processing logic includes a user interface (UI) engine that displays information to the user on the screen of the portable electronic device. In some embodiments, the UI engine causes the UI to display secondary actions to enable the Flik processing logic to extend the functionality of a Flik from just the four directions the user can rotate the device to allow for more functionality. As discussed above, this can be achieved by allowing for secondary Fliks to occur after a primary Flik is detected. For example, if user instigates a Backward Flik on a webpage, the primary function is to scroll up the website, the UI then displays four or more secondary Flik options for a short period of time (e.g., two seconds) for which the user may select with a secondary Flik. After this time period has passed, those options will no longer be available and another primary Flik can be instigated.

Figure 27:
FIG. 27 is an illustration of secondary Flik options after a primary backward Flik has occurred.

FIG. 27 is an illustration of a user interface showing secondary Flik options at the top or bottom of a screen after a primary backward Flik has occurred. Referring to FIG. 27, a display screen of a portable electronic device (e.g., a smartphone) is shown with sample website content 2701 displayed thereon. After a primary backward Flik occurs, the Flik processing logic displays menu 2702, which presents options for a user to take with respect to the navigation on the display screen. Menu 2702 includes a scroll up button, 2711, which when selected by a user causes the content on the display screen to scroll up (secondary action 1). A scroll to the top button 2712 is also displayed and when selected, causes the content to scroll to the top (secondary action 2). Bookmarks button 2713 is also displayed and when selected presents a list of users bookmarks on the display screen (secondary action 3). The cancel button 2714 is shown as part of menu 2702 and when selected causes the navigation to end and return to displaying the sample website content 2701 on the screen (secondary action 4). Note that these actions are examples and other actions may be used.

Each of these menu options in menu 2702 is selectable using a touchless input create using a Flik. In some embodiments, performing a backward Flik selects scroll up button 2711, performing a forward Flik selects cancel button 2714, a left Flik selects scroll to top button 2712, and a right Flik selects bookmarks button 2713.

Figure 28:
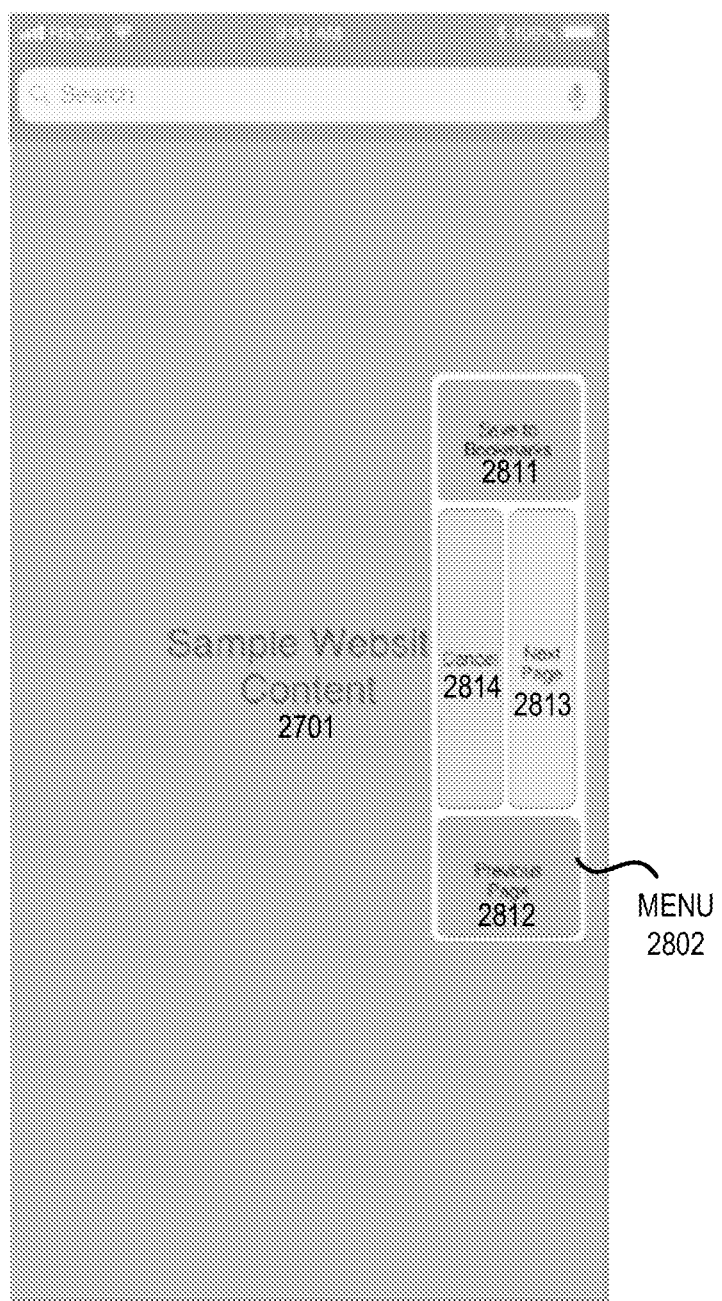
FIG. 28 is an illustration of a secondary Flik options after a primary right Flik.

FIG. 28 is an illustration of a user interface showing a secondary Flik options after a primary Right Flik at the left or right-hand side of a screen. As with FIG. 27, sample website content 2701 is displayed on the display screen of a device when the primary Right Flik occurs. In some embodiments, menu 2802 is displayed on the display screen after the primary right Flik. Menu 2802 includes a save to bookmarks button 2811, a previous page button, 2812, a next page button 2813, and a cancel button, 2814. Each of the buttons is selectable by the user by performing a secondary Flik. If the user selects the save to bookmarks button 2811 using a backward secondary Flik, the currently displayed web page is saved to the bookmarks of the device of the browser (secondary action 1). If the previous page button 2812 is selected by the user using a forward secondary Flik, then the browser displays the previous page that was being displayed on the display screen prior to sample website content 2701 (secondary action 2). If the user performed a secondary Right Flik, then the webpage button 2813 is selected and the next page of the website content is displayed (secondary action 3). If the user selects the cancel button 2814 with a secondary Left Flik after the primary right Flik, the navigation is cancelled and sample website content 2701 remains displayed on the display screen (secondary action 4). Note that these actions are examples and other actions may be used.

Figure 33:
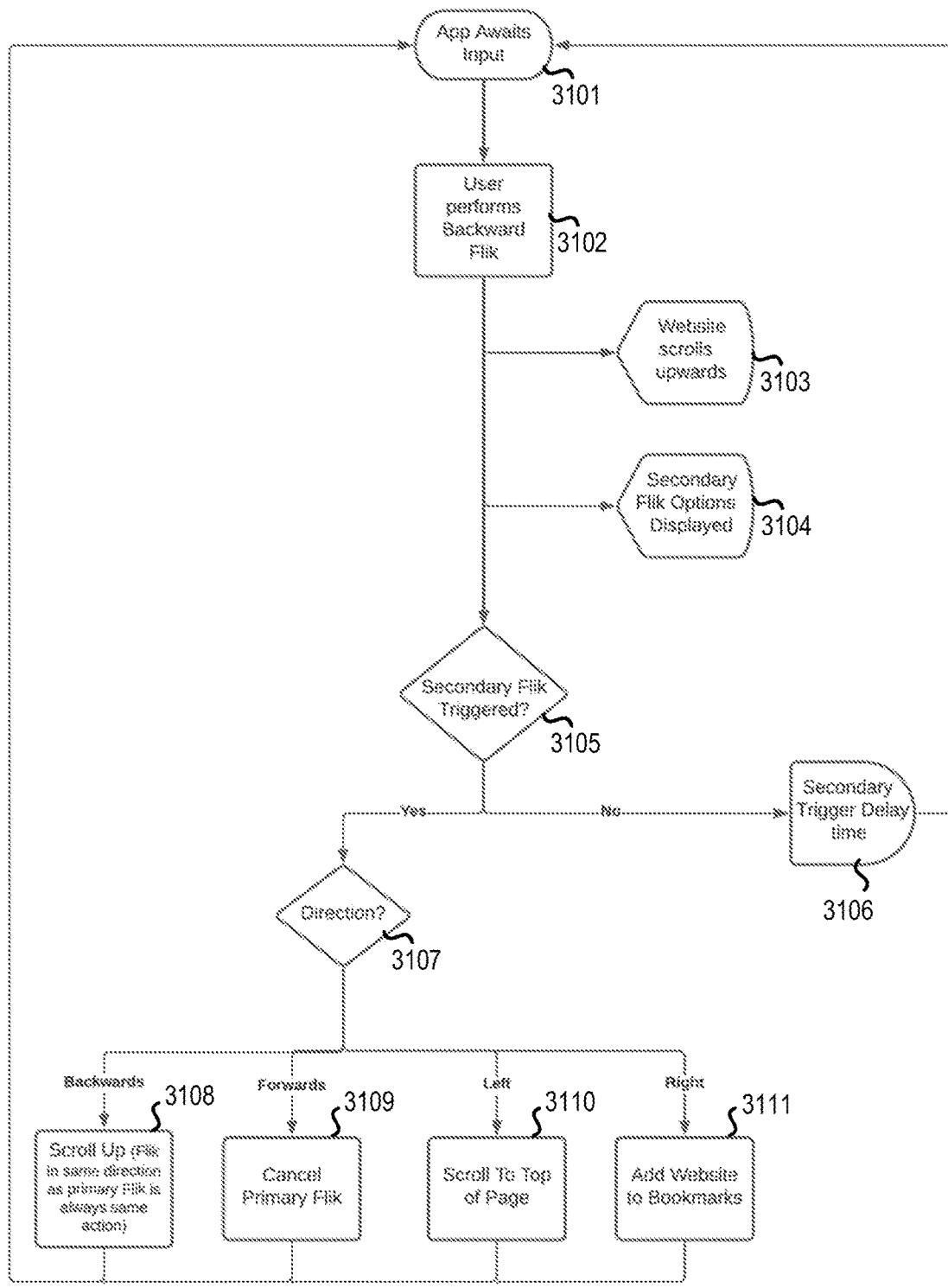
FIG. 33 is a flow diagram of one embodiment of a process for processing primary and secondary Fliks.

FIG. 33 is a flow diagram of one embodiment of a process for processing primary and secondary Fliks. This is an example flow that may be used to implement the examples depicted in FIGS. 27 and 28. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by software executing on a portable electronic device such as a mobile phone (e.g., a smartphone) such as described in herein.

Referring to FIG. 33, the process begins by processing logic of the application awaiting receipt of inputs (processing block 3101). While waiting, the user performs a Backward Flik (3102). In response to the Backward Flik, processing logic determines that a Backward Flik has occurred and sends an input to the browser that causes the browser to scroll the website upwards (processing block 3103) and displays secondary Flik options on the display screen of the portable electronic device (processing block 3104).

Also, after receiving the Backward Flik, processing logic determines whether a secondary Flik has been triggered (processing block 3105). If not, processing logics waits for a secondary trigger delay time to transpire (processing block 3106) before returning to processing block 3101 to receive more application inputs. If a secondary Flik has been triggered, processing logic determines the direction of the Flik (processing block 3107).

Based on the determined direction, processing logic sends an input to the browser that causes the browser to perform one of the operations associated with the secondary Flik. These actions can be the selectable actions depicted on a menu on the display of the device after the primary Flik has occurred. For example, if processing logic determines the Flik direction is backwards, then processing logic sends an input to the browser to scroll up (processing block 3108). Note that in some embodiments, a secondary Flik in the same direction as a primary Flik is always the same action. If processing logic determines the Flik direction is forwards, then processing logic sends an input to the browser to cancel the primary Flik (processing block 3109). If processing logic determines the Flik direction is left, then processing logic sends an input to the browser to scroll to the top of the page (processing block 3110). If processing logic determines the Flik direction is right, then processing logic sends an input to the browser to add the website currently being viewed to the bookmarks (processing block 3111).

FIG. 34 is a flow diagram of one embodiment of a process for controlling a portable electronic device. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as a mobile phone (e.g., a smartphone) such as described in herein.

Referring to FIG. 34, the process begins by processing logic obtaining one or more touchless inputs by capturing one or more movements of the portable electronic device resulting from one or more hand gestures made by a user's hand holding the portable electronic device (processing block 3401). In some embodiments, these movements comprise one or more of a plurality of rotations of the portable electronic device captured by sensors of the portable electronic device, and further comprising determining whether the one or more movements constitute a touchless input.

In some embodiments, each of the movements comprises rotating the portable electronic device from an initial position in one of a plurality of directions along pitch, roll and yaw axes and returning the portable electronic device to the initial position. In some embodiments, the plurality of directions comprises six, and the six directions are forward, backward, right, left, clockwise and counterclockwise and are associated with rotation of the portable electronic device along a positive pitch axis toward the user before returning a neutral position, along a negative pitch axis away from the user before returning the neutral position, along a positive roll axis toward the user's right side before returning the neutral position, and along a negative roll axis toward the user's left side before returning the neutral position, along a negative yaw axis in a clockwise rotation before returning to the neutral position, along a positive yaw axis in a counterclockwise rotation before returning to the neutral position, respectively. Alternatively, in some embodiments, only the plurality of directions along pitch and roll axes are used.

Based on the one or more touchless inputs, processing logic determines one or more operations to control operation of the portable electronic device (processing block 3402). In some embodiments, determining whether the one or more movements constitute a touchless input comprises: computing a rotation rate associated with one movement; comparing rotation rate with one or more trigger values, where each trigger value of these trigger values corresponds to a different touchless input; and sending a notification of one touchless input with a direction and rotation rate to software on the portable electronic device. In some embodiments, determining one or more operations to control operation of the portable electronic device based on the one or more touchless inputs comprises: identifying a primary action (e.g., a primary Flik) associated with a first captured movement; and identifying a secondary action (e.g., a secondary Flik) associated with a second captured movement that is captured within a predetermined time after capture of the first captured movement.

Processing logic then controls the electronic device using at least one of the one or more operations (processing block 3403). These controls may include controlling an application running on the electronic device, user interface elements of software running on the electronic device, performing navigation operations with respect to a browser, etc.

By integrating the Flik software into a smartphone operating system allow users to use the Flik processing logic anywhere in the operating system or throughout all or many applications. The movement model that Flik processing logic uses is perfectly suited to modern UI/UX, where most navigation comes through vertical and horizontal scrollable lists. Furthermore, secondary Fliks could allow the user to perform most common functions throughout the OS without any need for touching the screen.

Moreover, Flik processing logic may be integrated into various smartphone applications. For example, social media applications would be ideal because of the horizontal scrolling nature of the applications and the simple interactions most commonly needed (e.g., reply, etc.).

Also, the Flik processing logic could be used with any other application where common user interface actions are required or as a way to control and interact with AR/VR spaces. The Flik processing logic could be ideal for interaction with AR information that usually displays a minimal amount of information and benefits from a simple interaction paradigm which Flik processing logic can be used to could deliver.

Flik processing logic can be used to interact with hardware or robotic. For example, the Flik motion could be used to control the movement of hardware or robotics or used to either dictate movement or perform functions or tasks Flik processing logic can be used to interact with or control another device. For example, Flik processing logic could be used to remotely control another smartphone or PC. Horizontal and vertical scrollable lists are a universal standard for displaying information throughout desktop and mobile computing and are ideal for use with Flik processing logic.

Figure 35:
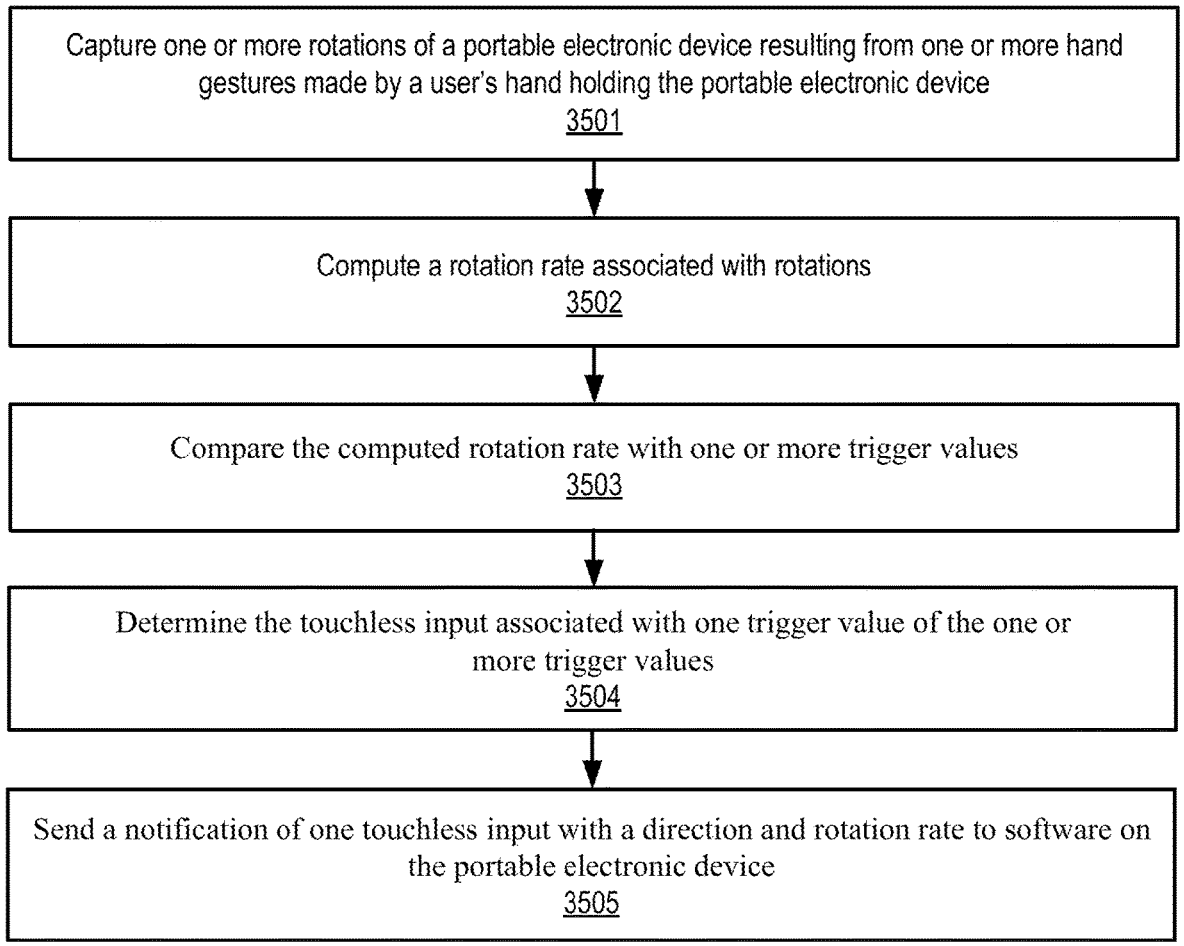
FIG. 35 is a flow diagram of one embodiment of a process for obtaining one or more touchless inputs.

FIG. 35 is a flow diagram of one embodiment of a process for obtaining one or more touchless inputs. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 35, the process begins by capturing one or more rotations of a portable electronic device resulting from one or more hand gestures made by a user's hand holding the portable electronic device (processing block 3501). In some embodiments, each of the one or more rotations is started with the portable electronic device in an initial position and made in one of a plurality of directions along pitch or roll axes and then returns the portable electronic device to the initial position. In some embodiments, the plurality of directions comprises six, and the six directions are forward, backward, right, left, clockwise and counterclockwise and are associated with rotation of the portable electronic device along a positive pitch axis toward the user before returning a neutral position, along a negative pitch axis away from the user before returning the neutral position, along a positive roll axis toward the user's right side before returning the neutral position, and along a negative roll axis toward the user's left side before returning the neutral position, along a negative yaw axis in a clockwise rotation before returning to the neutral position, along a positive yaw axis in a counterclockwise rotation before returning to the neutral position, respectively. Alternatively, in some embodiments, only the plurality of directions along pitch and roll axes are used.

After capturing the rotations of a portable electronic device, processing logic computes a rotation rate associated with rotations (processing block 3502) and compares the computed rotation rate with one or more trigger values (processing block 3503). In some embodiments, each trigger value of the one or more trigger values corresponding to a different touchless input. For example, a first trigger value may be associated a forward rotation (e.g., a forward Flik), a second trigger value may be associated a backward rotation (e.g., a backward Flik), a third trigger value may be associated a left rotation (e.g., a left Flik), and a fourth trigger value may be associated a right rotation (e.g., a right Flik).

Processing logic determines the touchless input associated with one trigger value of the one or more trigger values (processing block 3504) and sends a notification of one touchless input with a direction and rotation rate to software on the portable electronic device (processing block 3505). In response to the touchless input, its direction and rotation rate, processing logic associated with software performs an action (e.g., a browser navigation operation, performing an application operation (e.g., an input operation, etc.), etc.).

Figure 36:
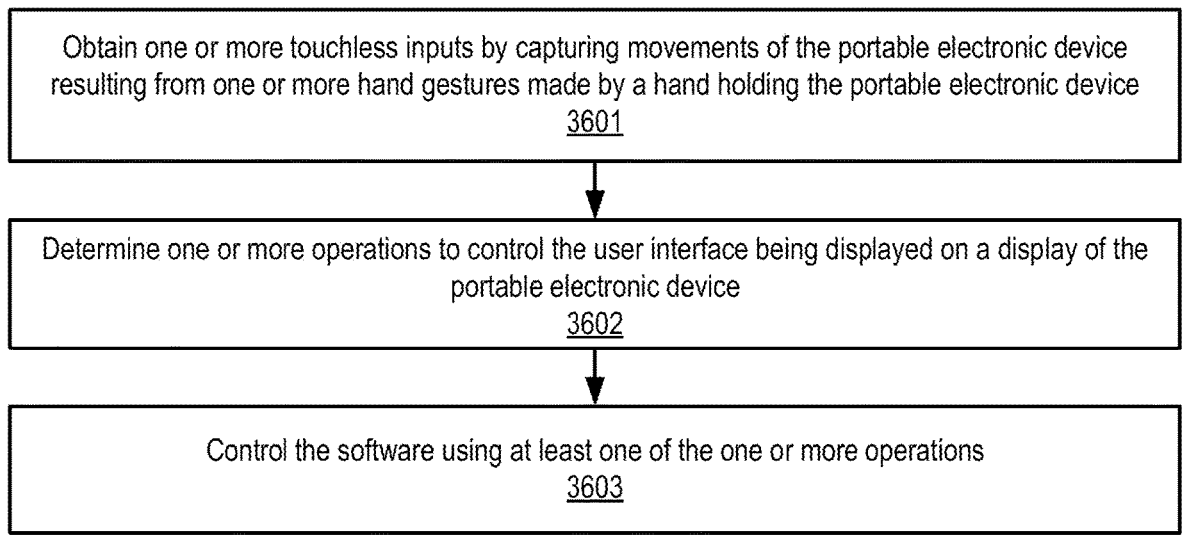
FIG. 36 is a flow diagram of one embodiment of a process for controlling a user interface of software on a portable electronic device.

FIG. 36 is a flow diagram of one embodiment of a process for controlling a user interface of software on a portable electronic device. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 36, the process begins by obtaining one or more touchless inputs by capturing movements of the portable electronic device resulting from one or more hand gestures made by a hand holding the portable electronic device (processing bock 3601). In some embodiments, the movements comprise rotating the portable electronic device from an initial position in one of a plurality of directions along pitch or roll axes and returning the portable electronic device to the initial position. In some embodiments, the plurality of directions comprises four, and the four directions are forward, backward, right and left and are associated with rotation of the portable electronic device along a positive pitch axis toward the user before returning a neutral position, along a negative pitch axis away from the user before returning the neutral position, along a positive roll axis toward the user's right side before returning the neutral position, and along a negative roll axis toward the user's left side before returning the neutral position, respectively.

Based on the one or more touchless inputs, processing logic determines one or more operations to control the user interface being displayed on a display of the portable electronic device (processing bock 3602). In some embodiments, the one or more operations comprises scrolling a page being displayed on a display screen of the portable electronic device, scrolling to a top of the page being displayed on a display screen of the portable electronic device, scrolling to a bottom of the page being displayed on a display screen of the portable electronic device, proceeding forward to a next page, proceeding backwards to previous page, displaying a list of one or more bookmarks, bookmarking the page, importing one or more bookmarks, proceeding to the next bookmark in a list of bookmarks, proceeding to a previous bookmark in a list of bookmarks, cancelling a navigation operation, setting a homepage, performing a search operation, viewing a browsing history, opening a new tab, closing a new tab, highlighting a hyperlink on a page, selecting a hyperlink, entering data, entering a website, sharing information, and performing an editing function.

After determining one or more operations, processing logic controls software using at least one of the one or more operations (processing bock 3603). In some embodiments, the software comprises a web browser and the one or more operations are browsing navigation operations performed by the web browser. In some embodiments, one of the touchless inputs causes display of a menu with a plurality of menu items on the display, each menu item of the plurality of menu items corresponds to a user interface action selectable with another touchless input.

Figure 37:
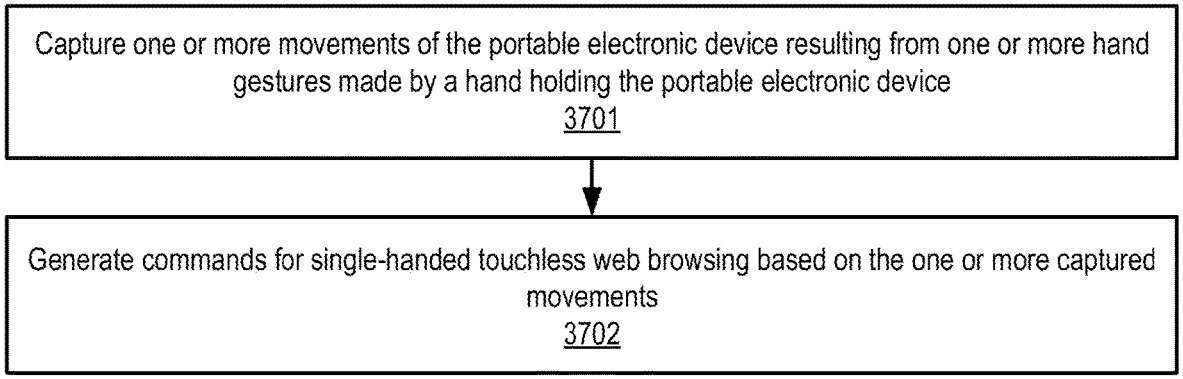
FIG. 37 is a flow diagram of one embodiment of a process for controlling web browsing on a portable electronic device.

FIG. 37 is a flow diagram of one embodiment of a process for controlling web browsing on a portable electronic device. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a portable electronic device such as, for example, a smart phone described herein.

Referring to FIG. 37, the process begins by processing logic capturing one or more movements of the portable electronic device resulting from one or more hand gestures made by a hand holding the portable electronic device (processing block 3701). In some embodiments, the movements are captured using one or more sensors of the portable electronic device. In some embodiments, the movements comprise one or more Fliks.

After capturing the movements, processing logic generates commands for single-handed touchless web browsing based on the one or more captured movements (processing block 3702). In some embodiments, these commands are for scrolling a page being displayed on a display screen of the portable electronic device, scrolling to a top of the page being displayed on a display screen of the portable electronic device, scrolling to a bottom of the page being displayed on a display screen of the portable electronic device, proceeding forward to a next page, proceeding backwards to previous page, displaying a list of one or more bookmarks, bookmarking the page, importing one or more bookmarks, proceeding to the next bookmark in a list of bookmarks, proceeding to a previous bookmark in a list of bookmarks, cancelling a navigation operation, setting a homepage, performing a search operation, viewing a browsing history, opening a new tab, closing a new tab, highlighting a hyperlink on a page, selecting a hyperlink, entering data, entering a website, sharing information, and performing an editing function.

Figure 38:
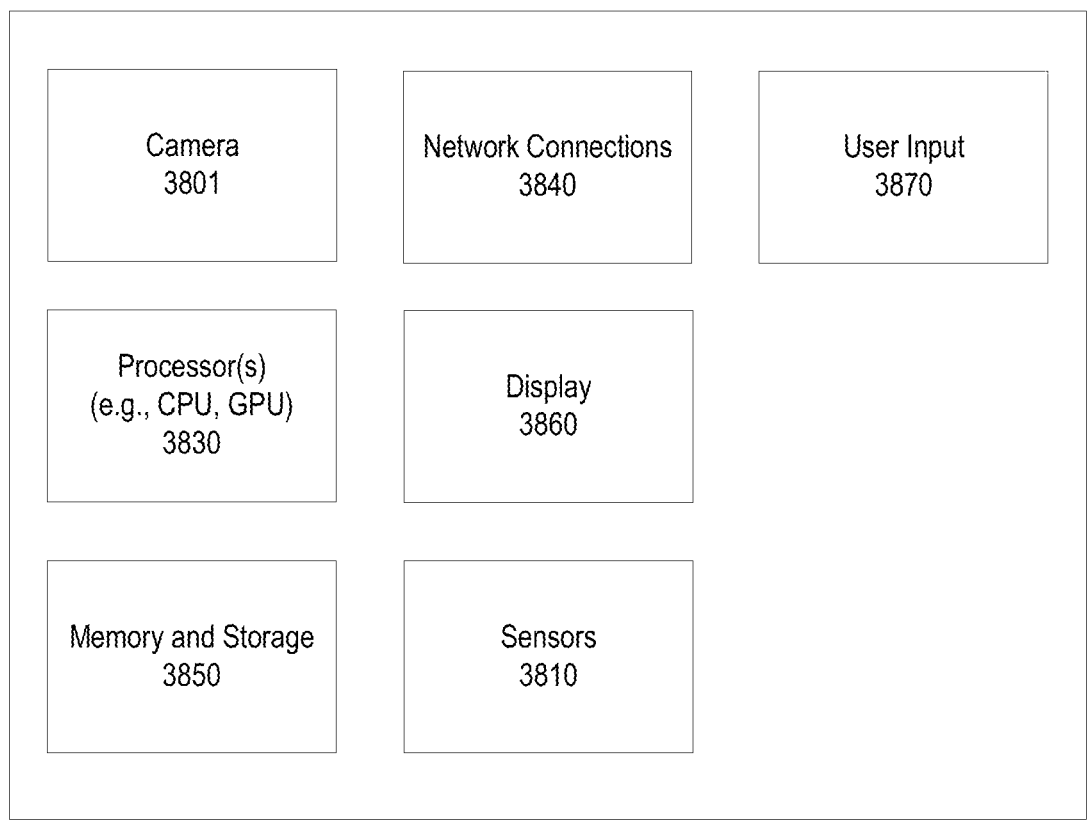
FIG. 38 is a block diagram of one embodiment of a smart phone device.

FIG. 38 is a block diagram of one embodiment of a smart phone device.

Referring to FIG. 38, smart phone device 3800 comprises processor(s) 3830 that may include one or more central processing units (CPUs) or processing cores (e.g., graphic processing unit (GPU), etc.). In one embodiment, processor 3830 executes software, including applications and operating system software on smart phone device 3800. The Flik processing logic also includes software for processing information related to Fliks, including identifying Fliks and potential Fliks, as well as generating touchless inputs for use in interacting and/or controlling software running on smart phone device 3800.

Smart phone device 3800 also includes sensors 3800 such as the sensors for obtaining position and movement information related to movements of smart phone device 3800 that may be used for Flik processing performed by smart phone device 3800. Smart phone device 3800 includes a display 3860 for displaying application data (e.g., browser, etc.) and user interface elements that may be controlled with touchless inputs. User input functionality 3870 is usually included to enable a user to provide input to smart phone device 3800 separately from the Fliks. Such user input can be the touch screen and/or graphical user interface elements (e.g., buttons).

Smart device 3800 also includes a network connections interface 3840. In one embodiment, network connections interface 3834 comprises wireless interface. In an alternative embodiment, network connections interface 3840 includes a wired interface.

Smart phone device 3800 further includes memory 3850 for default values and other calculated values (e.g., trigger values, counter values, peak values, trough values, etc.) such as those described herein.

Smart phone device 3800 can also comprise camera 3801, which may be used to capture further information to control software running on smart phone device 3800.

There are a number of example embodiments described herein.

Example 1 is a method for controlling a user interface of software on a portable electronic device, the method comprising: obtaining one or more touchless inputs by capturing movements of the portable electronic device resulting from one or more hand gestures made by a hand holding the portable electronic device; determining one or more operations to control the user interface being displayed on a display of the portable electronic device based on the one or more touchless inputs; and controlling the software using at least one of the one or more operations.

Example 2 is the method of example 1 that may optionally include that the software comprises a web browser and the one or more operations are browsing navigation operations performed by the web browser.

Example 3 is the method of example 2 that may optionally include that the one or more operations comprises one or more of a group consisting of: scrolling a page being displayed on a display screen of the portable electronic device, scrolling to a top of the page being displayed on a display screen of the portable electronic device, scrolling to a bottom of the page being displayed on a display screen of the portable electronic device, proceeding forward to a next page, proceeding backwards to previous page, displaying a list of one or more bookmarks, bookmarking the page, importing one or more bookmarks, proceeding to the next bookmark in a list of bookmarks, proceeding to a previous bookmark in a list of bookmarks, cancelling a navigation operation, setting a homepage, performing a search operation, viewing a browsing history, opening a new tab, closing a new tab, highlighting a hyperlink on a page, selecting a hyperlink, entering data, entering a website, sharing information, and performing an editing function.

Example 4 is the method of example 1 that may optionally include that the one or more movements comprises rotating the portable electronic device from an initial position in one of a plurality of directions along pitch or roll axes and returning the portable electronic device to the initial position, wherein the plurality of directions comprises four, and the four directions are forward, backward, right and left and are associated with rotation of the portable electronic device along a positive pitch axis toward the user before returning a neutral position, along a negative pitch axis away from the user before returning the neutral position, along a positive roll axis toward the user's right side before returning the neutral position, and along a negative roll axis toward the user's left side before returning the neutral position, respectively.

Example 5 is the method of example 4 that may optionally include that the one or more movements further comprises rotating the portable electronic device in clockwise and counterclockwise directions.

Example 6 is the method of example 1 that may optionally include that one of the touchless inputs causes display of a menu with a plurality of menu items on the display, each menu item of the plurality of menu items corresponds to a user interface action selectable with another touchless input.

Example 7 is the method of example 1 that may optionally include that the portable electronic device comprises a mobile phone.

Example 8 is one or more non-transitory computer readable storage media having instructions stored thereupon which, when executed by a system having at least a processor and a memory therein, cause the system to perform a method for controlling a user interface of software on a portable electronic device having operations comprising: obtaining one or more touchless inputs by capturing movements of the portable electronic device resulting from one or more hand gestures made by a hand holding the portable electronic device; determining one or more operations to control the user interface being displayed on a display of the portable electronic device based on the one or more touchless inputs; and controlling the software using at least one of the one or more operations.

Example 9 is the one or more non-transitory computer readable storage media of example 8 that may optionally include that the software comprises a web browser and the one or more operations are browsing navigation operations performed by the web browser.

Example 10 is the one or more non-transitory computer readable storage media of example 8 that may optionally include that the one or more operations comprises one or more of a group consisting of: scrolling a page being displayed on a display screen of the portable electronic device, scrolling to a top of the page being displayed on a display screen of the portable electronic device, scrolling to a bottom of the page being displayed on a display screen of the portable electronic device, proceeding forward to a next page, proceeding backwards to previous page, displaying a list of one or more bookmarks, bookmarking the page, importing one or more bookmarks, proceeding to the next bookmark in a list of bookmarks, proceeding to a previous bookmark in a list of bookmarks, cancelling a navigation operation, setting a homepage, performing a search operation, viewing a browsing history, opening a new tab, closing a new tab, highlighting a hyperlink on a page, selecting a hyperlink, entering data, entering a website, sharing information, and performing an editing function.

Example 11 is the one or more non-transitory computer readable storage media of example 8 that may optionally include that the one or more movements comprises rotating the portable electronic device from an initial position in one of a plurality of directions along pitch or roll axes and returning the portable electronic device to the initial position, wherein the plurality of directions comprises four, and the four directions are forward, backward, right and left and are associated with rotation of the portable electronic device along a positive pitch axis toward the user before returning a neutral position, along a negative pitch axis away from the user before returning the neutral position, along a positive roll axis toward the user's right side before returning the neutral position, and along a negative roll axis toward the user's left side before returning the neutral position, respectively.

Example 12 is the one or more non-transitory computer readable storage media of example 11 that may optionally include that the one or more movements further comprises rotating the portable electronic device in clockwise and counterclockwise directions.

Example 13 is the one or more non-transitory computer readable storage media of example 8 that may optionally include that one of the touchless inputs causes display of a menu with a plurality of menu items on the display, each menu item of the plurality of menu items corresponds to a user interface action selectable with another touchless input.

Example 14 is the one or more non-transitory computer readable storage media of example 8 that may optionally include that the portable electronic device comprises a mobile phone.

Example 15 is a portable electronic device comprising: one or more sensors to capture movements of the portable electronic device and provide data regarding the movements; a memory to store instructions and captured data related to the movements; and one or more processors coupled to the memory to execute the stored instructions to: obtain one or more touchless inputs by capturing movements of the portable electronic device resulting from one or more hand gestures made by a hand holding the portable electronic device; determine one or more operations to control the user interface being displayed on a display of the portable electronic device based on the one or more touchless inputs; and control the software using at least one of the one or more operations.

Example 16 is the portable electronic device of example 15 that may optionally include that the software comprises a web browser and the one or more operations are browsing navigation operations performed by the web browser.

Example 17 is the portable electronic device of example 16 that may optionally include that the one or more operations comprises one or more of a group consisting of: scrolling a page being displayed on a display screen of the portable electronic device, scrolling to a top of the page being displayed on a display screen of the portable electronic device, scrolling to a bottom of the page being displayed on a display screen of the portable electronic device, proceeding forward to a next page, proceeding backwards to previous page, displaying a list of one or more bookmarks, bookmarking the page, importing one or more bookmarks, proceeding to the next bookmark in a list of bookmarks, proceeding to a previous bookmark in a list of bookmarks, cancelling a navigation operation, setting a homepage, performing a search operation, viewing a browsing history, opening a new tab, closing a new tab, highlighting a hyperlink on a page, selecting a hyperlink, entering data, entering a website, sharing information, and performing an editing function.

Example 18 is the portable electronic device of example 15 that may optionally include that the one or more movements comprises rotating the portable electronic device from an initial position in one of a plurality of directions along pitch or roll axes and returning the portable electronic device to the initial position, wherein the plurality of directions comprises four, and the four directions are forward, backward, right and left and are associated with rotation of the portable electronic device along a positive pitch axis toward the user before returning a neutral position, along a negative pitch axis away from the user before returning the neutral position, along a positive roll axis toward the user's right side before returning the neutral position, and along a negative roll axis toward the user's left side before returning the neutral position, respectively.

Example 19 is the portable electronic device of example 18 that may optionally include that the one or more movements further comprises rotating the portable electronic device in clockwise and counterclockwise directions.

Example 20 is the portable electronic device of example 15 that may optionally include that one of the touchless inputs causes display of a menu with a plurality of menu items on the display, each menu item of the plurality of menu items corresponds to a user interface action selectable with another touchless input.

Example 21 is a method for controlling web browsing on a portable electronic device, the method comprising: capturing, using sensors of the portable electronic device, one or more movements of the portable electronic device resulting from one or more hand gestures made by a hand holding the portable electronic device; and generating commands for single-handed touchless web browsing based on the one or more captured movements.

Example 22 is the method of example 21 that may optionally include that the one or more movements comprises one or more Fliks.

Example 23 is the method of example 21 that may optionally include that the portable electronic device comprises a mobile phone.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method for controlling a user interface of software on a portable electronic device, the method comprising:
monitoring movements of the portable electronic device by a user;
computing trigger values for the user based on the movements being monitored;
storing the trigger values in a movement profile of the user;
obtaining one or more touchless inputs by capturing, based on trigger values in a movement profile of the user, rotation of the portable electronic device in one of a plurality of directions followed by rotation in an opposite direction back toward the initial position corresponds to a touchless input, the plurality of directions including forward, backward, and right, left tilt directions, and clockwise and counterclockwise directions, wherein obtaining the one or more touchless inputs comprises capturing a first rotation in one of the clockwise and counterclockwise directions and determining whether the first rotation constitutes one touchless input of the one or more touchless inputs;
determining one or more operations based on the one or more touchless inputs, wherein operations associated with clockwise and counterclockwise directions of rotation correspond to performing a first operation and canceling the first operation, wherein determining the one or more operations based on the one or more touchless inputs comprises determining at least one operation of the one or more operations is for canceling the first operation upon determining that the first rotation constitutes the one touchless input; and controlling the software on the portable electronic device using at least one of the one or more operations.

2. The method of claim 1 wherein cancelling the first operation includes returning the software to its state when the first operation was performed.

3. The method of claim 1 further comprising determining if one or more touchless inputs has been performed by the user by:

capturing motion data from an accelerometer, a gyroscope and a magnetometer of the portable electronic device; and computing a rotation rate of the portable electronic device.

4. The method of claim 1 wherein the rotation of the portable electronic device occurs in response to one or more hand gestures made by a hand of a user holding the portable electronic device without touching a screen of the portable electronic device.

5. The method of claim 1 further comprising computing an amount of time for the user the user to rotate the portable electronic device and return it to its initial position.

6. The method of claim 1 wherein the movement profile includes a computed time to return to a neutral position as one of the trigger values used for determining that the rotation in the opposite direction is not part of another touchless input.

7. The method of claim 1 further comprising determining that the rotation in the opposite direction is not part of another touchless input based on one or more of the trigger values for the user in the movement profile.

8. The method of claim 1 wherein the movement profile includes a computed time to return to a neutral position as one of the trigger values used for determining that the rotation in the opposite direction is not part of another touchless input.

9. The method of claim 1 wherein the forward, backward, right and left tilt directions are associated with rotation of the portable electronic device along a positive pitch axis toward the user, along a negative pitch axis away from the user, along a positive roll axis toward the user's right side, and along a negative roll axis toward the user's left side, respectively.

10. The method of claim 1 wherein the software comprises a web browser and the one or more operations are browsing navigation operations performed by the web browser.

11. The method of claim 2 wherein the one or more operations comprises one or more of a group consisting of: scrolling a page being displayed on a display screen of the portable electronic device, scrolling to a top of the page being displayed on a display screen of the portable electronic device, scrolling to a bottom of the page being displayed on a display screen of the portable electronic device, proceeding forward to a next page, proceeding backwards to previous page, displaying a list of one or more bookmarks, bookmarking the page, importing one or more bookmarks, proceeding to the next bookmark in a list of bookmarks, proceeding to a previous bookmark in a list of bookmarks, cancelling a navigation operation, setting a homepage, performing a search operation, viewing a browsing history, opening a new tab, closing a new tab, highlighting a hyperlink on a page, selecting a hyperlink, entering data, entering a website, sharing information, and performing an editing function.

12. The method of claim 1 wherein one of the touchless inputs causes display of a menu with a plurality of menu items on the display, each menu item of the plurality of menu items corresponds to a user interface action selectable with another touchless input.

13. A portable electronic device comprising:

one or more sensors to capture movements of the portable electronic device and provide data regarding the movements;

a display;

a memory to store instructions and captured data related to the movements; and one or more processors coupled to the memory and the display to execute the stored instructions to:

monitor movements of the portable electronic device by a user, compute trigger values for the user based on the movements being monitored, store the trigger values in a movement profile of the user, obtain one or more touchless inputs by capturing, based on trigger values in a movement profile of the user, rotation of the portable electronic device in one of a plurality of directions followed by rotation in an opposite direction back toward the initial position corresponds to a touchless input, the plurality of directions including forward, backward, and right, left tilt directions, and clockwise and counterclockwise directions, wherein the one or more processors are operable to obtain the one or more touchless inputs by capturing a first rotation in one of the clockwise and counterclockwise directions and determining whether the first rotation constitutes one touchless input of the one or more touchless inputs, determine one or more operations based on the one or more touchless inputs, wherein operations associated with clockwise and counterclockwise directions of rotation correspond to performing a first operation and cancel the first operation, wherein the one or more processors are operable to determine the one or more operations based on the one or more touchless inputs by determining at least one operation of the one or more operations is for canceling the first operation upon determining that the first rotation constitutes the one touchless input, and control the software on the portable electronic device using at least one of the one or more operations.

14. The portable electronic device of claim 13 wherein the one or more one or more processors are operable to cancel the first operation by returning the software to its state when the first operation was performed.

15. The portable electronic device of claim 13 wherein the one or more one or more processors are operable to determine if one or more touchless inputs has been performed by the user by:

capturing motion data from an accelerometer, a gyroscope and a magnetometer of the portable electronic device; and computing a rotation rate of the portable electronic device.

16. The portable electronic device of claim 13 wherein the rotation of the portable electronic device occurs in response to one or more hand gestures made by a hand of a user holding the portable electronic device without touching a screen of the portable electronic device.

17. The portable electronic device of claim 13 wherein the one or more one or more processors are operable to compute an amount of time for the user to rotate the portable electronic device and return it to its initial position.

18. The portable electronic device of claim 13 wherein the movement profile includes a computed time to return to a neutral position as one of the trigger values used for determining that the rotation in the opposite direction is not part of another touchless input.

19. One or more non-transitory computer readable storage media having instructions stored thereupon which, when executed by a system having at least a processor and a memory therein, cause the system to perform a method for controlling a user interface of software on a portable electronic device having operations comprising:
- monitoring movements of the portable electronic device by a user;
- computing trigger values for the user based on the movements being monitored;
- storing the trigger values in a movement profile of the user;
- obtaining one or more touchless inputs by capturing, based on trigger values in a movement profile of the user, rotation of the portable electronic device in one of a plurality of directions followed by rotation in an opposite direction back toward the initial position corresponds to a touchless input, the plurality of directions including forward, backward, and right, left tilt directions, and clockwise and counterclockwise directions, wherein obtaining the one or more touchless inputs comprises capturing a first rotation in one of the clockwise and counterclockwise directions and determining whether the first rotation constitutes one touchless input of the one or more touchless inputs;
- determining one or more operations based on the one or more touchless inputs, wherein operations associated with clockwise and counterclockwise directions of rotation correspond to performing a first operation and canceling the first operation, wherein determining the one or more operations based on the one or more touchless inputs comprises determining at least one operation of the one or more operations is for canceling the first operation upon determining that the first rotation constitutes the one touchless input; and
- controlling the software on the portable electronic device using at least one of the one or more operations.

20. The one or more non-transitory computer readable storage media of claim 19 wherein cancelling the first operation includes returning the software to its state when the first operation was performed.

* * * * *